United States Patent
Takeuchi

(10) Patent No.: US 12,461,501 B2
(45) Date of Patent: Nov. 4, 2025

(54) TRIGGER RELAY UNIT OF PROGRAMMABLE CONTROLLER, TRIGGER TRANSMISSION SYSTEM, TRIGGER TRANSMISSION METHOD, AND RECORDING MEDIUM

(71) Applicant: Mitsubishi Electric Corporation, Tokyo (JP)

(72) Inventor: Daisuke Takeuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/878,801

(22) PCT Filed: Jul. 13, 2022

(86) PCT No.: PCT/JP2022/027627
§ 371 (c)(1),
(2) Date: Dec. 24, 2024

(87) PCT Pub. No.: WO2024/013912
PCT Pub. Date: Jan. 18, 2024

(65) Prior Publication Data
US 2025/0164961 A1    May 22, 2025

(51) Int. Cl.
*G05B 19/05* (2006.01)

(52) U.S. Cl.
CPC .. *G05B 19/058* (2013.01); *G05B 2219/14055* (2013.01)

(58) Field of Classification Search
None
See application file for complete search history.

(56) References Cited

U.S. PATENT DOCUMENTS

| | | |
|---|---|---|
| 10,394,915 B1 | 8/2019 | Raghavendran et al. |
| 2010/0228725 A1 | 9/2010 | Ohashi et al. |

(Continued)

FOREIGN PATENT DOCUMENTS

| | | |
|---|---|---|
| CN | 101469486 A | 7/2009 |
| JP | 2000-259237 A | 9/2000 |

(Continued)

OTHER PUBLICATIONS

Decision to Grant on Jan. 10, 2023, received for JP Application 2022-577427, 5 pages including English Translation.

(Continued)

*Primary Examiner* — David Earl Ogg
(74) *Attorney, Agent, or Firm* — XSENSUS LLP

(57) ABSTRACT

A central processing unit in a programmable controller is connectable to a plurality of logging devices to detect a trigger to log control data about device control. The central processing unit includes a bus communicator that receives a first trigger signal indicating the trigger from a first logging device of the plurality of logging devices, and a trigger relay that transmits the first trigger signal to a second logging device different from the first logging device when the first trigger signal is received. The trigger relay excludes, from a transmission target, a second trigger signal different from the first trigger signal and received in a period from when the first trigger signal is received to when the trigger relay completes transmitting the first trigger signal.

7 Claims, 50 Drawing Sheets

(56) References Cited

U.S. PATENT DOCUMENTS

| | | | |
|---|---|---|---|
| 2015/0378773 A1 | 12/2015 | Nagata et al. | |
| 2018/0150051 A1 | 5/2018 | Kobayashi | |
| 2019/0018385 A1 | 1/2019 | Soneda et al. | |
| 2019/0025783 A1 | 1/2019 | Tamashima et al. | |
| 2019/0079485 A1 | 3/2019 | Hamaguchi | |
| 2019/0204792 A1* | 7/2019 | Kanaya | G05B 19/0425 |
| 2020/0125061 A1* | 4/2020 | Miyasaka | G05B 19/058 |
| 2020/0159202 A1 | 5/2020 | Fujieda et al. | |
| 2020/0278662 A1 | 9/2020 | Hashimoto et al. | |
| 2022/0382663 A1 | 12/2022 | Ellam et al. | |
| 2023/0152771 A1 | 5/2023 | Wakahara | |

FOREIGN PATENT DOCUMENTS

| | | | | |
|---|---|---|---|---|
| JP | 2000276222 A | 10/2000 | | |
| JP | 2001-251298 A | 9/2001 | | |
| JP | 2007-011936 A | 1/2007 | | |
| JP | 2007-114862 A | 5/2007 | | |
| JP | 2010-211377 A | 9/2010 | | |
| JP | 2016-012172 A | 1/2016 | | |
| JP | 2017-007036 A | 1/2017 | | |
| JP | 2017-169288 A | 9/2017 | | |
| JP | 2017-187830 A | 10/2017 | | |
| JP | 2018-010388 A | 1/2018 | | |
| JP | 2019-016327 A | 1/2019 | | |
| JP | 2019-096238 A | 6/2019 | | |
| JP | 2019-120998 A | 7/2019 | | |
| JP | 2020-013526 A | 1/2020 | | |
| JP | 2020-134984 A | 8/2020 | | |
| JP | 2020-134986 A | 8/2020 | | |
| JP | 2020-140465 A | 9/2020 | | |
| JP | 2020-162743 A | 10/2020 | | |
| JP | 2021-036479 A | 3/2021 | | |
| JP | 2021-060966 A | 4/2021 | | |
| JP | 6896195 B1 | 6/2021 | | |
| JP | 2022-016659 A | 1/2022 | | |
| WO | 2017/168706 A1 | 10/2017 | | |
| WO | WO-2018070088 A1 * | 4/2018 | | G05B 19/418 |
| WO | 2019/026288 A1 | 2/2019 | | |
| WO | 2022/044279 A1 | 3/2022 | | |

OTHER PUBLICATIONS

Decision to Grant on Jan. 10, 2023, received for JP Application 2022-577423, 5 pages including English Translation.

Decision to Grant on Jan. 10, 2023, received for JP Application 2022-577430, 5 pages including English Translation.

Decision to Grant on Mar. 22, 2023, received for JP Application 2022-577433, 5 pages including English Translation.

International Search Report and Written Opinion mailed on Oct. 4, 2022, received for International Patent Application No. PCT/JP2022/027627, filed on Jul. 13, 2022, 8 pages including English Translation.

Office Action dated Mar. 13, 2025, issued for the related U.S. Appl. No. 18/878,839.

Final Office Action dated Jun. 2, 2025, issued for the related U.S. Appl. No. 18/878,839, 19pp.

Office Action dated Jun. 4, 2025, issued for the corresponding CN patent application No. 202280097739.1 and the English translation, 14pp.

Office Action dated Jul. 24, 2025, issued for the corresponding CN patent application No. 202280097742.3 and the English translation, 11pp.

Office Action dated Aug. 9, 2025, issued for the corresponding CN patent application No. 202280097333.3 and the English translation, 15pp.

* cited by examiner

FIG.5

STORAGE (530)

LOG DATA [FILE NAME: 01.BIN] (503)

| DATE AND TIME | ADDRESS X10 | ADDRESS X20 |
|---|---|---|
| JAN. 30, 2021 11:00:15.030 | 5 | 6 |
| ⋮ | ⋮ | ⋮ |
| JAN. 30, 2021 12:00:18.030 | 8 | 16 |

LOG DATA [FILE NAME: 02.BIN] (503)

| DATE AND TIME | ADDRESS X30 |
|---|---|
| ⋮ | ⋮ |

LOG DATA [FILE NAME: 03.BIN] (503)

| DATE AND TIME | ADDRESS X40 |
|---|---|
| ⋮ | ⋮ |

⋮

LOGGING DURATION INFORMATION (504)

| FILE NAME | START DATE AND TIME | END DATE AND TIME |
|---|---|---|
| 01.BIN | JAN. 30, 2021  11:00:15.030 | JAN. 30, 2021  12:00:18.030 |
| 02.BIN | JAN. 30, 2021  12:00:15.030 | JAN. 30, 2021  13:00:18.030 |
| 03.BIN | JAN. 30, 2021  16:00:15.030 | JAN. 30, 2021  17:00:18.030 |

PROCESS PERFORMED UPON STARTING SYSTEM

FIG.13

| TRIGGER SETTING INFORMATION | ~501 |
|---|---|
| TRIGGER DETECTION CONDITION | VALUE AT ADDRESS [X10] EXCEEDS 1 |
| TRANSMISSION UPON TRIGGER DETECTION | YES |
| LOGGING UPON RECEIPT OF TRIGGER | NO |

FIG.14

| TRIGGER SHARING INFORMATION | | |
|---|---|---|
| CENTRAL PROCESSING UNIT [21] | TRIGGER DETECTION CONDITION | VALUE AT ADDRESS [X90] EXCEEDS 100 |
| LOGGING UNIT [23] | TRIGGER TRANSMISSION | YES |
| | TRIGGER RECEPTION | YES |
| ⋮ | ⋮ | ⋮ |

FIG.23

| TRIGGER INFORMATION ||
|---|---|
| SHARING INFORMATION | SHARING COUNTERPART: DEVICES MANAGED BY CENTRAL PROCESSING UNIT |
| TRIGGER ID | TRIG001 |

FIG.24

| | TRIGGER SETTING INFORMATION | |
|---|---|---|
| 1 | TRIGGER DETECTION CONDITION | VALUE AT ADDRESS [X10] EXCEEDS 1 |
| | TRANSMISSION UPON TRIGGER DETECTION | YES<br>TRIGGER SHARING COUNTERPART: DEVICES MANAGED BY CENTRAL PROCESSING UNIT [21] |
| | LOGGING UPON RECEIPT OF TRIGGER | YES |
| 2 | TRIGGER DETECTION CONDITION | VALUE AT ADDRESS [X20] EXCEEDS 1 |
| | TRANSMISSION UPON TRIGGER DETECTION | YES<br>TRIGGER SHARING COUNTERPART: ALL DEVICE |
| | LOGGING UPON RECEIPT OF TRIGGER | YES |

| TRIGGER INFORMATION ||
|---|---|
| SHARING INFORMATION | GENERATOR : LOGGING DEVICE [41] |
| | TRANSMITTER : NETWORK UNIT [24] |
| | DESTINATION : LOGGING UNIT [23] |
| TRIGGER ID | TRIG001 |

FIG.39

| TRIGGER SHARING INFORMATION ⸺2131 | |
|---|---|
| GENERATOR CONDITION | LOGGING DEVICE [42] |
| | CONTROLLABLE DEVICE [32] |
| TRANSMITTER CONDITION | LOGGING UNIT [23] |
| | NETWORK UNIT [24] |
| ⋮ | ⋮ |

FIG.40

| TRIGGER INFORMATION | | |
|---|---|---|
| SHARING INFORMATION | GENERATOR : LOGGING DEVICE [41] | |
| | TRANSMITTER : CENTRAL PROCESSING UNIT [21] | |
| | DESTINATION : LOGGING UNIT [23] | |
| TRIGGER ID | TRIG001 | |

FIG.41

| TRIGGER SETTING INFORMATION | ⸺501 |
|---|---|
| GENERATOR CONDITION | LOGGING DEVICE [42] |
| | CONTROLLABLE DEVICE [32] |
| TRANSMITTER CONDITION | CENTRAL PROCESSING UNIT [21] |
| ⋮ | ⋮ |

FIG.42

| TRIGGER INFORMATION | |
|---|---|
| SHARING INFORMATION | REMAINING RELAYING COUNT: 4 |
| TRIGGER ID | TRIG001 |

FIG.49

| SELECT | START DATE AND TIME | END DATE AND TIME | LOGGING DEVICE | FILE NAME |
|---|---|---|---|---|
| ☑ | JAN. 30, 2021 11:00:15.030 | JAN. 30, 2021 12:00:18.030 | LOGGING UNIT [23] | 01.BIN |
| ☑ | JAN. 30, 2021 12:00:15.030 | JAN. 30, 2021 13:00:18.030 | LOGGING UNIT [23] | 02.BIN |
| ☐ | JAN. 30, 2021 16:00:15.030 | JAN. 30, 2021 13:00:18.030 | LOGGING UNIT [23] | 03.BIN |
| ⋮ | ⋮ | ⋮ | ⋮ | ⋮ |

TRIGGER RELAY UNIT OF PROGRAMMABLE CONTROLLER, TRIGGER TRANSMISSION SYSTEM, TRIGGER TRANSMISSION METHOD, AND RECORDING MEDIUM

CROSS-REFERENCE TO RELATED APPLICATION

This application is a national stage application, pursuant to 35 U.S.C. § 371, of International Patent Application No. PCT/JP2022/027627, filed Jul. 13, 2022, the entire contents of which are incorporated herein by reference.

TECHNICAL FIELD

The present disclosure relates to a trigger relay unit in a programmable controller, a trigger transmission system, a trigger transmission method, and a program.

BACKGROUND ART

At factories, many devices are controlled to automate processes. Such control of the devices undergoes various post-analyses including analyses of defects and operating efficiency. For efficient analysis, logging is used to record the history of data about control. Techniques have also been developed for sharing, among multiple devices, a trigger to start logging (for example, see Patent Literature 1).

CITATION LIST

Patent Literature

Patent Literature 1: Unexamined Japanese Patent Application Publication No. 2017-169288

SUMMARY OF INVENTION

Technical Problem

With the technique in Patent Literature 1, two devices share a trigger. However, at factory automation (FA) sites, many device are to share a trigger and individually perform logging for post-verification. Although the technique in Patent Literature 1 is effective when a single detector detects a trigger, a trigger typically generated upon an anomaly or an error can be detected in multiple devices at the same time. When each device detecting the trigger shares the trigger with other devices, the system including the many devices involves extra transmission of the generated trigger, possibly causing inappropriate logging.

Under such circumstances, an objective of the present disclosure is to perform appropriate logging with many devices that share a trigger.

Solution to Problem

To achieve the above objective, a trigger relay unit in a programmable controller according to an aspect of the present disclosure is connectable to a plurality of detectors to detect a trigger to log control data about device control. The trigger relay unit includes reception means for receiving a first trigger signal indicating the trigger from a first detector of the plurality of detectors, and transmission means for transmitting the first trigger signal to a second detector different from the first detector when the reception means receives the first trigger signal. The transmission means excludes, from a transmission target, a second trigger signal different from the first trigger signal and received by the reception means in a period from when the reception means receives the first trigger signal to when the transmission means completes transmitting the first trigger signal.

Advantageous Effects of Invention

The technique according to the above aspect of the present disclosure allows appropriate logging with many devices that share a trigger.

BRIEF DESCRIPTION OF DRAWINGS

FIG. 5 is a diagram of an example of log data and an example of logging duration information in Embodiment 1;
FIG. 13 is a diagram of an example of trigger setting information in Embodiment 1;
FIG. 14 is a diagram of an example of trigger sharing information in Embodiment 1;
FIG. 23 is a diagram of an example of trigger information in Embodiment 2;
FIG. 24 is a diagram of an example of trigger setting information in Embodiment 2.

FIG. 31 is a diagram of an example form for inputting conditions in Embodiment 4;

FIG. 38 is a diagram of an example of trigger information in Embodiment 7;

FIG. 39 is a diagram of an example of trigger sharing information in Embodiment 7;

FIG. 40 is a diagram of an example of trigger information in Embodiment 8;

FIG. 41 is a diagram of an example of trigger setting information in Embodiment 8;

FIG. 42 is a diagram of an example of trigger information in Embodiment 9;

FIG. 49 is a table indicated by the indicator in a modification; and

DESCRIPTION OF EMBODIMENTS

A log data analysis support system according to one or more embodiments of the present disclosure is described in detail below with reference to the drawings.

Embodiment 1

Figure 1:
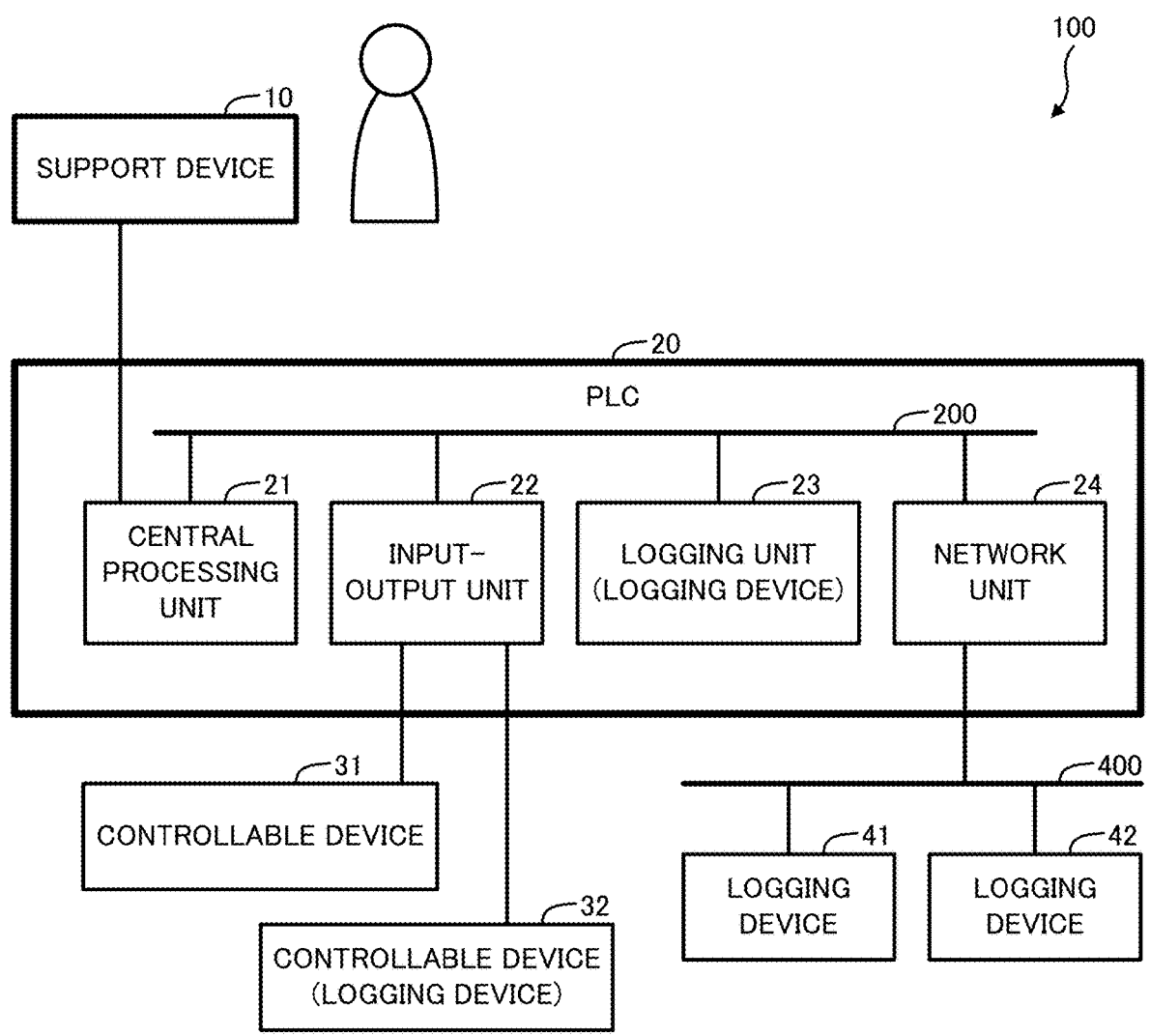
FIG. 1 is a block diagram of a log data analysis support system according to Embodiment 1.

A log data analysis support system 100 according to the present embodiment supports log data analysis performed by a user. As illustrated in FIG. 1, the log data analysis support system 100 includes a support device 10 that supports analysis by providing the user with information for log data recorded during device control, a programmable logic controller (PLC) 20 that controls controllable devices 31 and 32, and logging devices 41 and 42 connected to the PLC 20 with an industrial network 400.

The support device 10 is a computer that is typically a personal computer (PC) with a user interface (UI). The support device 10 is connected to a central processing unit 21 of the PLC 20 with a communication line such as a universal serial bus (USB) cable or a network such as a local area network (LAN) to communicate with the central processing unit 21. The support device 10 executes application software referred to as an engineering tool to allow the user to create, edit, and write a control program to be executed by the central processing unit 21. This engineering tool further allows the user to easily analyze log data stored in multiple logging devices in a distributed manner.

The PLC 20 includes the central processing unit 21 that executes a control program to perform device control, an input-output unit 22 that receives inputs from external devices and outputs information to the external devices, a logging unit 23 that logs data, and a network unit 24 for connection with the industrial network 400. The network unit 24 is connected to the logging devices 41 and 42 with the industrial network 400. The PLC 20 corresponds to an example of a programmable controller.

The central processing unit 21, the input-output unit 22, the logging unit 23, and the network unit 24 are connected to one another with a PLC bus 200 to transmit and receive signals. The PLC 20 is a control device in the form of a function block implemented when the central processing unit 21, the input-output unit 22, the logging unit 23, and the network unit 24 are attached to a base unit (not illustrated).

The central processing unit 21 executes the control program, typically a ladder program, to control the controllable devices 31 and 32 with the input-output unit 22. More specifically, the central processing unit 21 generates an operation instruction for the controllable device 32 that is a logging device based on an input of a sensing result from the controllable device 31 that is a sensor, and outputs the operation instruction to the controllable device 32. The operation of the controllable device 32 to be performed based on the operation instruction may be or may not be logging. The central processing unit 21 controls multiple devices including the controllable devices 31 and 32 to cause these devices to cooperate with one another, achieving, for example, transportation, machining process, and inspection of workpieces on a production line.

The input-output unit 22 is connected to the controllable devices 31 and 32 with a signal line to transmit current signals or voltage signals or a cable to transmit digital data.

The logging unit 23 is included in the PLC 20, and logs control data about the device control performed by the PLC 20. The logging unit 23 may have the same functions as the input-output unit 22 and log control data input into and output from devices connected to the logging unit 23. The logging unit 23 may have the same functions as the network unit 24 and log control data transmitted and received through the industrial network. The logging unit 23 may log data shared with the central processing unit 21 through the PLC bus 200 without being connected to a device external to the PLC 20.

The network unit 24 includes a network interface circuit for connection with the logging devices 41 and 42. The network unit 24 communicates with the central processing unit 21 through the PLC bus 200 to relay communication between the logging devices 41 and 42 and the central processing unit 21. Similarly to the controllable devices 31 and 32, the logging devices 41 and 42 may be controlled by the central processing unit 21, or may be other PLCs to control devices in cooperation with the PLC 20.

Although FIG. 1 illustrates one or two components for each type of component, the number of components is not limited to this example. More specifically, the PLC 20 may include multiple input-output units 22, multiple logging units 23, and multiple network units 24. Multiple central processing units 21 may be connected to the PLC bus 200 to cooperate with one another. One or more than two devices may be connected to the input-output unit 22. One or more than two devices may be connected to the network unit 24 with the industrial network 400.

Among the components associated with the PLC 20, the logging unit 23, the controllable device 32, and the logging devices 41 and 42 have the function of logging control data. More specifically, the controllable device 32 records data transmitted between the controllable device 32 and the input-output unit 22 or data that changes during internal processing of the controllable device 32. The logging devices 41 and 42 record data transmitted through the industrial network 400 or data used during internal processing of the logging devices 41 and 42.

Hereafter, the logging unit 23, the controllable device 32, and the logging devices 41 and 42 each with the logging function may be referred to as logging devices 50 without being distinguished from one another. Logging performed by the logging devices 50 records the history of control data about device control used by the logging devices 50. The control data is, for example, stored in a memory included in each logging device 50 at an address preset as a logging target. The history of the control data is generated when values read from the address at preset intervals are successively and additionally written into a storage area for logging. The history thus indicates the trend of these values. The intervals at which the control data is repeatedly read are predetermined.

Figure 2:
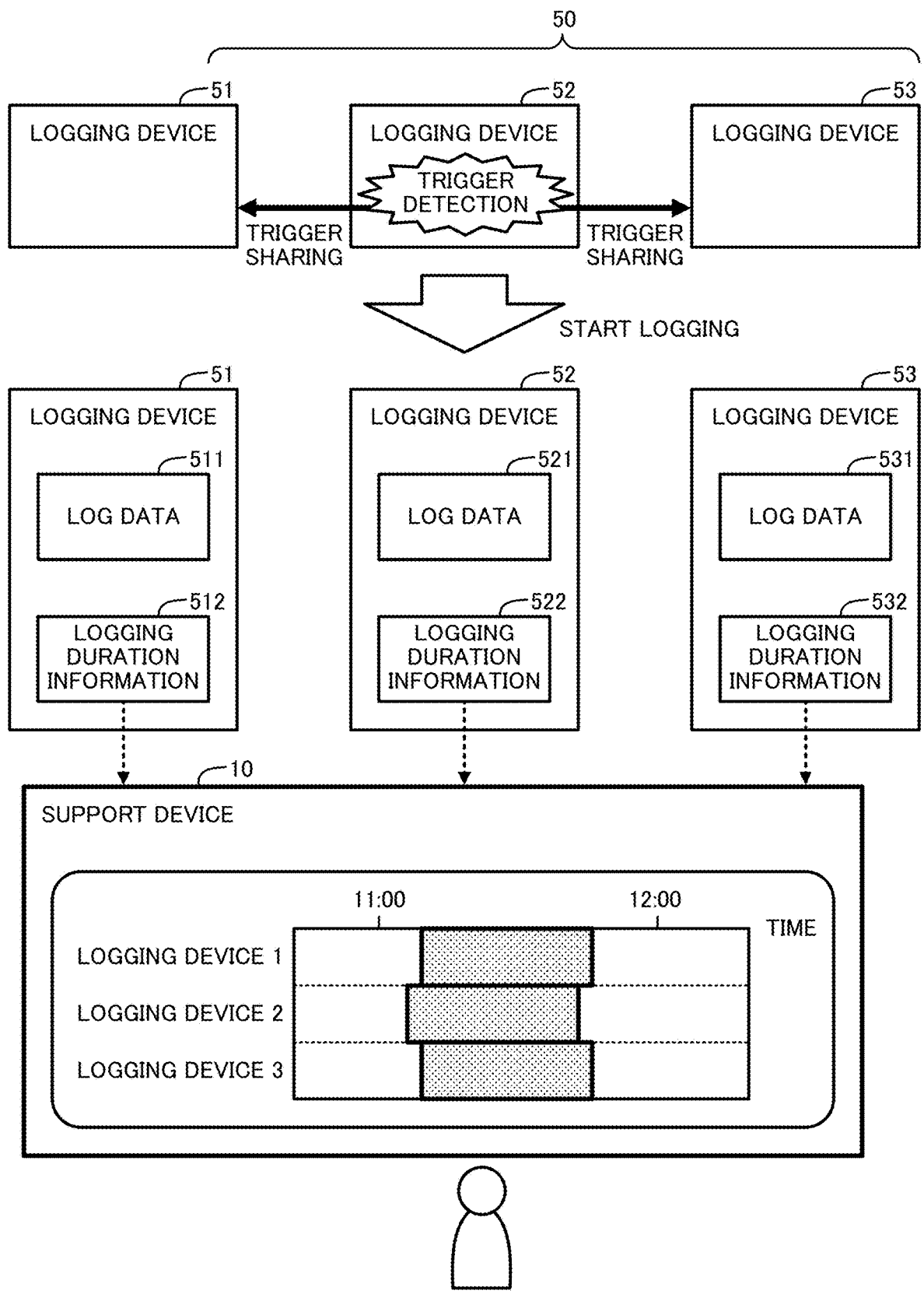
FIG. 2 is a schematic diagram of a process for logging in Embodiment 1.

Logging performed by the multiple logging devices 50 is briefly described with reference to FIG. 2. Logging devices 51, 52, and 53 illustrated in FIG. 2 are examples of the logging devices 50. More specifically, each of the logging devices 51, 52, and 53 corresponds to any of the logging unit 23, the controllable device 32, and the logging devices 41 and 42 illustrated in FIG. 1.

As illustrated in FIG. 2, when the logging device 52 detects a trigger indicating a start of logging, the logging device 52 shares the detected trigger with the logging devices 51 and 53. The logging devices 51 to 53 sharing the trigger start generating log data sets 511, 521, and 531 substantially at the same time. The log data sets 511, 521, and 531 may be generated based on logging started upon detection or reception of the trigger, or generated using data before detection or reception of a trigger based on constantly logged data in a ring buffer independently of whether the trigger is obtained. Control data is logged for a predetermined logging duration to complete generation of the log data sets 511, 521, and 531. The logging devices 51 to 53 then generate and store logging duration information items 512, 522, and 532 indicating the logging durations taken to generate the log data sets 511, 521, and 531. In the example described below, the logging duration information items 512, 522, and 532 are generated immediately after the log data sets 511, 521, and 531 are generated, but may be generated at any appropriate timing.

Before providing the log data sets 511, 521, and 531, the logging devices 51, 52, and 53 provide the logging duration information items 512, 522, and 532 to the support device 10 in response to a request from the support device 10. The support device 10 displays, to the user, a list of logging durations corresponding to the log data sets 511, 521, and 531 stored in the logging devices 51 to 53 in a distributed manner to allow the user to easily determine the logging durations corresponding to the log data sets 511, 521, and 531.

Figure 3:
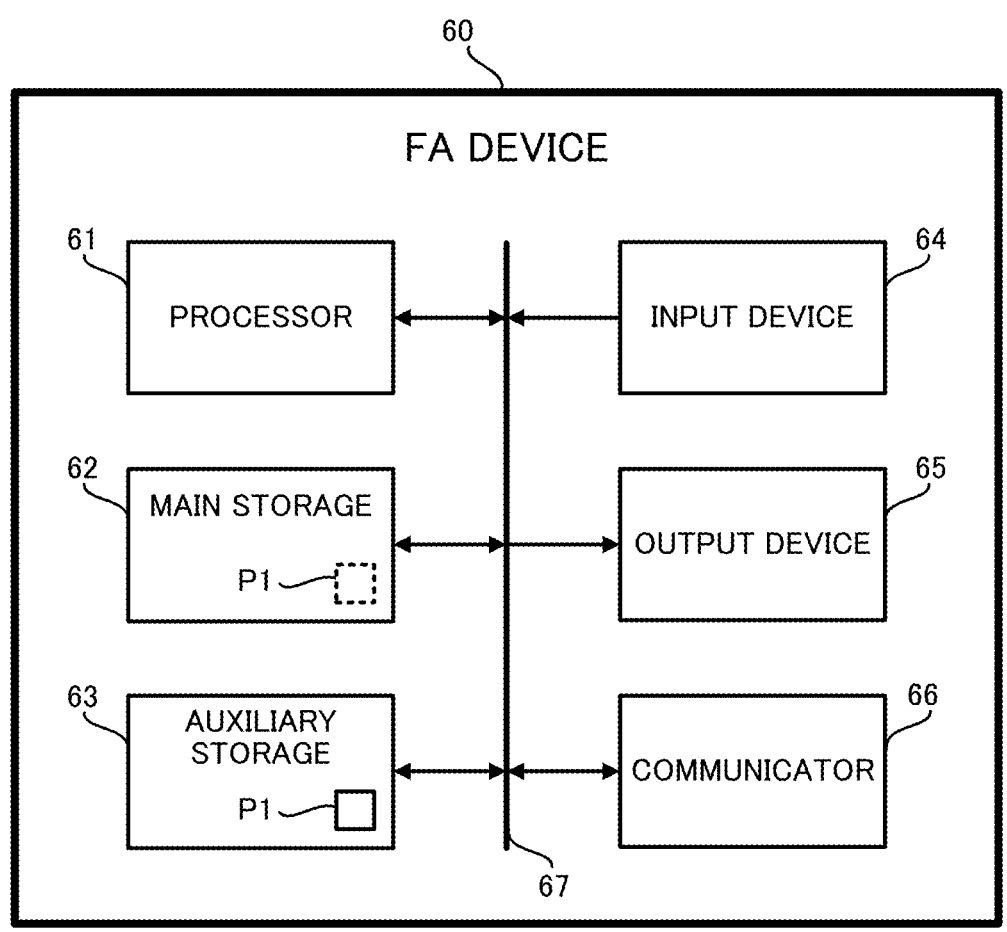
FIG. 3 is a diagram of an FA device in Embodiment 1, illustrating the hardware configuration.

As described above, the logging devices 50 that provide the logging durations, the support device 10 that displays the logging durations, and the central processing unit 21 that mediates communication between the logging devices 50 and the support device 10 are each implemented with hardware components for functioning as a computer. More specifically, as illustrated in FIG. 3, a factory automation (FA) device 60 corresponding to each logging device 50, the support device 10, and the central processing unit 21 includes a processor 61, a main storage 62, an auxiliary storage 63, an input device 64, an output device 65, and a communicator 66. The main storage 62, the auxiliary storage 63, the input device 64, the output device 65, and the communicator 66 are connected to the processor 61 with an internal bus 67.

The processor 61 includes a central processing unit (CPU) or a micro processing unit (MPU) as a processing circuit. The processor 61 executes a program P1 stored in the auxiliary storage 63 to implement various functions and perform the processing described later. The program P1 in the support device 10 corresponds to the engineering tool described above, and the program P1 in each of the central processing unit 21 and the logging devices 50 corresponds to firmware. In addition to the program P1, the processor 61 in the central processing unit 21 executes a control program.

The main storage 62 includes a random-access memory (RAM). The program P1 is loaded from the auxiliary storage 63 into the main storage 62. The main storage 62 is used as a work area for the processor 61.

The auxiliary storage 63 includes a nonvolatile memory, typically an electrically erasable programmable read-only memory (EEPROM) or a hard disk drive (HDD). The auxiliary storage 63 stores various sets of data used for processing in the processor 61 in addition to the program P1. The auxiliary storage 63 provides data to be used by the processor 61 to the processor 61 as instructed by the processor 61. The auxiliary storage 63 stores data provided by the processor 61.

The input device 64 is typically a hardware switch, an input key, a keyboard, or a pointing device. The input device 64 acquires information input by the user of the FA device 60 and provides the acquired information to the processor 61.

The output device 65 is typically a light-emitting diode (LED), a liquid crystal display (LCD), or a speaker. The output device 65 indicates various items of information to the user as instructed by the processor 61. The output device 65 may be integral with the input device 64 as a touchscreen.

The communicator 66 includes a network interface circuit for communicating with an external device. The communicator 66 receives a signal from the external device and outputs data indicated by the signal to the processor 61. The communicator 66 also transmits a signal indicating data output from the processor 61 to the external device. Although FIG. 3 illustrates the single communicator 66 as a typical example, the FA device 60 may include multiple communicators 66. For example, the FA device 60 that is the central processing unit 21 may separately include a communicator 66 to communicate with the support device 10 and a communicator 66 to communicate through the PLC bus 200.

Functional configurations of the logging devices 50, the central processing unit 21, and the support device 10 are sequentially described below. The functional configurations are implemented by the above hardware components cooperating with one another.

Figure 4:
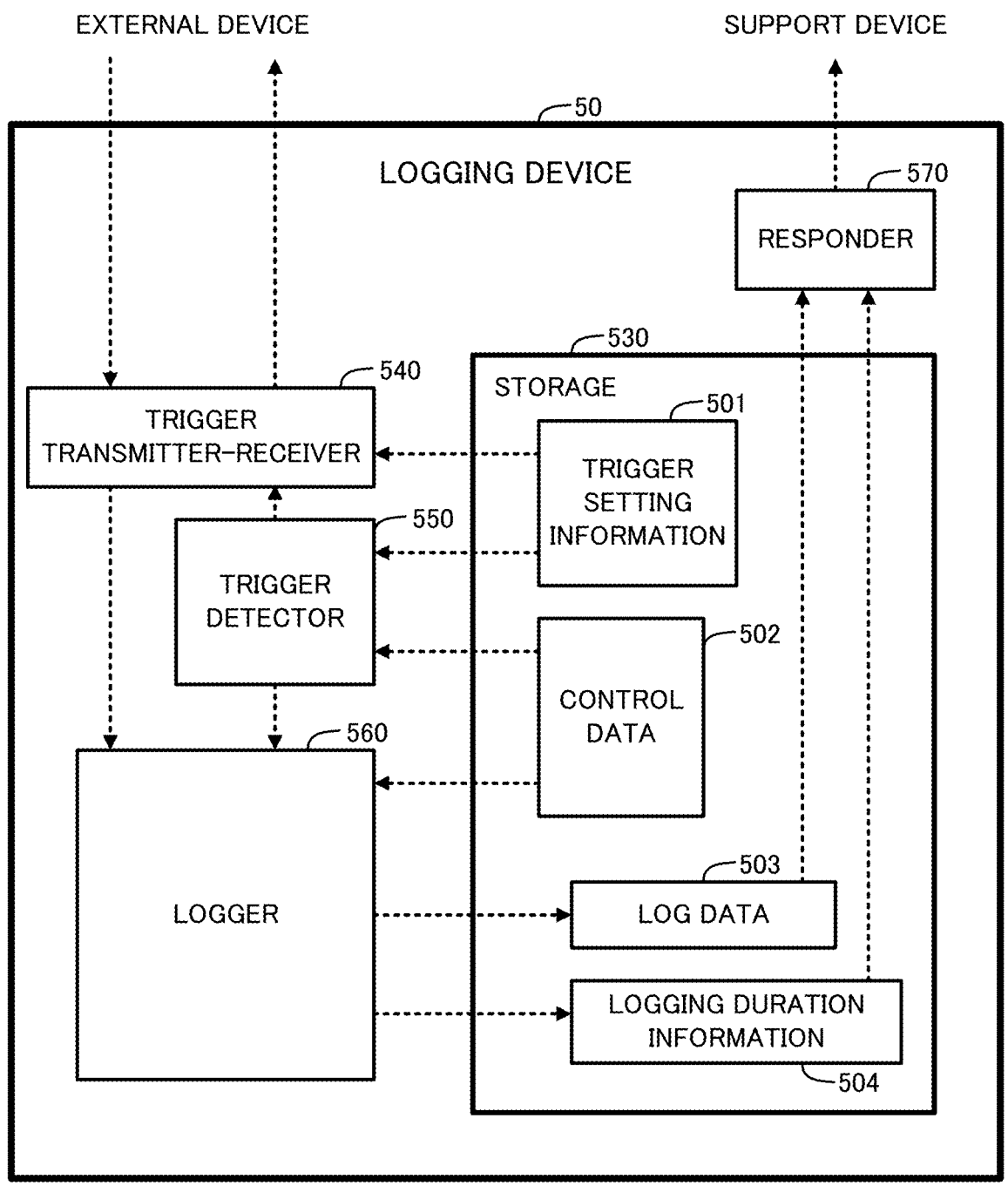
FIG. 4 is a functional block diagram of a logging device in Embodiment 1.

As illustrated in FIG. 4, each logging device 50 includes a storage 530 to store various sets of data, a trigger transmitter-receiver 540 to transmit and receive a trigger signal indicating a trigger to and from an external device, a trigger detector 550 for the logging device 50 to spontaneously detect a trigger, a logger 560 to generate log data, and a responder 570 to respond to a request from the support device 10. The logging device 50 corresponds to an example of a detector to detect a trigger.

The storage 530 is mainly implemented by at least one of the main storage 62 or the auxiliary storage 63 in the logging device 50. The storage 530 stores trigger setting information 501 about a trigger preset with the logging device 50 and control data 502 used by the logging device 50.

The trigger setting information 501 indicates conditions on which the logging device 50 detects a trigger. The trigger setting information 501 indicates whether a trigger shared from an external device is to be accepted and whether a trigger detected by the logging device 50 is to be provided to an external device. The trigger setting information 501 is pre-received by the logging device 50 from an external device and stored in the storage 530. The trigger setting information 501 may be received when the user operates the input device 64 in the logging device 50 or when a user operation on the support device 10 is transmitted through the central processing unit 21 and the communicator 66 in the logging device 50.

The control data 502 changes over time based on the device control performed by the PLC 20. The control data 502 corresponds to, for example, any of input data such as a sensing result used for control, intermediate data generated during processing of the input value, and control output data such as an operation command to the controllable device 32 generated from the input data or the intermediate data. The control data 502 may be a device value shared among multiple devices included in a control system with a method such as cyclic transmission.

The trigger transmitter-receiver 540 is mainly implemented by the processor 61 and the communicator 66 in the logging device 50 cooperating with each other. When receiving a trigger signal from an external device, the trigger transmitter-receiver 540 determines whether to output a trigger indicated by the received trigger signal to the logger 560 based on the trigger setting information 501. When a trigger is output from the trigger detector 550, the trigger transmitter-receiver 540 determines whether to transmit a trigger signal indicating the trigger to an external device based on the trigger setting information 501. The external device in this example corresponds to the central processing unit 21 as described later, but may include another logging device 50.

The trigger detector 550 is mainly implemented by the processor 61 in the logging device 50. The trigger detector 550 detects any satisfaction of a condition defined by the trigger setting information 501. When determining that the condition is satisfied, the trigger detector 550 notifies the trigger transmitter-receiver 540 and the logger 560 of the detection of a trigger. The condition on which a trigger is detected may be an excess of a value of the control data beyond a threshold, reception of an operation instruction indicating logging from the central processing unit 21, or another condition.

The logger 560 is mainly implemented by the processor 61 in the logging device 50. When receiving a trigger from either the trigger transmitter-receiver 540 or the trigger detector 550, the logger 560 cyclically reads the preset control data 502 to be logged and writes the control data 502 into the storage 530 as log data 503. The logger 560 creates logging duration information 504 indicating the logging duration in which the control data 502 is read to generate the log data 503 and writes the logging duration information 504 into the storage 530.

As illustrated in FIG. 5, the log data 503 is generated upon every input of a trigger, and the storage 530 may thus store multiple sets of log data 503. In the example illustrated in FIG. 5, each set of log data 503 has a file name. Each set of log data 503 indicates the date and time at which the control data is read in a manner associated with the values of the control data read from the address in the storage 530. The log data 503 may be the history of values read from a single address or the histories of values read from multiple addresses as indicated by 01.BIN in FIG. 5.

The logging duration information 504 indicates, for each set of log data 503, the file name of the log data 503, the start date and time of the logging duration, and the end date and time of the logging duration in a manner associated with one another. The start date and time of the logging duration information 504 is the date and time of the first recorded value included in the log data 503. The end date and time of the logging duration information 504 is the date and time of the last recorded value included in the log data 503. The logging duration information 504 is updated upon every generation of the log data 503, with a record corresponding to one row in FIG. 5 added.

Referring back to FIG. 4, the responder 570 is mainly implemented by the processor 61 and the communicator 66 in the logging device 50 cooperating with each other. In response to a request from the support device 10, the responder 570 reads the logging duration information 504 from the storage 530 and provides the logging duration information 504 to the support device 10. In response to a request from the support device 10, the responder 570 reads the log data 503 from the storage 530 and provides the log data 503 to the support device 10.

Figure 6:
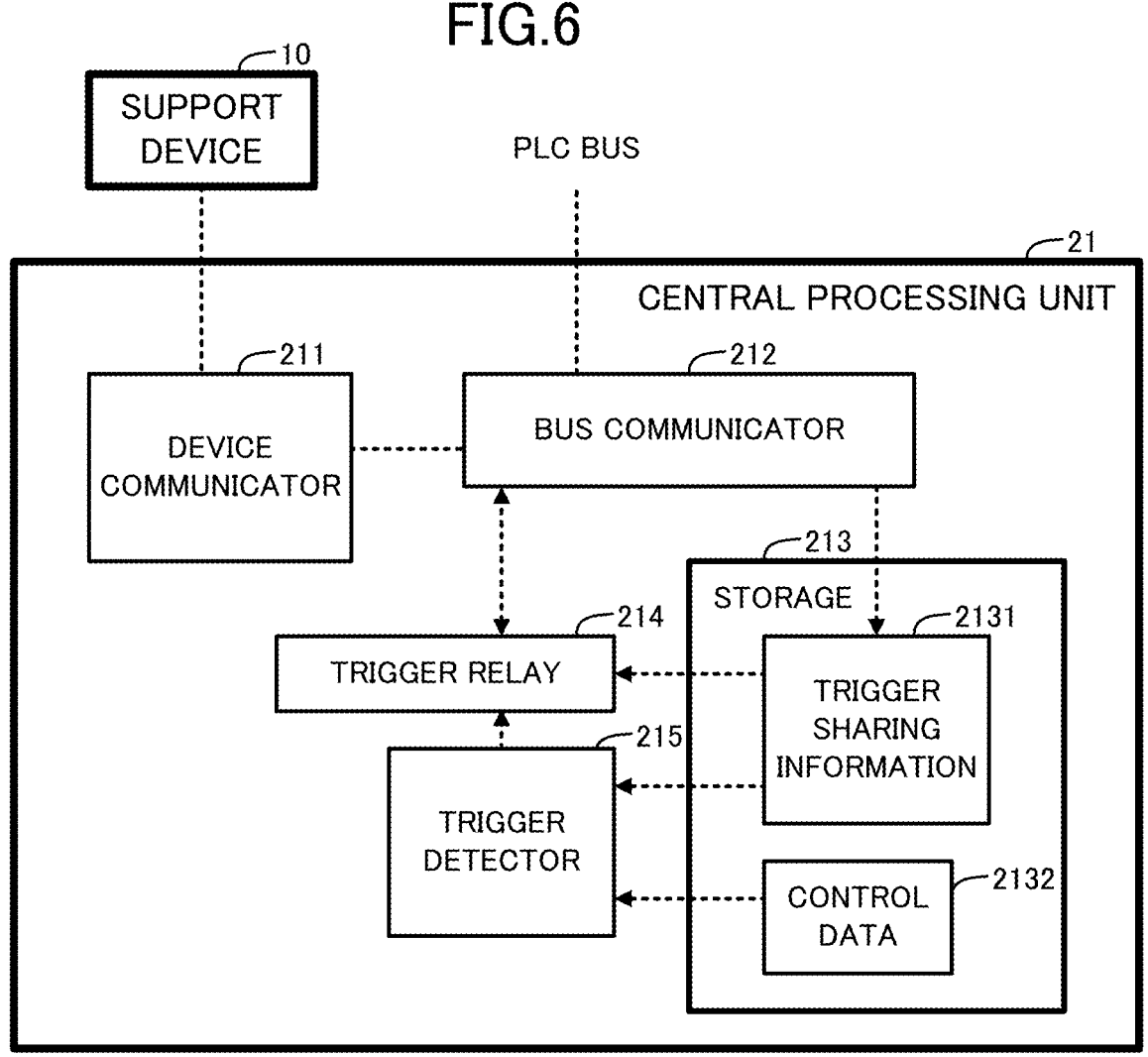
FIG. 6 is a functional block diagram of a central processing unit in Embodiment 1.

As illustrated in FIG. 6, the central processing unit 21 includes a device communicator 211 that communicates with the support device 10, a bus communicator 212 that performs communication through the PLC bus 200, a storage 213 that stores various sets of data, a trigger relay 214 that relays a trigger signal received from one logging device 50 to another logging device 50, and a trigger detector 215 for the central processing unit 21 to spontaneously detect a trigger. The device communicator 211 and the bus communicator 212 are each mainly implemented by the communicator 66 in the central processing unit 21. The central processing unit 21 corresponds to an example of a trigger relay unit included in a programmable controller and connectable to a plurality of detectors. The bus communicator 212 corresponds to an example of reception means for receiving a trigger signal.

The storage 213 is mainly implemented by at least one of the main storage 62 or the auxiliary storage 63 in the central processing unit 21. The storage 213 stores trigger sharing information 2131 preset with the central processing unit 21 for trigger sharing and stores control data 2132 used by the central processing unit 21. The trigger sharing information 2131 indicates a condition on which the central processing unit 21 detects a trigger and a trigger sharing counterpart. The trigger sharing counterpart is determined with reference to the trigger setting information 501 set with each logging device 50 to receive a trigger from an external device, as described later. The control data 2132 changes over time based on the device control performed by the central processing unit 21.

The trigger relay 214 is mainly implemented by the processor 61 in the central processing unit 21. When receiving a trigger signal from any of the logging devices 50 through the bus communicator 212, the trigger relay 214 transmits the trigger signal to the sharing counterpart defined in the trigger sharing information 2131. When receiving a trigger from the trigger detector 215, the trigger relay 214 transmits a trigger signal indicating the trigger to a sharing counterpart indicated by the trigger sharing information 2131. The trigger relay 214 corresponds to an example of transmission means for transmitting the trigger signal.

The trigger detector 215 is mainly implemented by the processor 61 in the central processing unit 21. The trigger detector 215 detects any satisfaction of a condition defined by the trigger sharing information 2131. When determining that the condition is satisfied, the trigger detector 215 notifies the trigger relay 214 of the detection of a trigger. In the example in FIG. 2, a trigger detected by any of the logging devices 50 is shared with the other logging devices 50. The trigger detected by the central processing unit 21 is also shared with the logging devices 50. The central processing unit 21 may eliminate the trigger detector 215.

Figure 7:
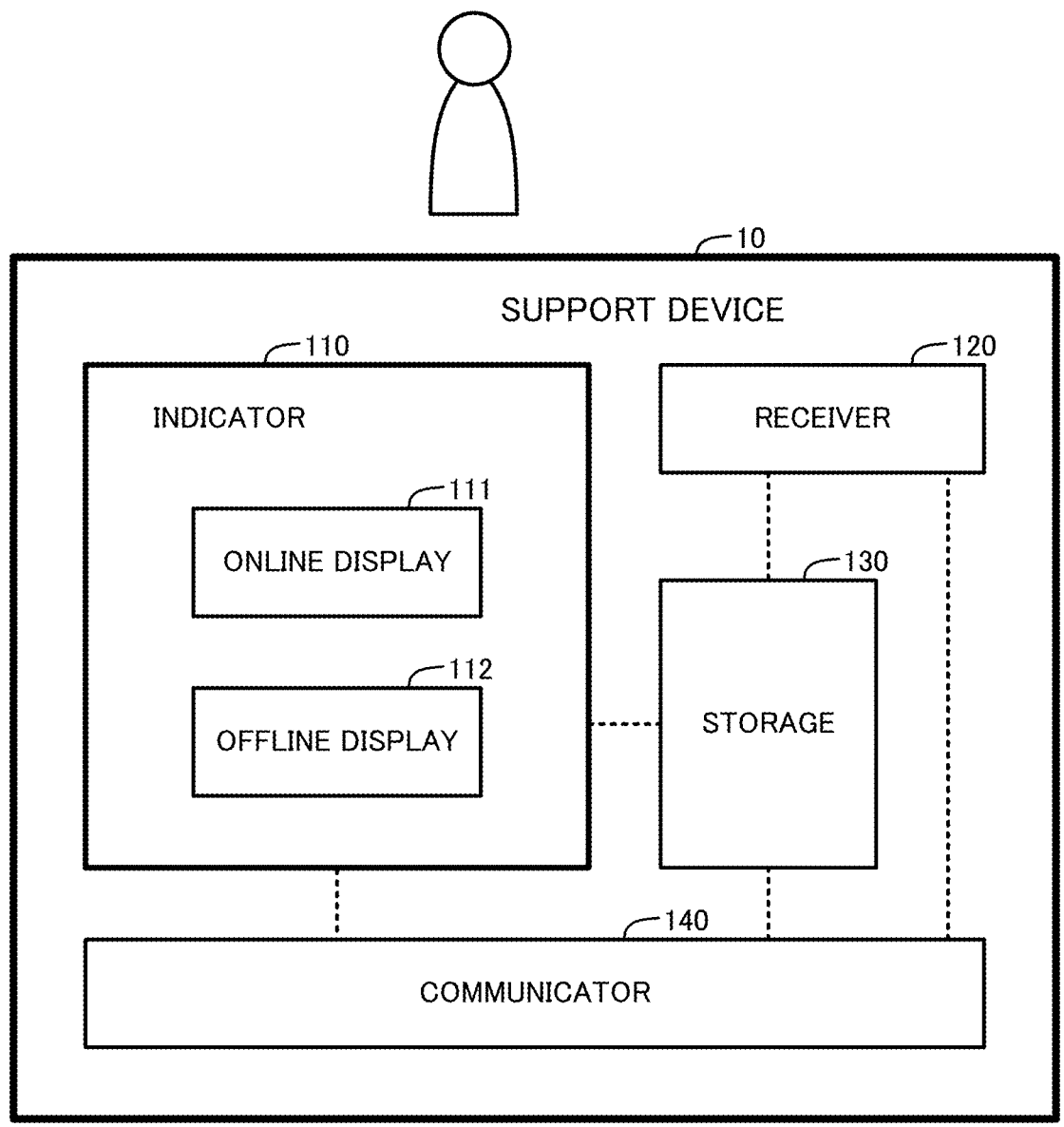
FIG. 7 is a functional block diagram of a support device in Embodiment 1.

As illustrated in FIG. 7, the support device 10 includes an indicator 110 that provides information about the log data 503 to the user, a receiver 120 that receives an input from the user, a storage 130 that stores various items of information, and a communicator 140 that communicates with the central processing unit 21.

The indicator 110 is mainly implemented by the processor 61 and the output device 65 in the support device 10 cooperation with each other. The indicator 110 includes an online display 111 that displays information in the online state in which the support device 10, the central processing unit 21, and each logging device 50 are connected, and an offline display 112 that displays information in the offline state in which the support device 10, the central processing unit 21, and each logging device 50 are disconnected.

Figure 8:
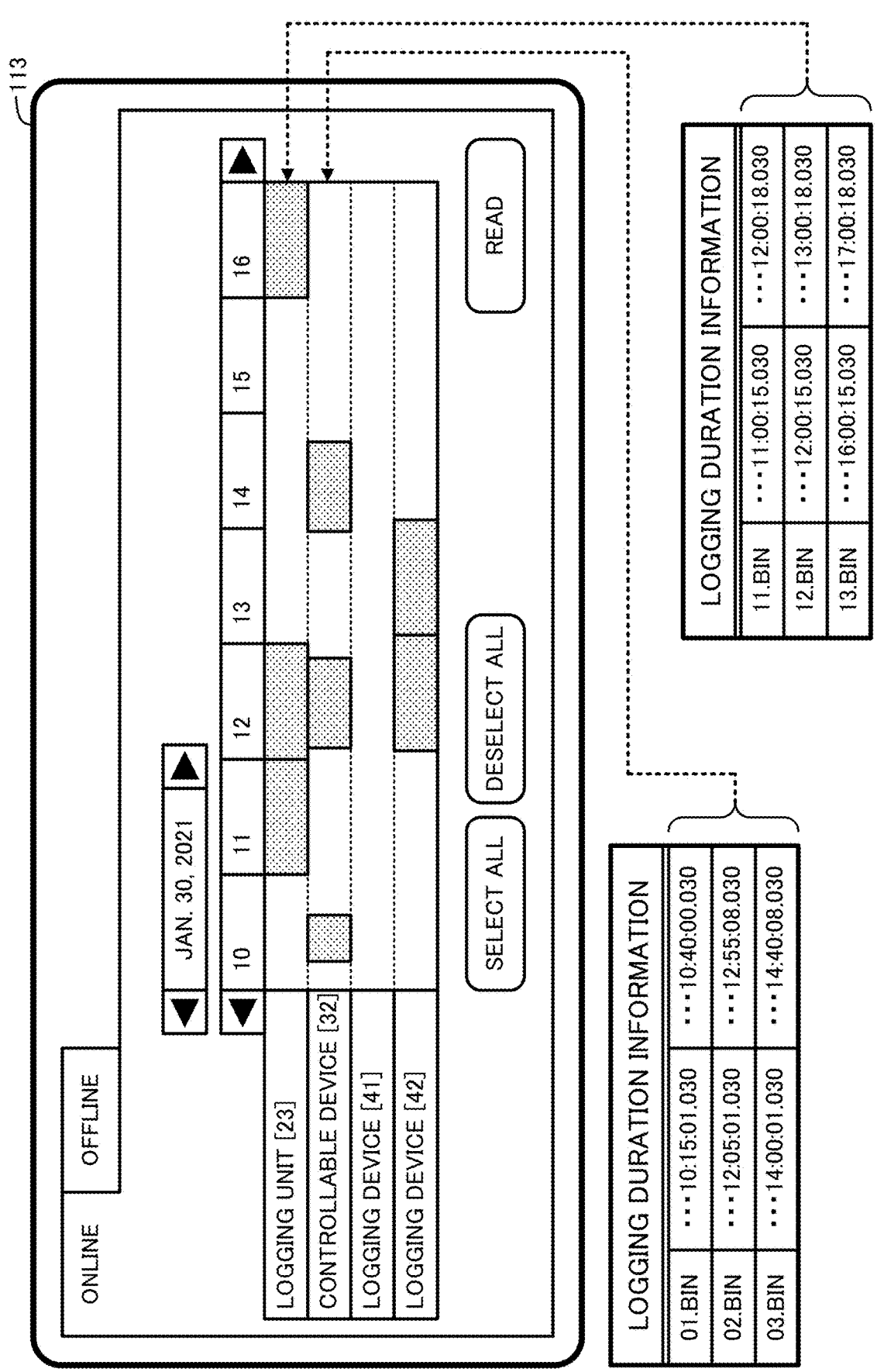
FIG. 8 is a diagram of a first example screen indicated by an indicator in Embodiment 1.

As illustrated in FIG. 8, the online display 111 displays a list of the logging durations of the logging devices 50 on a screen 113 based on the logging duration information 504 acquired from the logging devices 50 through the communicator 140. More specifically, the online display 111 displays objects corresponding to the logging durations indicated by the logging duration information 504 provided from the logging devices 50 on a plane defined by a first axis corresponding to the list of the logging devices 50 and a second axis corresponding to time. In the example in FIG. 8, hatched icons each in the shape of a rectangular strip are displayed as objects indicating the logging durations. The position of each object on the first axis indicates a device identifier (ID) for identifying the logging device 50 that has logged in the logging duration. The width of each object on the second axis indicates the span of the logging duration. In FIG. 8, the same numbers as the reference signs of the logging devices 50 are indicated as the device IDs. Each device ID may be any information that allows identification of the logging devices 50, such as an internet protocol (IP) address, a media access control (MAC) address, a code in the industrial network 400, other numbers, or a combination of any two or more of these.

Figure 9:
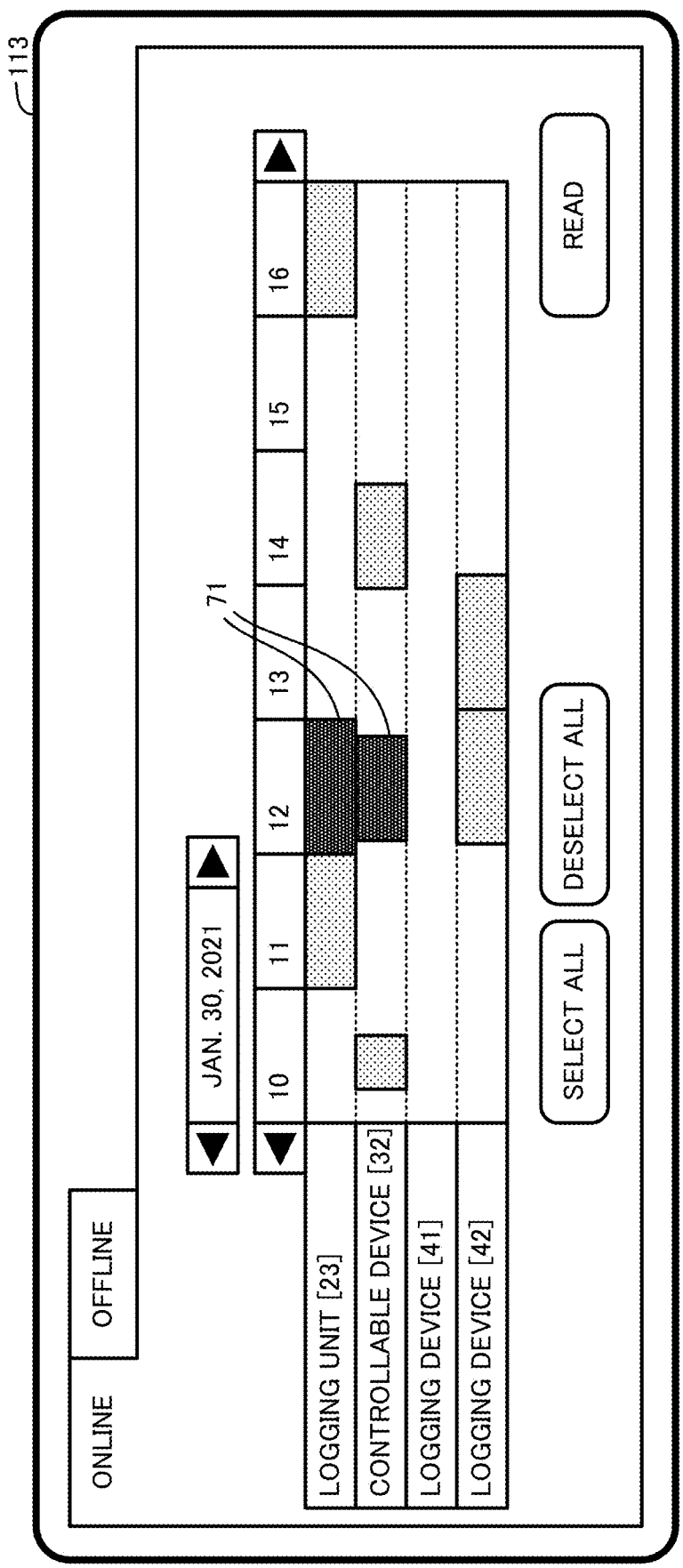
FIG. 9 is a diagram of a second example screen indicated by the indicator in Embodiment 1.

As illustrated in FIG. 9, when the user selects two objects 71 on the screen 113 by, for example, pressing or tapping, the receiver 120 receives the selection of the logging durations corresponding to the objects 71. The communicator 140 requests the logging devices 50 to provide log data corresponding to the selected logging durations and acquires the log data. In the example in FIG. 9, the logging unit 23 is requested to provide the log data 503 generated by logging in the logging duration from 12:00 to 13:00, and the controllable device 32 is requested to provide the log data 503 generated by logging in the logging duration from after 12 o'clock to before 13 o'clock.

Figure 10:
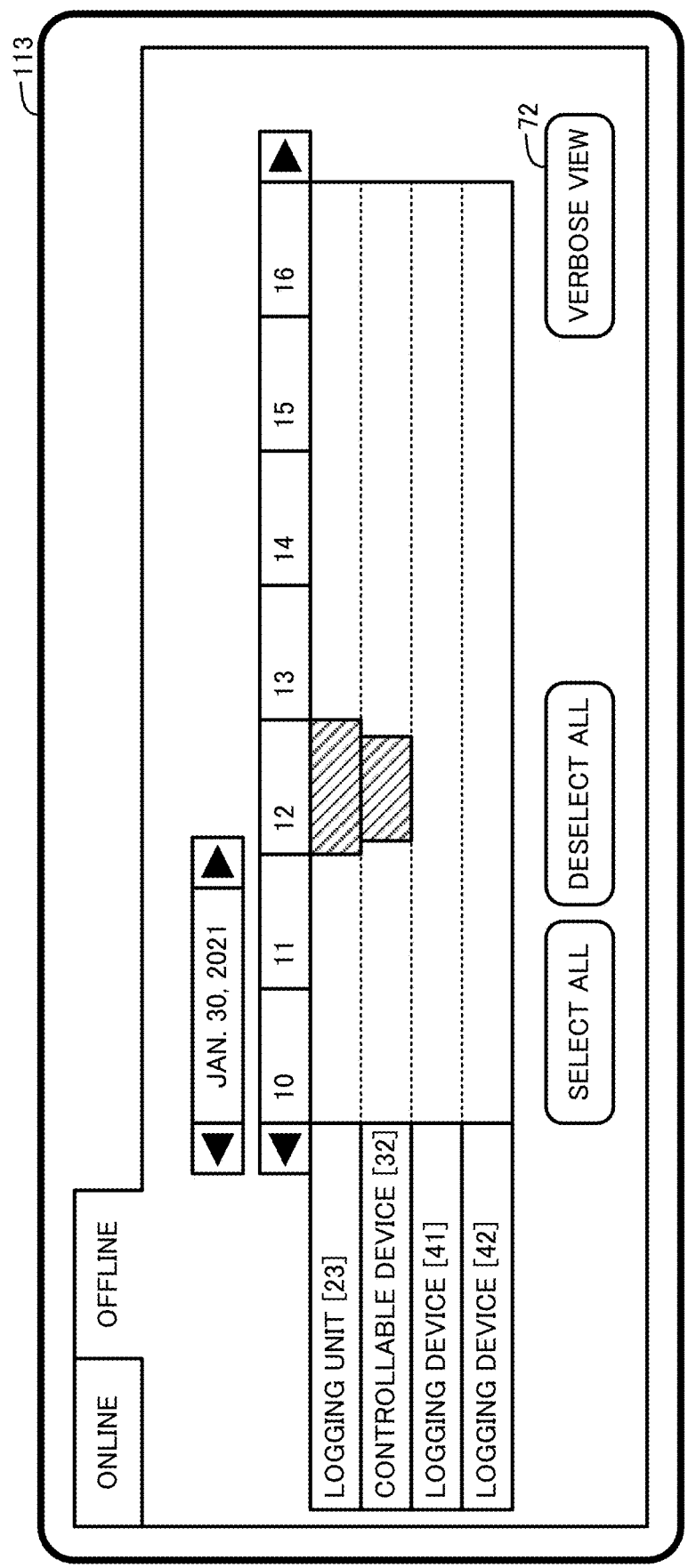
FIG. 10 is a diagram of a third example screen indicated by the indicator in Embodiment 1.

The offline display 112 displays information about the log data 503 imported in the support device 10. For example, the offline display 112 displays, on the screen 113 as illustrated in FIG. 10, a list of the corresponding logging durations of the log data acquired from the logging devices 50 with the selection illustrated in FIG. 9. The offline display 112 displays the logging durations in the same manner as the online display 111. More specifically, the offline display 112 displays objects corresponding to the imported log data on a plane defined by the vertical axis corresponding to the list of the logging devices 50 and the horizontal axis corresponding to time.

Figure 11:
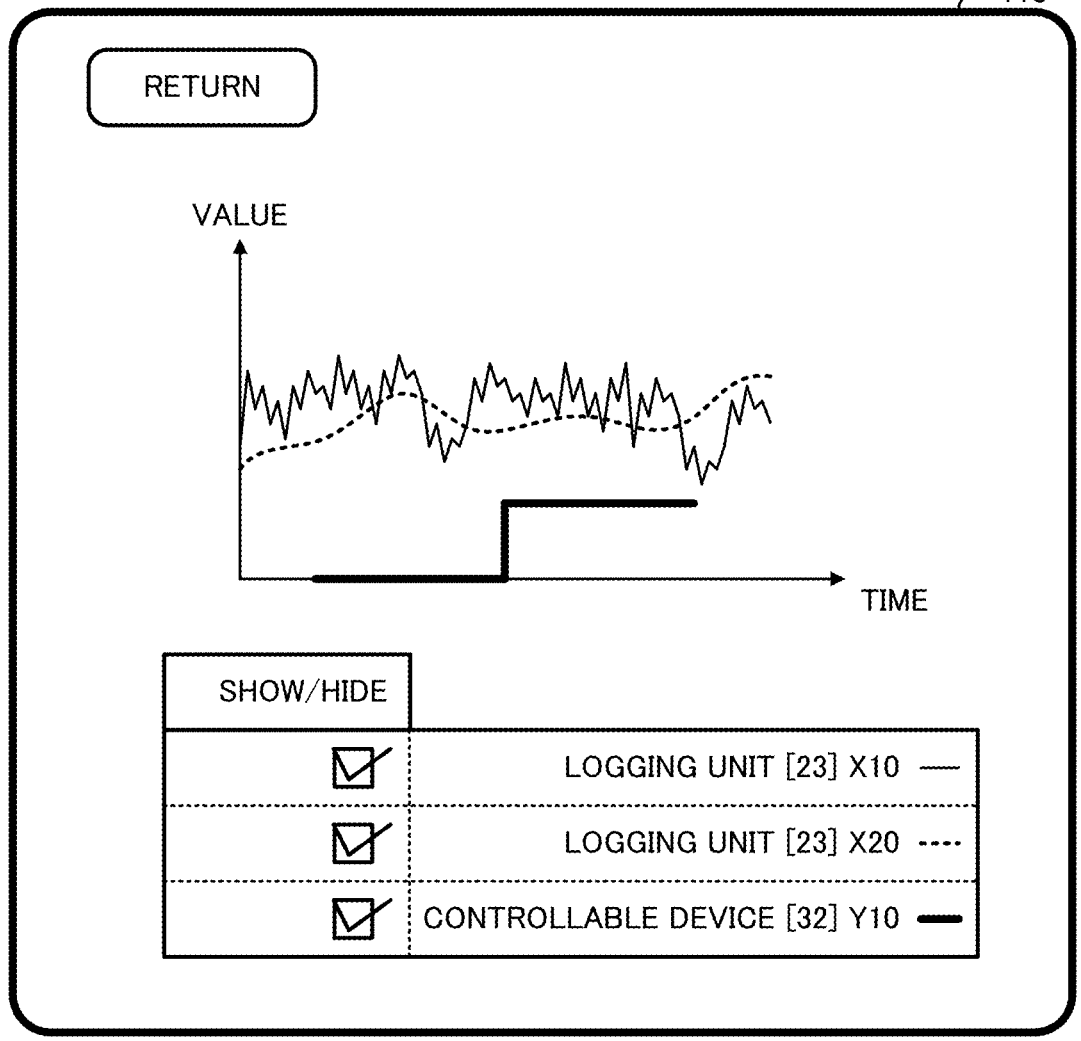
FIG. 11 is a diagram of a fourth example screen indicated by the indicator in Embodiment 1.

In the example in FIG. 10, when the user selects a button 72 with another object further selected, the offline display 112 displays the details of the log data 503 corresponding to the selected objects as illustrated in FIG. 11. In the example in FIG. 11, three graphs indicate the trend of values included in the log data 503 using a time axis common to the graphs.

Referring back to FIG. 7, the receiver 120 is mainly implemented by the processor 61 and the input device 64 in the support device 10. The storage 130 is mainly implemented by the auxiliary storage 63 in the support device 10. The storage 130 stores the log data 503 and the logging duration information 504 acquired from the logging device 50. The storage 130 provides the logging duration information 504 and the log data 503 in response to a request from the indicator 110.

The communicator 140 is mainly implemented by the processor 61 and the communicator 66 in the support device 10 cooperating with each other. The communicator 140 acquires the logging duration information 504 from each logging device 50, and provides the logging duration information 504 to the indicator 110 and the storage 130. The communicator 140 further acquires, from each logging device 50, the log data 503 corresponding to the selected logging duration received by the receiver 120 and provides the acquired log data 503 to the indicator 110 and the storage 130.

The process performed by the log data analysis support system 100 is now described with reference to FIGS. 12 to 18.

Figure 12:
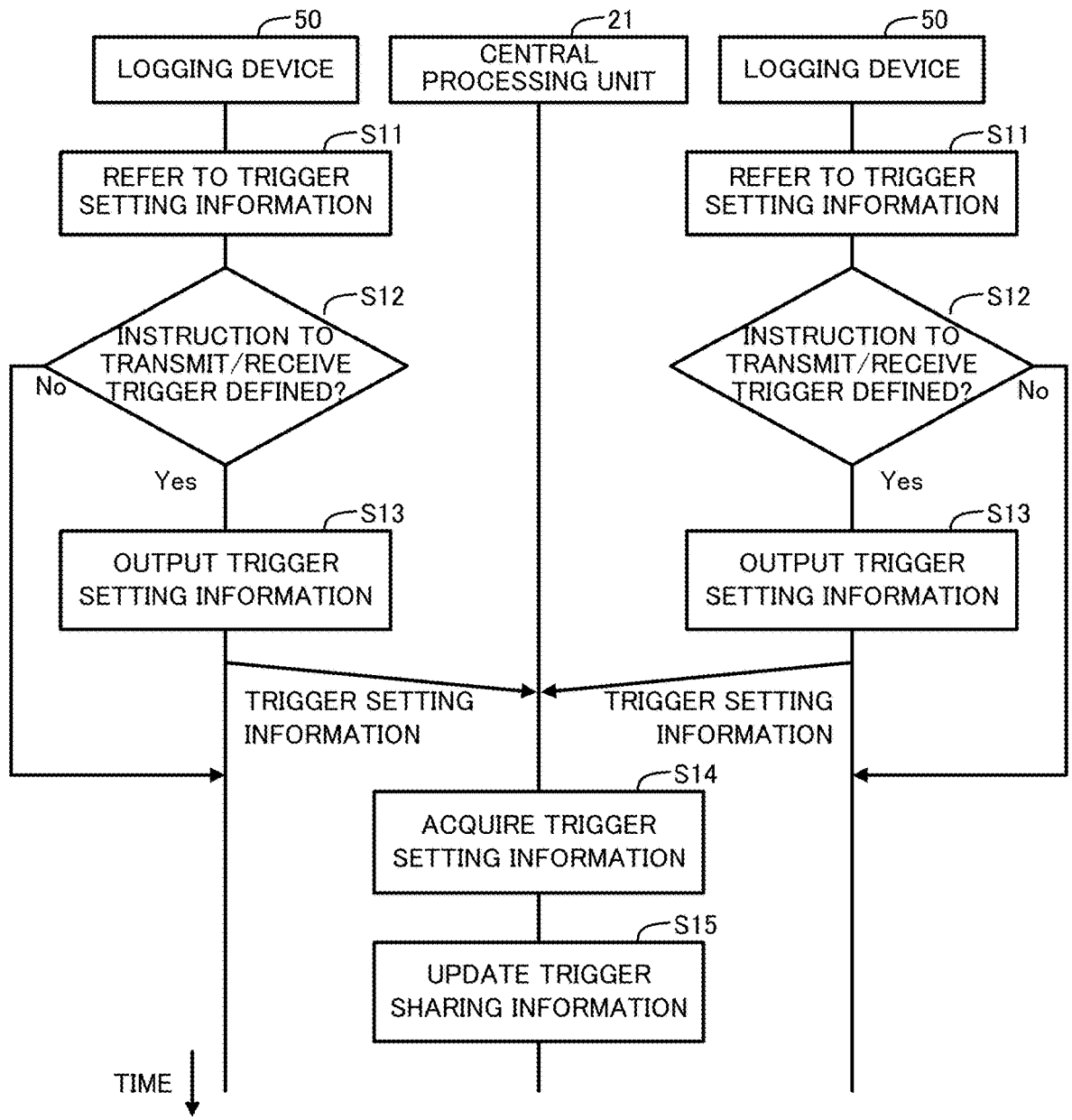
FIG. 12 is a flowchart of a process performed upon starting a system according to Embodiment 1.

FIG. 12 illustrates the flowchart of preparation for sharing a trigger at the activation of the log data analysis support system. As illustrated in FIG. 12, each logging device 50 refers to the trigger setting information 501 stored in the storage 530 in the logging device 50 (step S11). As illustrated in the example in FIG. 13, the trigger setting information 501 indicates a trigger detection condition, whether to perform transmission upon detection of a trigger, and whether to perform logging upon receipt of a trigger.

The logging device 50 then determines whether the trigger setting information 501 referred in step S11 defines an instruction to transmit and receive a trigger (step S12). More specifically, the logging device 50 yields affirmative determination in step S12 when the trigger setting information 501 defines at least one of transmission of a trigger upon detection or logging upon receipt of a trigger.

When the determination in step S12 is affirmative (Yes in step S12), the logging device 50 outputs the trigger setting information 501 to the central processing unit 21 (step S13). The output of the trigger setting information 501 may be transmission to the central processing unit 21 or storage into a storage device to which the central processing unit 21 can refer. When the determination in step S12 is negative (No in step S12), or more specifically, when the trigger setting information 501 defines non-transmission or non-reception of a trigger, the logging device 50 does not output the trigger setting information 501.

The central processing unit 21 acquires the trigger setting information 501 provided from each logging device 50 (step S14) and updates the trigger sharing information 2131 (step S15). More specifically, as illustrated in FIG. 14, the trigger sharing information 2131 is changed to indicate whether each logging device 50 outputting the trigger setting information 501 transmits a trigger signal and whether each logging device 50 receives an external trigger signal and performs logging. Thus, the trigger sharing information 2131 indicates the logging device 50 that is a potential transmitter of a trigger signal and the logging device 50 with which a trigger signal is shared.

The central processing unit 21 may inquire of each logging device 50 about the model or the model number of the logging device 50 to determine whether the model or the model number of the logging device 50 has the function of sharing a trigger or transmitting or receiving a trigger signal. When the trigger setting information 501 is provided from a logging device 50 with the model or the model number having no such functions, the central processing unit 21 may output an error indicating that the trigger setting information 501 is set erroneously.

Figure 15:
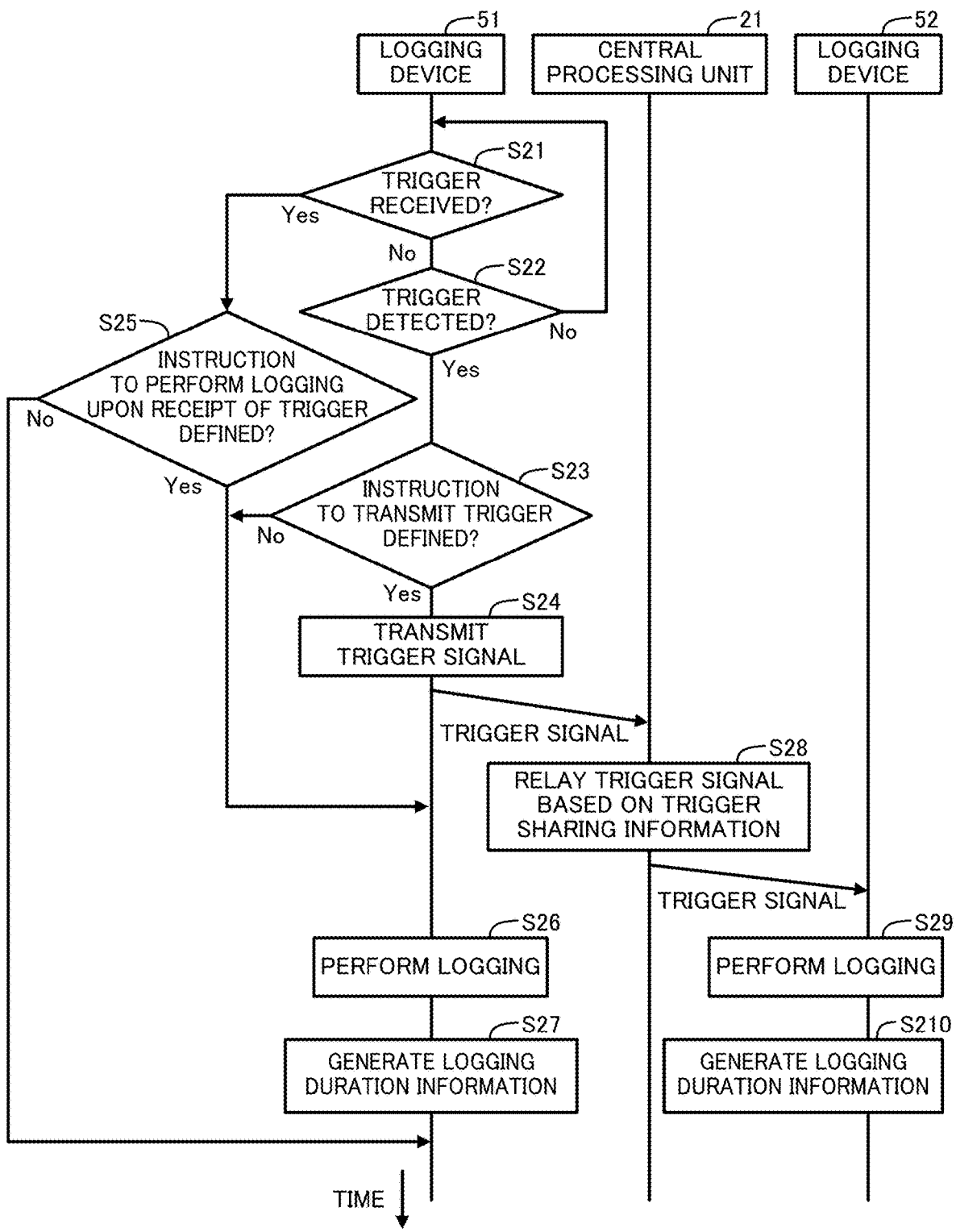
FIG. 15 is a flowchart of first trigger sharing in Embodiment 1.

FIG. 15 illustrates the flowchart of sharing a trigger signal from the logging device 51. As illustrated in FIG. 15, the logging device 51 determines whether the logging device 51 has received a trigger signal (step S21). When determining that no trigger signal has been received (No in step S21), the logging device 51 determines whether the logging device 51 has detected a trigger (step S22). When determining that no trigger has been detected (No in step S22), the logging device 51 repeats step S21 and subsequent steps to monitor any reception and any detection of a trigger.

When determining that a trigger has been detected in step S22 (Yes in step S22), the logging device 51 refers to the trigger setting information 501 from the storage 530 and determines whether the trigger setting information 501 defines an instruction to transmit a trigger signal (step S23). When determining that the trigger setting information 501 defines an instruction to transmit a trigger signal (Yes in step S23), the logging device 51 transmits a trigger signal to the central processing unit 21 (step S24).

When determining that a trigger signal has been received in step S21 (Yes in step S21), the logging device 51 determines whether the trigger setting information 501 defines an instruction to perform logging upon receipt of a trigger signal (step S25). When determining that the trigger setting information 501 defines an instruction to perform logging upon receipt of a trigger signal (Yes in step S25), when determining that the trigger setting information 501 does not define an instruction to transmit a trigger signal in step S23 (No in step S23), or after step S24, the logging device 51 performs logging as defined by the trigger setting information 501 (step S26). The log data 503 is thus generated. The logging device 51 generates the logging duration information 504 indicating the logging duration of the log data 503 generated in step S26 (step S27). More specifically, the logging device 51 generates a record indicating the logging duration and adds the record to the logging duration information 504.

When determining that an instruction to perform logging upon receipt of a trigger signal is not defined in step S25 (No in step S25), the logging device 51 does not perform logging.

When a trigger signal is transmitted in step S24, the central processing unit 21 receives the trigger signal and relays the trigger signal based on the trigger sharing information 2131 (step S28). More specifically, the central processing unit 21 transmits the trigger signal to the logging device 50 indicated by the trigger sharing information 2131 to perform logging upon receipt of a trigger signal. FIG. 15 illustrates the logging device 52 as a typical example of the logging device 50 to which a trigger signal is transmitted from the central processing unit 21.

When receiving the trigger signal from the central processing unit 21, the logging device 52 performs processing similar to the processing in steps S21 to S25 performed by the logging device 51. When an instruction to perform logging upon receipt of a trigger signal is defined, the logging device 52 performs logging (step S29) and generates the logging duration information 504 (step S210). Thus, the logging devices 51 and 52 generate the log data 503 and the logging duration information 504 in response to each other.

When the trigger setting information 501 does not define an instruction to perform logging upon receipt of a trigger signal, the logging device 52 may not perform logging. In this process, the central processing unit 21 receives the trigger signal and transmits the trigger signal to the logging device 50 that performs logging. However, the logging device 52 with which the trigger signal is shared does not perform logging upon receipt of the trigger signal when the trigger setting information 501 in the logging device 52 is changed subsequent to reflection of the trigger setting information 501 in the logging device 52 on the trigger sharing information 2131 in the activation process in FIG. 12.

In FIG. 15, the logging device 52 performs steps S29 and S210. These steps performed by the logging device 52 are typical steps in the process similarly performed by the logging device 51. More specifically, the logging device 52 performs steps S21 to S27 similarly to the logging device 51. Each of the logging devices 51 and 52 may be any of the multiple logging devices 50.

Figure 16:
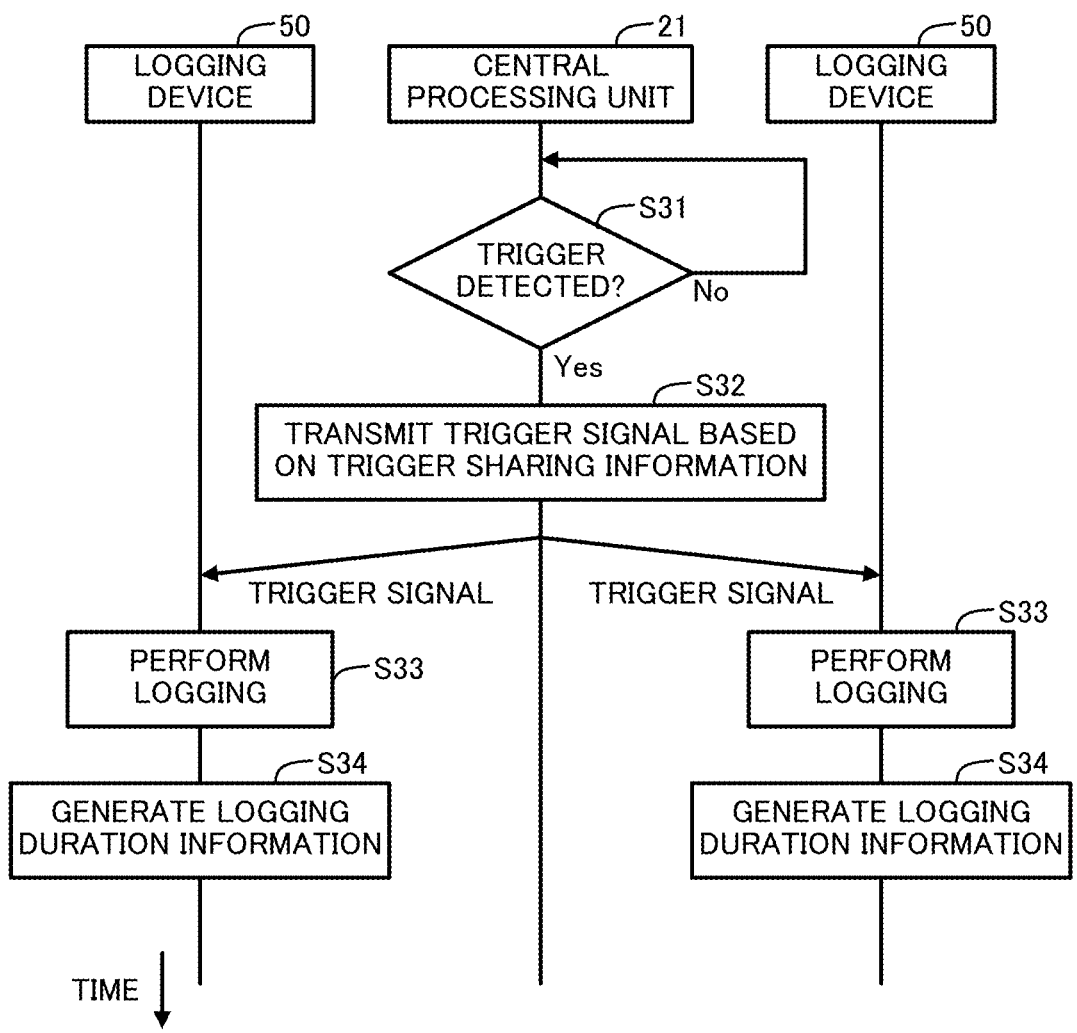
FIG. 16 is a flowchart of second trigger sharing in Embodiment 1.

FIG. 16 illustrates the flowchart of sharing a trigger detected by the central processing unit 21. As illustrated in FIG. 16, the central processing unit 21 determines whether the central processing unit 21 has detected a trigger (step S31). When determining that no trigger has been detected (No in step S31), the central processing unit 21 repeats this determination to monitor any trigger. When determining that a trigger has been detected (Yes in step S31), the central processing unit 21 transmits a trigger signal based on the trigger sharing information 2131 (step S32). When the logging device 50 receives the trigger signal transmitted in step S32 and when the trigger setting information 501 defines an instruction to perform logging upon receipt of a trigger signal, the logging device 50 performs logging (step S33) and generates the logging duration information 504 (step S34).

Figure 17:
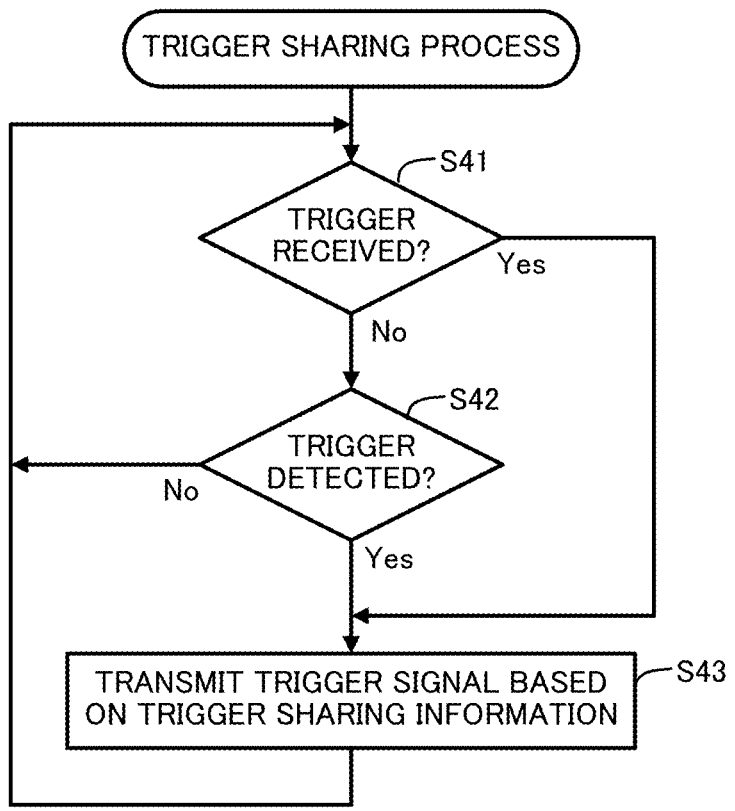
FIG. 17 is a flowchart of a trigger sharing process in Embodiment 1.

FIG. 17 illustrates a trigger sharing process performed by the central processing unit 21 to share a trigger. In this trigger sharing process, the central processing unit 21 determines whether a trigger signal has been received from an external device (step S41). When determining that no trigger signal has been received (No in step S41), the central processing unit 21 determines whether a trigger has been detected in the central processing unit 21 (step S42). When determining that no trigger has been detected (No in step S42), the central processing unit 21 repeats step S41 and subsequent steps. The central processing unit 21 thus monitors any reception of a trigger signal and any detection of a trigger.

When determining that a trigger signal has been received in step S41 (Yes in step S41) and that a trigger has been detected in step S42 (Yes in step S42), the central processing unit 21 transmits the trigger signal to the logging device 50 based on the trigger sharing information 2131 (step S43). The central processing unit 21 then repeats step S41 and subsequent steps.

As is clear from FIG. 17, when the central processing unit 21 receives a trigger signal indicating a trigger or detects a trigger, the central processing unit 21 completes sharing of the received trigger or the detected trigger with the logging devices 50 before performing a process for a subsequent trigger. In other words, when multiple triggers are generated substantially simultaneously, the central processing unit 21 simply shares a first trigger with the logging devices 50 without sharing the other triggers with the logging devices 50.

Figure 18:
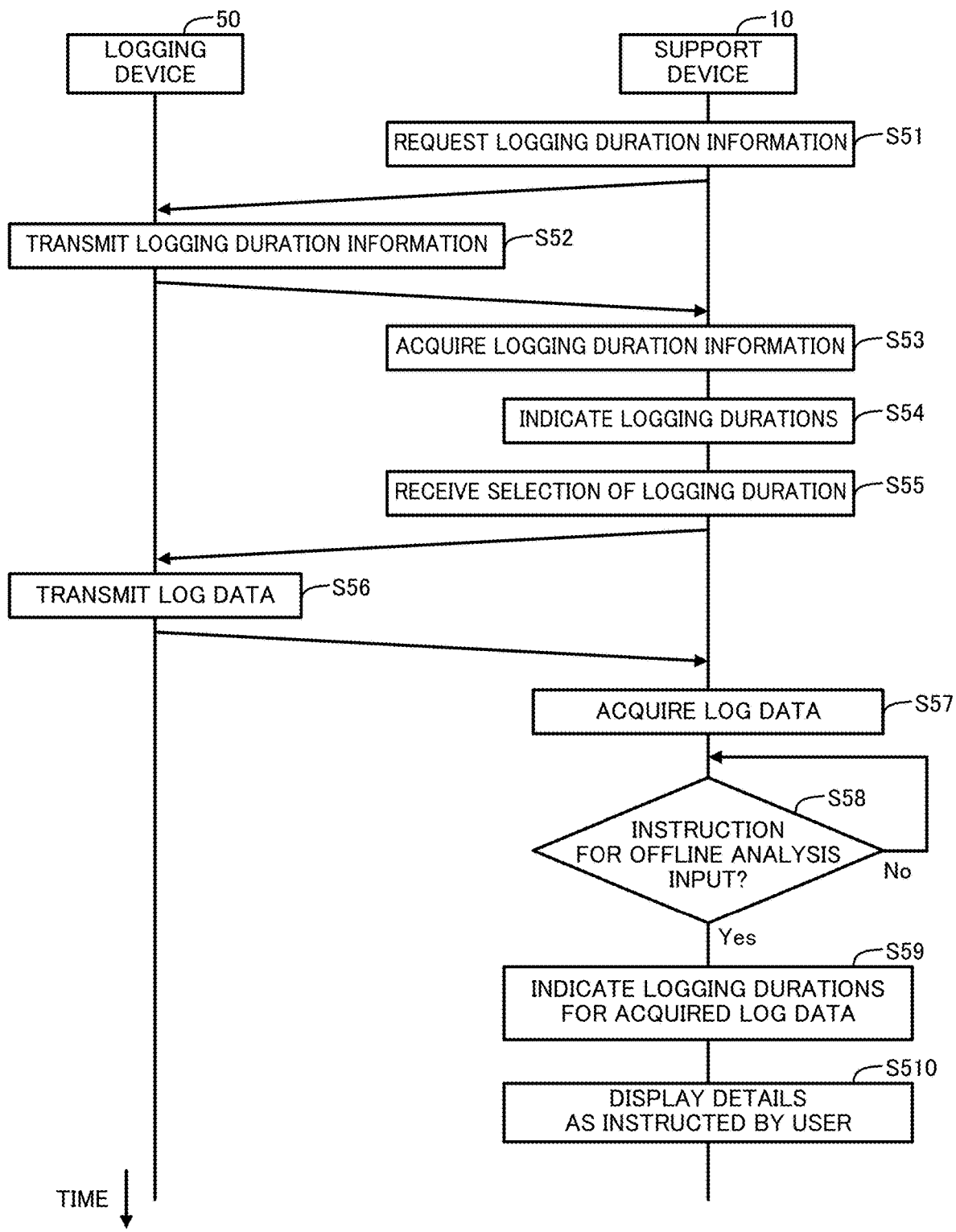
FIG. 18 is a flowchart of information provision to the support device in Embodiment 1.

FIG. 18 illustrates the flowchart of providing the generated log data 503 and the generated logging duration information 504 to the support device 10. As illustrated in FIG. 18, the support device 10 requests each logging device 50 connected through the central processing unit 21 to transmit the logging duration information 504 as indicated by a specific operation performed by the user (step S51). The specific operation is, for example, an input of an instruction to start analyzing log data with the engineering tool. The request for the logging duration information 504 may include a specified time to be displayed on the screen 113. The specified time may be a specific time point or a time span. For example, to display the screen 113 as illustrated in FIG. 8, the support device 10 specifies the most recent seven hours, and requests a record of the logging duration information 504 indicating the logging duration overlapping the time in this seven-hour span.

More specifically, at exactly 17 o'clock, the support device 10 specifies a time span from 10:00 to 17:00 as illustrated in FIG. 8 to request a record of the logging duration information 504 indicating the logging duration and included in the time span and a record of the logging duration information 504 indicating the logging duration partially overlapping the time span. In this example, the logging duration included in the time span is a period having both the start time and the end time included in the time span. The logging duration partially overlapping the time span is a period having one of the start time or the end time included in the time span and the other not included in the time span. For the time span from 10:00 to 17:00 illustrated in FIG. 8, a record of the logging duration information 504 indicating the logging duration with the start time of 9:30 and the end time of 10:30 is further requested, when available.

When receiving a request from the support device 10, the logging device 50 transmits the logging duration information 504 in response to this request (step S52). More specifically, the responder 570 in the logging device 50 receives an inquiry from the support device 10 and provides part or all of the logging duration information 504 to the support device 10 as a response to the inquiry when the logging duration indicated by the logging duration information 504 includes the specified time. When the multiple records in the logging duration information 504 include the specified time, these records may be provided. The communicator 140 in the support device 10 acquires the logging duration information 504 (step S53).

The indicator 110 in the support device 10 then indicates the logging durations indicated by the logging duration information 504 acquired in step S53 to the user (step S54). The screen 113 illustrated in FIG. 8 is thus displayed.

The receiver 120 in the support device 10 then receives user selection of any of the indicated logging durations (step S55). In this process, the selection of the logging duration is substantially a selection of a combination of a logging device 50 and the logging duration of logging performed by the logging device 50. The support device 10 requests the logging device 50 that has performed logging for the logging duration to provide the log data 503 corresponding to the selected logging duration.

The logging device 50 that has received this request transmits the requested log data 503 to the support device 10 (step S56). The communicator 140 in the support device 10 thus acquires the log data 503 generated in the specified logging duration by the logging device 50 specified by the user (step S57).

The support device 10 then determines whether the user has input an instruction to start offline analysis (step S58). When determining that the instruction has been input (Yes in step S58), the indicator 110 in the support device 10 indicates the logging durations for the acquired log data 503 (step S59). The screen 113 illustrated in FIG. 10 is thus displayed in the same form as the screen before the log data 503 is acquired. As instructed by the user, the support device 10 displays the details of the log data 503 (step S510) to support the user with analysis of the log data 503. For example, the support device 10 displays the screen 113 illustrated in FIG. 11. When determining that no instruction has been input in step S58 (No in step S58), the support device 10 repeats the determination in step S58 to wait for an input of an instruction.

Figure 19:
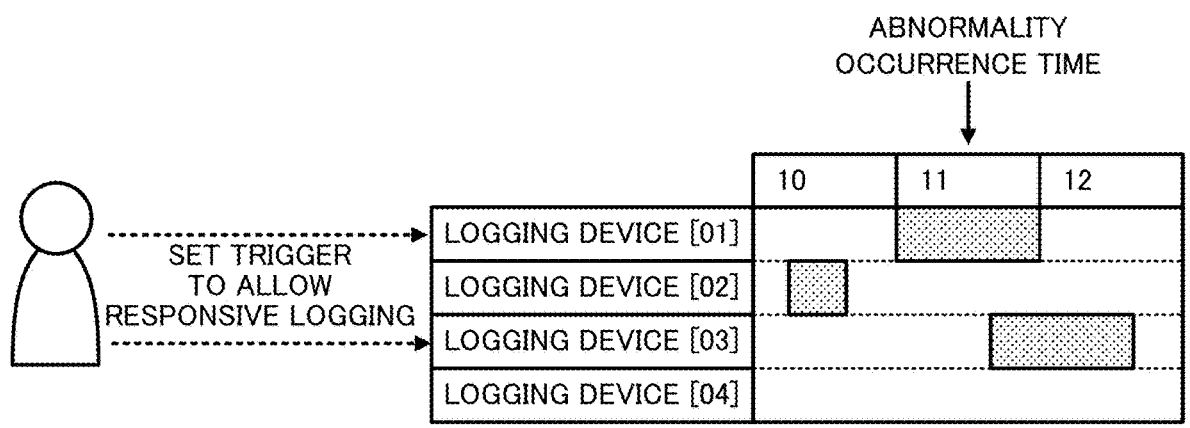
FIG. 19 is a diagram illustrating trigger setting in a comparative example.

As described above, the log data analysis support system 100 allows trigger sharing to cause the multiple logging devices 50 to perform logging in response to one another. In analysis of log data, sets of log data 503 simultaneously generated by the multiple logging devices 50 may be used as an analysis target. More specifically, as illustrated in FIG. 19, multiple sets of log data 503 may be analyzed to perform post verification of the operations of multiple devices at the time at which an abnormality occurs. However, when triggers are not shared, a trigger is to be set with the multiple logging devices 50 to allow the logging devices 50 to perform logging in response to one another. Such a setting is usually difficult.

More specifically, for two or three logging devices 50, the setting is not particularly difficult. However, for five, six, or several tens of logging devices 50, merely setting the same information with each logging device 50 sequentially takes time and is complex work. When the multiple logging devices 50 are connected to one another across different networks, the settings of the networks may be changed to cause the logging devices 50 to operate in response to one another. Further, when different operators set information with different logging devices 50 included in the log data analysis support system 100, correcting information set with the logging devices 50 is difficult.

In contrast, the log data analysis support system 100 according to the present embodiment allows trigger sharing among the logging devices 50 to facilitate logging in overlapping logging durations.

Before acquiring the log data 503 stored in the multiple logging devices 50 in a distributed manner, the support device 10 acquires the logging duration information 504 from each logging device 50 and displays, to the user, a list of the logging durations in which the log data sets 503 are generated and a list of the logging devices 50 in which the log data sets 503 are stored.

Figure 20:
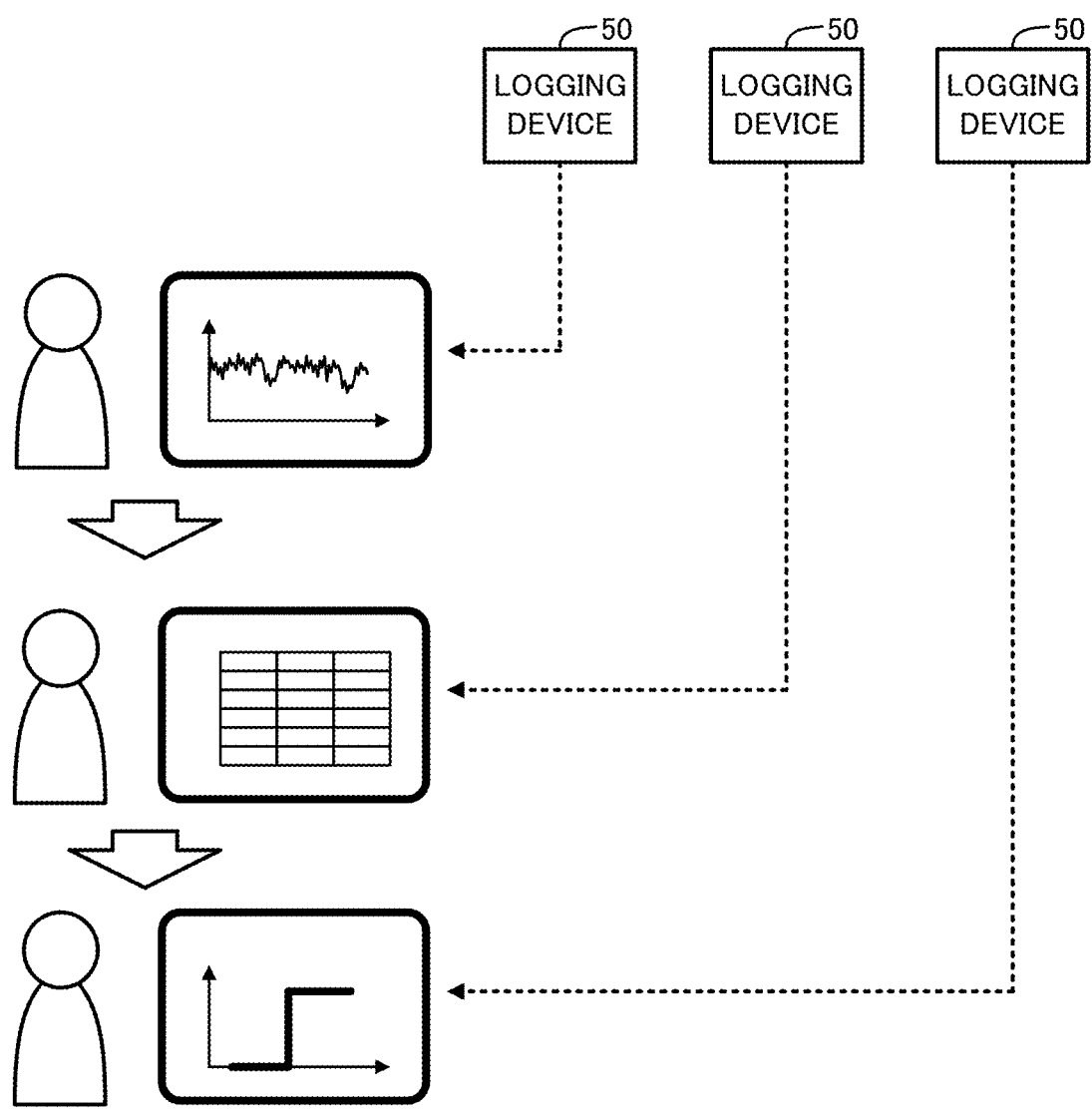
FIG. 20 is a diagram illustrating reading of log data in a comparative example.

To simply read the log data 503 from the logging devices 50, as illustrated in FIG. 20, the user performs a complicated operation of sequentially identifying a set of log data 503 stored in each logging device 50 to find an intended set of log data 503.

In contrast, the log data analysis support system 100 according to the present embodiment displays a list of the logging durations as described above. This allows the user to learn the outline of the sets of log data 503 by simply viewing the single screen 113 and select a set of log data 503 for analysis. In particular, the log data 503 generated at a specific time or in a specific time span is typically the target of analysis. Thus, indicating the logging duration for each logging device 50 can effectively reduce the workload of preparation for log data analysis.

The shared range of a trigger signal in the log data analysis support system 100 is determined based on the trigger setting information 501 preset with the logging devices 50. More specifically, the trigger setting information 501 in each logging device 50 determines whether the logging device 50 that has detected a trigger is to transmit a trigger signal. The destination of this trigger signal is determined based on the trigger setting information 501 of another logging device 50. More specifically, the trigger signal is relayed by the central processing unit 21 to be transmitted to a logging device 50 having the trigger setting information 501 that defines performing logging upon receipt of a trigger signal.

Although the trigger setting information 501 defines both an instruction to transmit or not to transmit a trigger signal and an instruction to receive or not to receive a trigger signal in the example described above, the trigger setting information 501 is not limited to this example. The trigger setting information 501 may define one of the instruction to transmit or not to transmit a trigger signal or the instruction to receive or not to receive a trigger signal.

When the trigger setting information 501 defines an instruction to transmit or not to transmit a trigger signal and does not define an instruction to receive or not to receive a trigger signal, a trigger signal transmitted from any of the logging devices 50 is broadcast to all the other logging devices 50. When the trigger setting information 501 defines an instruction to receive or not to receive a trigger signal and does not define an instruction to transmit or not to transmit a trigger signal, all the logging devices 50 that have detected a trigger transmit a trigger signal, and the central processing unit 21 relays the trigger signal to any logging device 50 defined to receive a trigger signal.

In the example described above, the trigger setting information 501 set with each logging device 50 is reflected on the trigger sharing information 2131 in the central processing unit 21, but the trigger setting information 501 is not limited to this example. The trigger sharing information 2131 defining permission or non-permission of transmitting a trigger signal and permission and non-permission of receiving a trigger signal by each logging device 50 may be directly preset with the central processing unit 21. This setting of the trigger sharing information 2131 may be achieved by the central processing unit 21 receiving a user operation on the input device 64 in the central processing unit 21 or receiving a user operation on the support device 10 through the communicator 66 in the central processing unit 21. All the logging devices 50 that have detected a trigger may transmit a trigger signal to the central processing unit 21 and when the logging devices 50 that have transmitted the trigger signal have transmission permission, the central processing unit 21 may relay the trigger signal to the other logging devices 50 having reception permission.

Before acquiring the log data 503, the support device 10 displays objects corresponding to the logging duration on a plane defined by the first axis corresponding to the list of the logging devices 50 and the second axis corresponding to time. The support device 10 also indicates the logging duration with similar objects corresponding to the acquired log data 503. Such an arrangement of the objects allows the user to easily learn the logging device 50 storing each set of log data 503 and the logging duration in which the set of log data 503 is generated.

The support device 10 may receive selection of two or more logging durations and acquire two sets of log data 503. In this case, the support device 10 displays, as details of the log data 503, the trends of the values indicated by the two sets of log data 503 with a common time axis as illustrated in FIG. 11. This allows the user to efficiently analyze the log data 503. One or two or more logging durations may be selected. One or two or more sets of log data may correspond to the logging durations.

Figure 21:
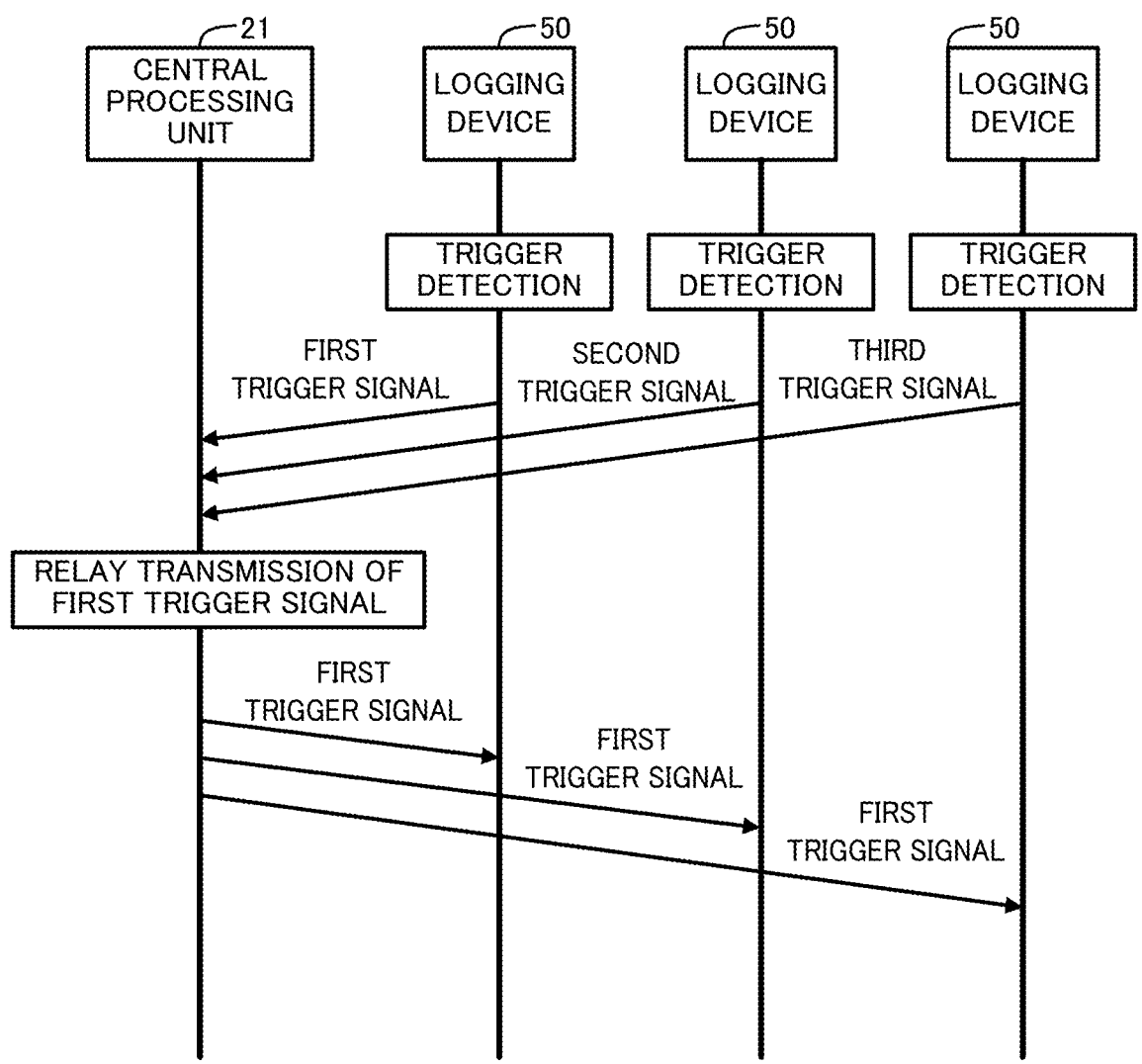
FIG. 21 is a diagram illustrating trigger sharing in Embodiment 1.

As illustrated in FIG. 17, when receiving a trigger signal, the central processing unit 21 suspends processing on another trigger until the relay of the trigger signal is complete. Thus, as illustrated in FIG. 21, when a first trigger signal, a second trigger signal, and a third trigger signal are simultaneously transmitted from multiple logging devices 50, the central processing unit 21 relays transmission of the first trigger signal received first without relaying the other trigger signals. This allows avoidance band shortage resulting from relaying of many trigger signals.

In particular, the multiple logging devices 50 for which an abnormality is set as a trigger can simultaneously detect a trigger for a single abnormality. In this case, although the triggers other than the first trigger are discarded as unused triggers, the multiple logging devices 50 perform logging in response to one another based on the first trigger. In FIG. 21, the logging device 50 that transmits the first trigger signal corresponds to an example of a first detector, and the logging device 50 that transmits the second trigger signal corresponds to an example of a second detector. The trigger relay 214 in the central processing unit 21 corresponds to an example of transmission means for transmitting the first trigger signal to the second detector different from the first detector when the first trigger signal is received. The transmission means excludes, from a transmission target, a second trigger signal different from the first trigger signal and received by the reception means in a period from when the reception means receives the first trigger signal to when the transmission means completes transmitting the first trigger signal. The log data analysis support system 100 corresponds to an example of a trigger transmission system. The procedure illustrated in FIGS. 17 and 21 corresponds to an example of a trigger transmission method. The destination of the first trigger signal is equal to a logging device 50 within a shared range, and may include all the logging devices 50 connected to the central processing unit 21 or two or more logging devices 50 including the second detector.

In the example in FIG. 17, until relaying of a single trigger signal is complete, the central processing unit 21 suspends relaying of the other trigger signals. In other words, the end time of the interruption period of relaying other trigger signals after the central processing unit 21 starts relaying the single trigger signal is the time at which the central processing unit 21 completes the relay. The end time of the interruption period may be changed to another appropriate timing.

For example, the end time of the interruption period may be when the relayed trigger signal reaches the logging device 50 that is a destination. More specifically, this timing may be when the relayed trigger signal reaches at least one logging device 50 that is a destination or when the relayed trigger signal reaches all the destinations. The logging device 50 may transmit a reception signal indicating reception of a trigger signal to the central processing unit 21, and the central processing unit 21 may end the interruption period based on the reception signal.

The end time of the interruption period may be when the logging devices 50 that have received the relayed trigger signal complete logging. More specifically, this timing may be when at least one of the logging devices 50 that have received a trigger signal completes logging or when all the logging devices 50 that have received a trigger signal complete logging. The logging devices 50 may transmit a completion signal indicating the completion of logging to the central processing unit 21, and the central processing unit 21 may end the interruption period based on the completion signal.

The interruption period may be predetermined as, for example, five or ten minutes. A longer interruption period can prevent congestion, such as looping of a trigger signal, in the large-scaled log data analysis support system 100 including many devices. The interruption period may be at least longer than a period until the central processing unit 21 completes relaying a trigger signal received first at timing other than in the interruption period.

In the example described above, the log data 503 is generated by repeatedly reading values of control data from a specific address. The address from which the control data is read may be an identifier of a physical storage area in the storage device or an identifier of a logical storage area used by firmware and software including an operating system (OS). The address of the control data may be any identification information to distinguish a value with the trend recorded as the log data 503 from other values. For example, the address of the control data may indicate a device in a PLC, or a variable or a label used in a programming language such as a function block diagram (FBD) language.

Embodiment 2

Embodiment 2 is now described focusing on the differences from Embodiment 1. Like reference signs denote like or corresponding components in Embodiment 1. In the example described in Embodiment 1, a trigger simply indicates the start of logging, but the trigger may be used to further support the user with analysis of the log data 503. A method for further supporting the user using a trigger is described below.

Figure 22:
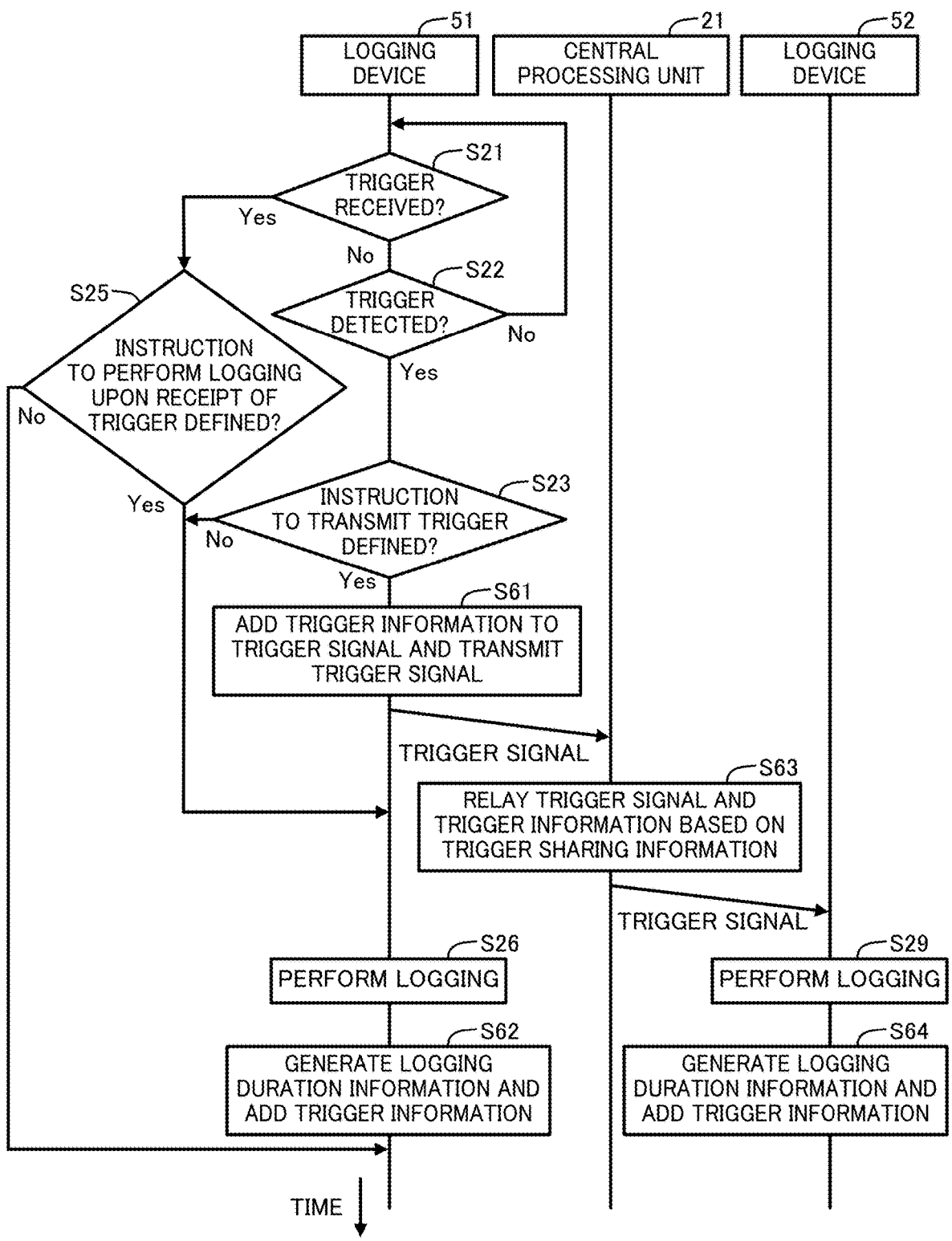
FIG. 22 is a flowchart of trigger sharing in Embodiment 2.

In the present embodiment, trigger information about a trigger is added to a trigger signal and log data. More specifically, as illustrated in FIG. 22, when yielding affirmative determination in step S23 (Yes in step S23), the logging device 51 adds trigger information to the trigger signal and transmits the trigger signal to the central processing unit 21 (step S61). As illustrated in FIG. 23, the trigger information includes sharing information indicating a trigger sharing counterpart, and a trigger ID for identifying the trigger.

Although the trigger ID is determined based on, for example, the identification information for a device that has detected the trigger and the time at which the trigger is detected, the trigger ID may be any identifier unique to each trigger. As illustrated in FIG. 24, the sharing information is defined by the trigger setting information 501 with an indication of transmitting the trigger signal upon detection of a trigger. The upper row in FIG. 24 indicates that the sharing counterpart upon detection of a first trigger is limited to devices managed by the central processing unit 21, and the lower row in FIG. 24 indicates that the sharing counterpart upon detection of a second trigger includes all the devices.

Figure 25:
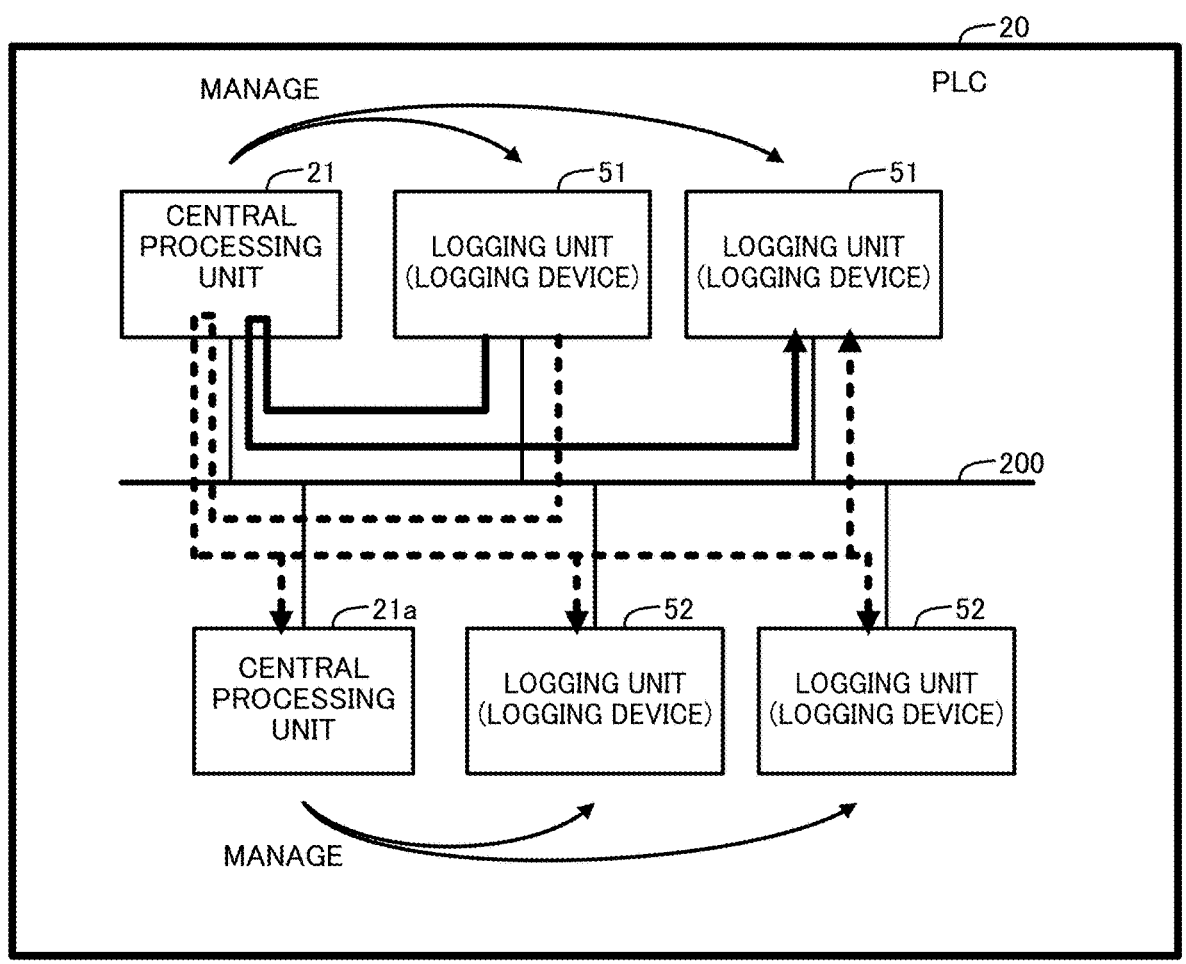
FIG. 25 is a diagram illustrating the shared range of a trigger in Embodiment 2.

As illustrated in FIG. 25, the PLC 20 may include central processing units 21 and 21*a*, with the central processing unit 21 managing the logging devices 51 and the central processing unit 21*a* managing the logging devices 52 different from the logging devices 51. In this case, when one of the logging devices 51 detects a first trigger illustrated in FIG. 24, as indicated by a solid arrow in FIG. 25, this trigger is shared between the logging device 51 that has detected the trigger and another logging device 51 managed by the central processing unit 21 without being shared with the logging devices 52. More specifically, the central processing unit 21 limits the destination of the trigger signal to the logging devices 51.

When one of the logging devices 51 detects a second trigger illustrated in FIG. 24, as indicated by a broken arrow in FIG. 25, this trigger is shared among all the logging devices 51 and 52. Thus, the trigger shared range can be controlled based on the settings of the trigger setting information 501.

Referring back to FIG. 22, after step S61, the logging device 51 performs logging (step S26), generates the logging duration information 504, and further adds, to the logging duration information 504, the trigger information added in step S61 to the trigger signal (step S62). More specifically, the logging duration information 504 is stored with the trigger information associated with a record added to the logging duration information 504.

When receiving the trigger information and the trigger signal transmitted in step S61, the central processing unit 21 relays the trigger signal and the trigger information based on the trigger sharing information 2131 (step S63). When the sharing counterpart defined by the trigger sharing information 2131 differs from the sharing counterpart indicated by the sharing information in the trigger information, priority may be pre-assigned to either one of the sharing counterparts, or the trigger signal may be transmitted to destinations specified by both items of sharing information as the sharing counterparts. With the trigger information defining the sharing counterpart, the trigger sharing information 2131 may omit selection of the sharing counterpart. More specifically, the central processing unit 21 may relay a trigger signal based on the trigger information without storing the trigger sharing information 2131.

The logging device 52 that has received the trigger signal and the trigger information from the central processing unit 21 performs step S29, then generates the logging duration information 504, and adds the received trigger information to the logging duration information 504 (step S64). In step S29, logging may or may not be performed based on the trigger setting information 501 for each logging device 52, or all the logging devices 52 that have received a trigger signal as sharing counterparts may perform logging independently of the trigger setting information 501.

Figure 26:
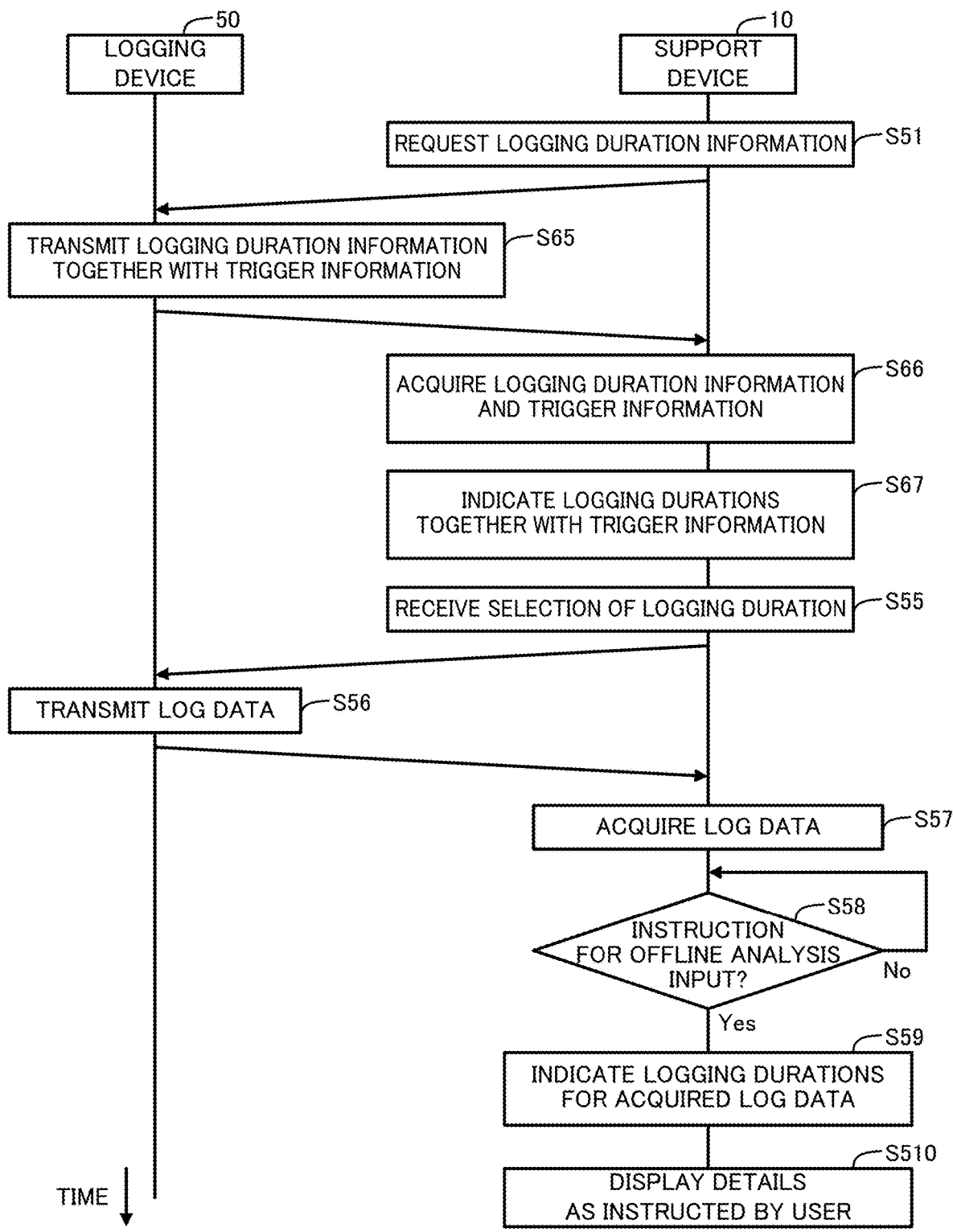
FIG. 26 is a flowchart of information provision to the support device in Embodiment 2.

FIG. 26 illustrates the flowchart for the support device 10 to acquire the trigger information together with the logging duration information 504. More specifically, when the support device 10 requests the logging duration information 504, the logging device 50 transmits the logging duration information 504 and the trigger information added to the logging duration information 504 (step S65). When acquiring the logging duration information 504 and the trigger information (step S66), the support device 10 indicates the logging durations together with the trigger information to the user (step S67).

Figure 27:
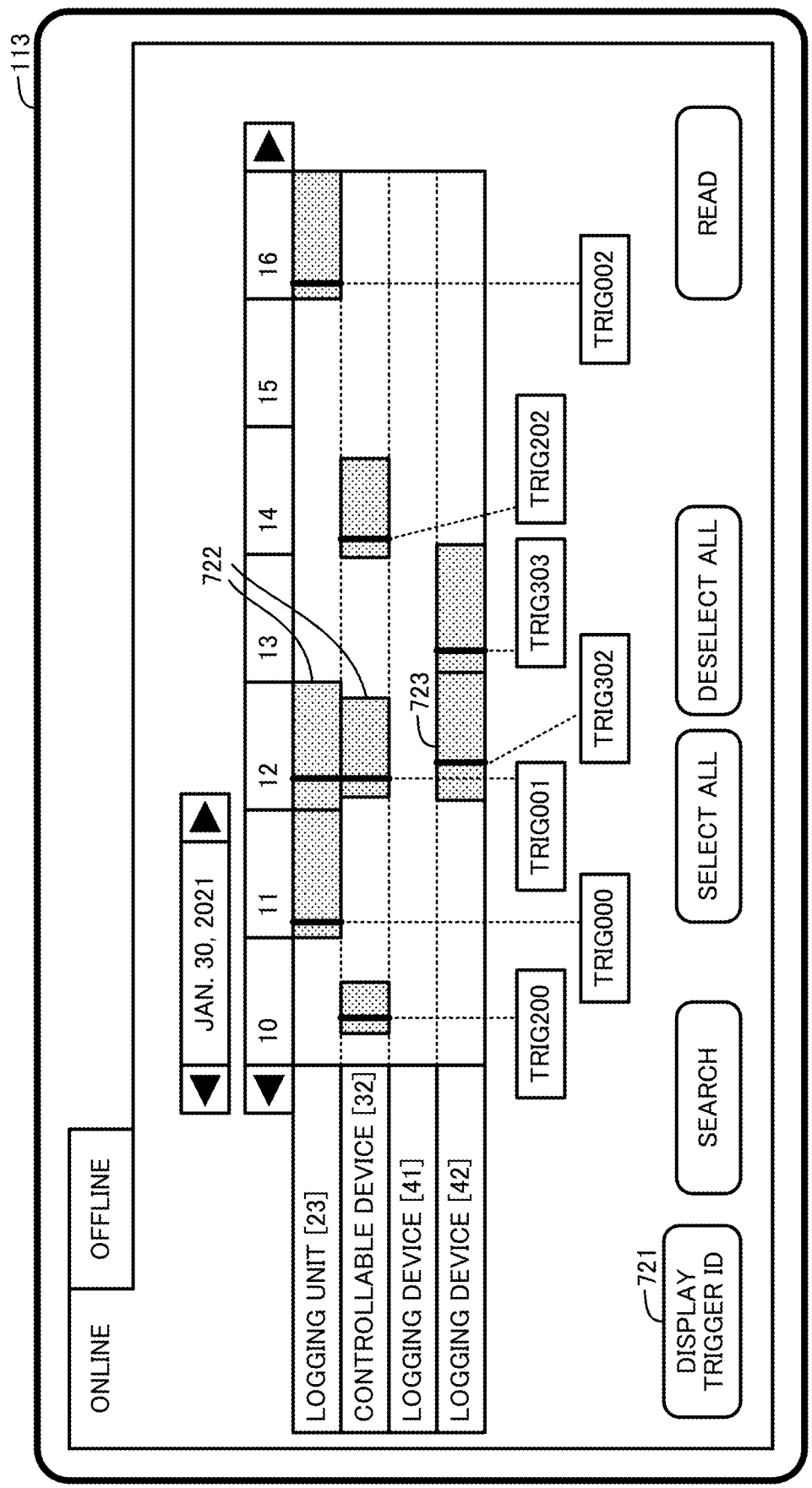
FIG. 27 is a diagram of an example screen indicated by the indicator in Embodiment 2.

More specifically, as illustrated in FIG. 27, when the user presses a button 721 instructing display of the trigger ID on the screen 113, an object corresponding to each logging duration is displayed with superimposition of a line indicating timing of trigger generation and the trigger ID of the trigger. This allows the user to easily determine that the sets of log data corresponding to two objects 722 are generated in response to a trigger having a trigger ID of TRIG001 and that an object 723 with the time span overlapping with the time spans of the objects 722 is generated in response to a trigger having a different trigger ID of TRIG302. Additionally, the sets of log data 503 logged in response to a shared trigger are displayed with the common trigger ID. Thus, the user can easily learn the trigger shared range on the screen 113 in FIG. 27.

The trigger generation timing illustrated in FIG. 27 may be indicated by the trigger information. To indicate trigger generation timing, the trigger information indicates the trigger generation timing in addition to the sharing information and the trigger ID illustrated in FIG. 23.

The trigger generation timing may be specified based on a method for generating the log data 503 based on a trigger in the logging device 50. For example, when each logging device 50 reads the control data immediately after trigger generation or immediately after reception of a trigger signal to generate the log data 503, the start time of the logging duration corresponds to the trigger generation timing. When the logging device 50 constantly reads, independently of trigger generation, control data and temporarily stores the control data in a ring buffer to generate the log data 503 using, as a starting point, the control data read a predetermined time before trigger generation or reception of a trigger signal with the ring buffer, the time point after the predetermined time from the start time of the logging duration corresponds to the trigger generation timing. The method for generating the log data 503 may be prestored in the support device 10 or may be acquired as appropriate by the support device inquiring each logging device 50.

When the generating method is unspecified, the support device 10 may indicate any timing in the logging duration as the trigger generation time, or display the trigger ID alone in correspondence with the logging duration without displaying the trigger generation time. More specifically, the support device 10 may display the trigger ID without displaying the line corresponding to the trigger generation time in FIG. 27.

As described above, the sharing information and the trigger information including the trigger ID can further support the user. Additionally, the shared range of a trigger signal can be flexibly controlled using the trigger information. The trigger information may exclude either the sharing information or the trigger ID. Although the trigger information is added to the trigger signal in the example described above, the trigger information may be embedded in the trigger signal to transmit the trigger signal indicating the trigger information. The trigger ID corresponds to an example of trigger identification information to identify a trigger from other triggers.

Embodiment 3

Embodiment 3 is now described focusing on the differences from Embodiment 1. Like reference signs denote like or corresponding components in Embodiment 1. The present embodiment differs from Embodiment 1 in that the history of events different from the log data 503 is indicated to the user together with the logging durations.

Figure 28:
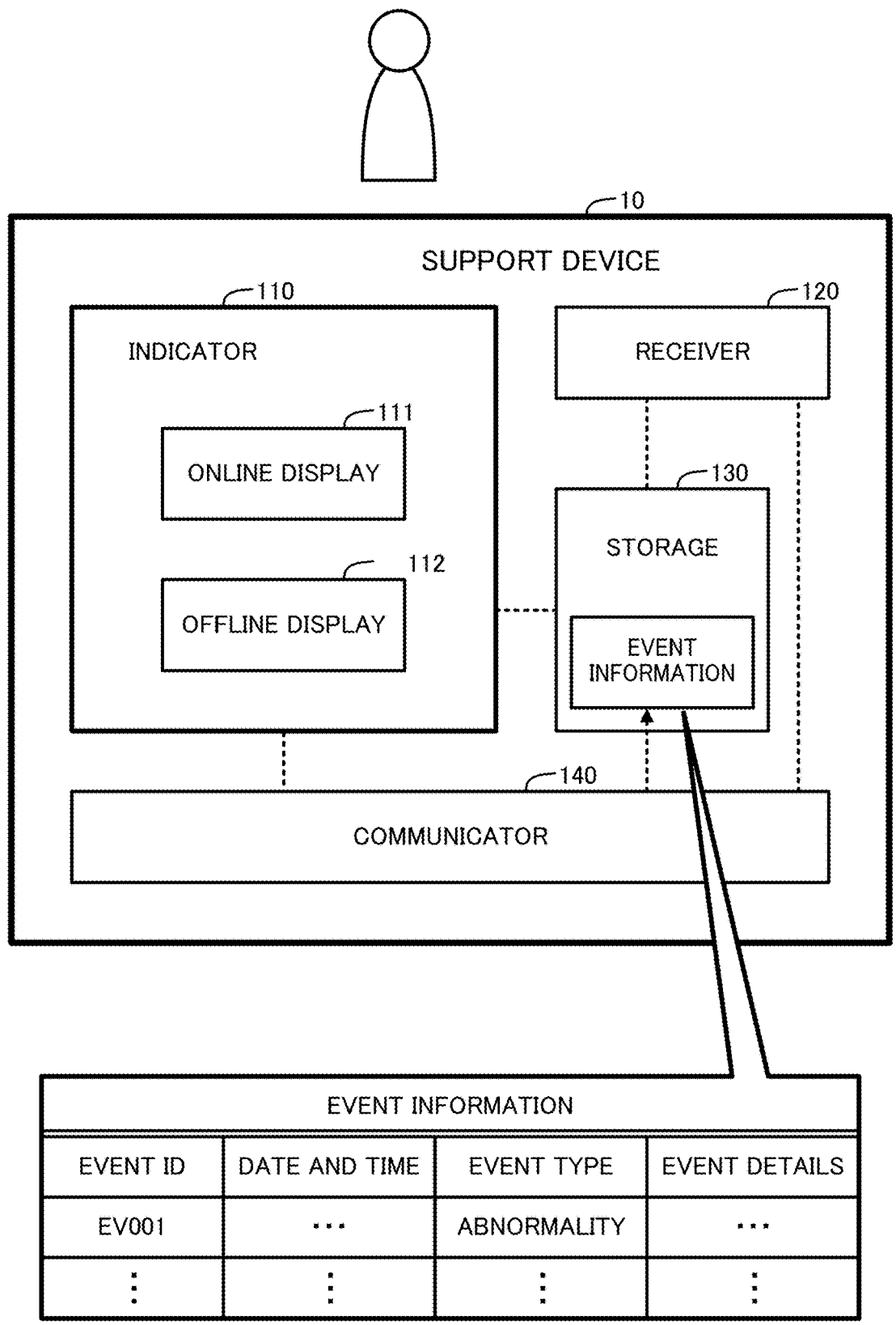
FIG. 28 is a diagram of an example of event information in Embodiment 3.

As illustrated in FIG. 28, in the support device 10 in the present embodiment, the communicator 140 acquires event information and stores the event information into the storage 130. The event information indicates the event ID for identifying an event, the date and time of the event, the type of the event, and the details of the event in a manner associated with one another. The event is relevant to the device control performed by the PLC 20, for example, detection of an abnormality, an error, or another phenomenon predetermined as an event. The event information may be provided from any device. More specifically, the event information may be provided from the central processing unit 21, the logging devices 50, or other devices. At an event, the user may directly input the event information into the receiver 120.

Figure 29:
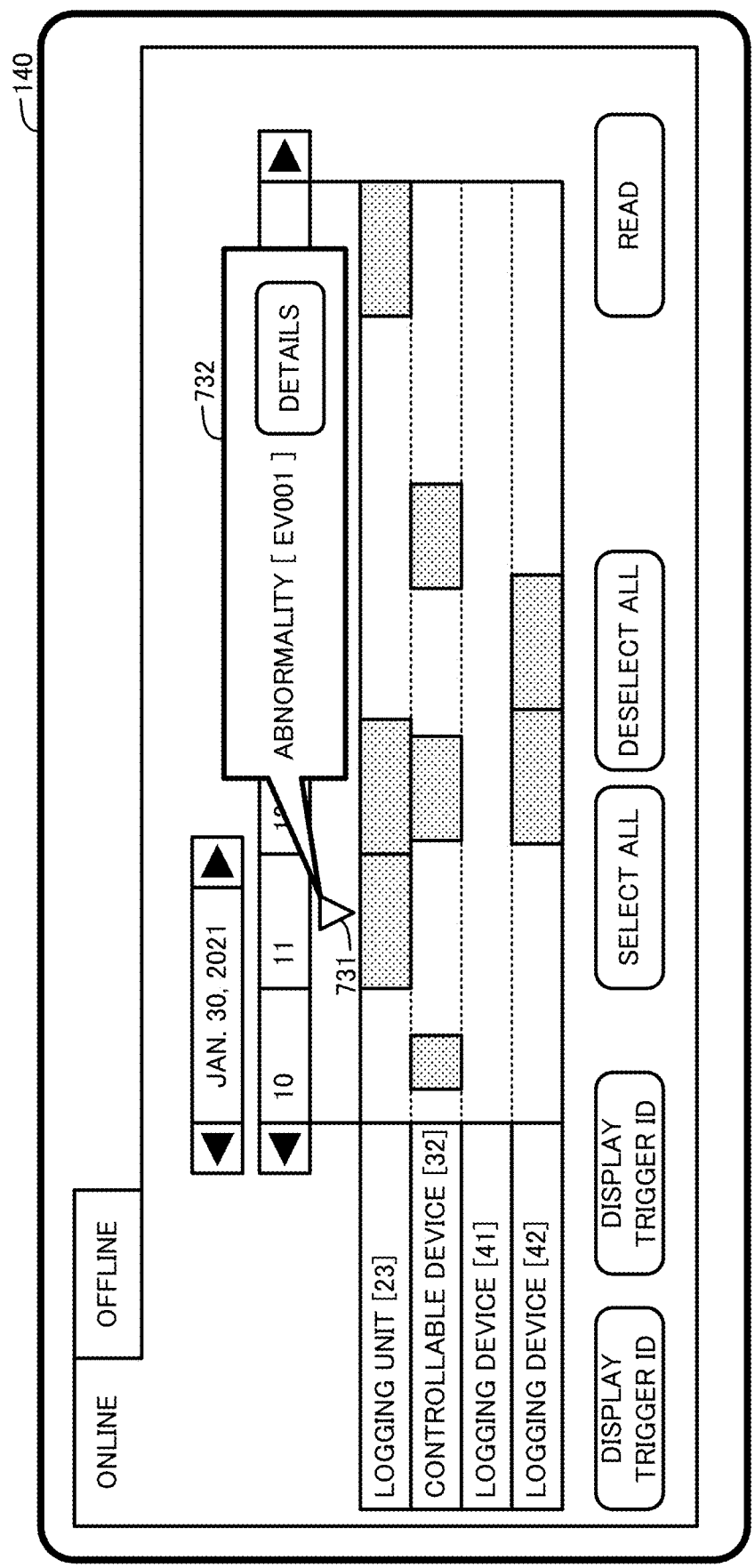
FIG. 29 is a diagram of an example screen indicated by the indicator in Embodiment 3.

As illustrated in FIG. 29, the indicator 110 displays a triangular object 731 indicating an event occurrence time with reference to the event information from the storage 130. When the object 731 is selected by the user, the indicator 110 displays an area 732 including the details of the event.

As described above, the support device 10 indicates the event time together with the logging durations. Thus, the user can easily select the log data 503 generated before and after the event.

Embodiment 4

Embodiment 4 is now described focusing on the differences from Embodiment 1. Like reference signs denote like or corresponding components in Embodiment 1. In Embodiment 1, the user selects the log data 503 to be acquired by identifying the logging durations of the logging devices 50. However, the log data 503 to be acquired may depend on the control data included in the log data 503. In such a case, acquiring many sets of log data 503 to search for the control data overuses the line and takes time. To avoid this, the log data 503 may be acquired after the control data included in the log data 503 is briefly reviewed. This method is described below.

Figure 30:
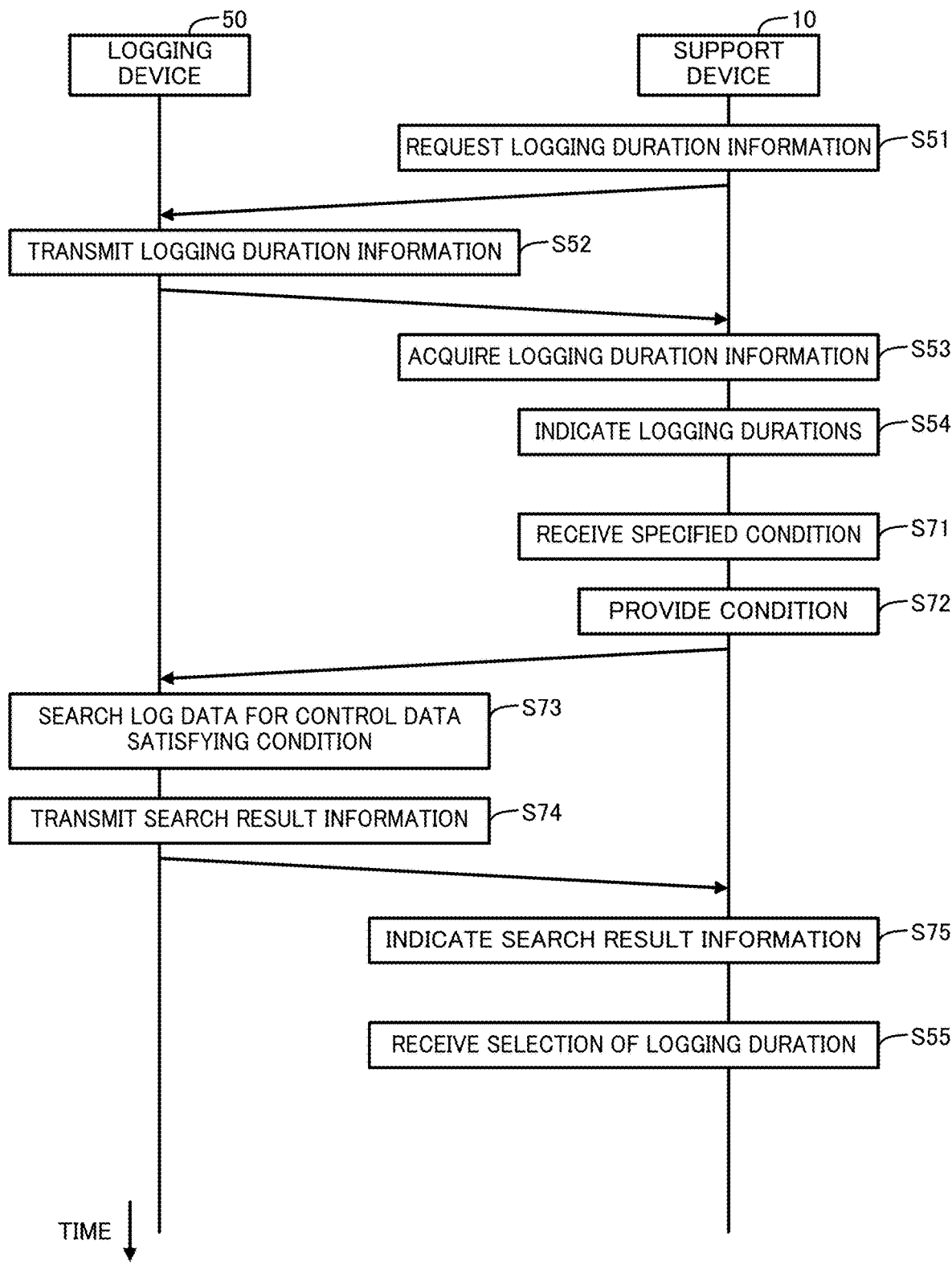
FIG. 30 is a flowchart of information provision to the support device in Embodiment 4.
Figure 31:
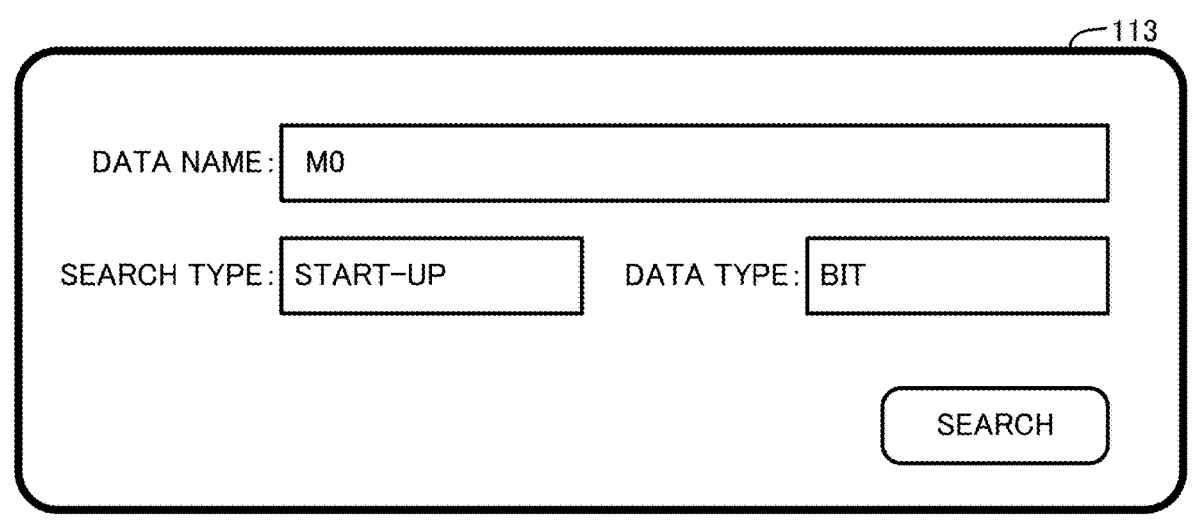

In the present embodiment, as illustrated in FIG. 30, after step S54, the support device 10 receives a specified condition on the control data to be searched for in the log data 503 (step S71). More specifically, the indicator 110 displays a condition input form illustrated in FIG. 31, and the receiver 120 receives an input of a condition specified by the user.

The support device 10 then notifies the logging device 50 of the condition received in step S71 (step S72), and the logging device 50 searches the log data 503 for the control data satisfying the condition (step S73). The logging device 50 transmits search result information indicating the search result to the support device 10 (step S74). The search result generated when the control data satisfying the condition is found includes the found control data and the recorded date and time of the control data. The search result generated when no control data satisfying the condition is found indicates no control data being found.

Figure 32:
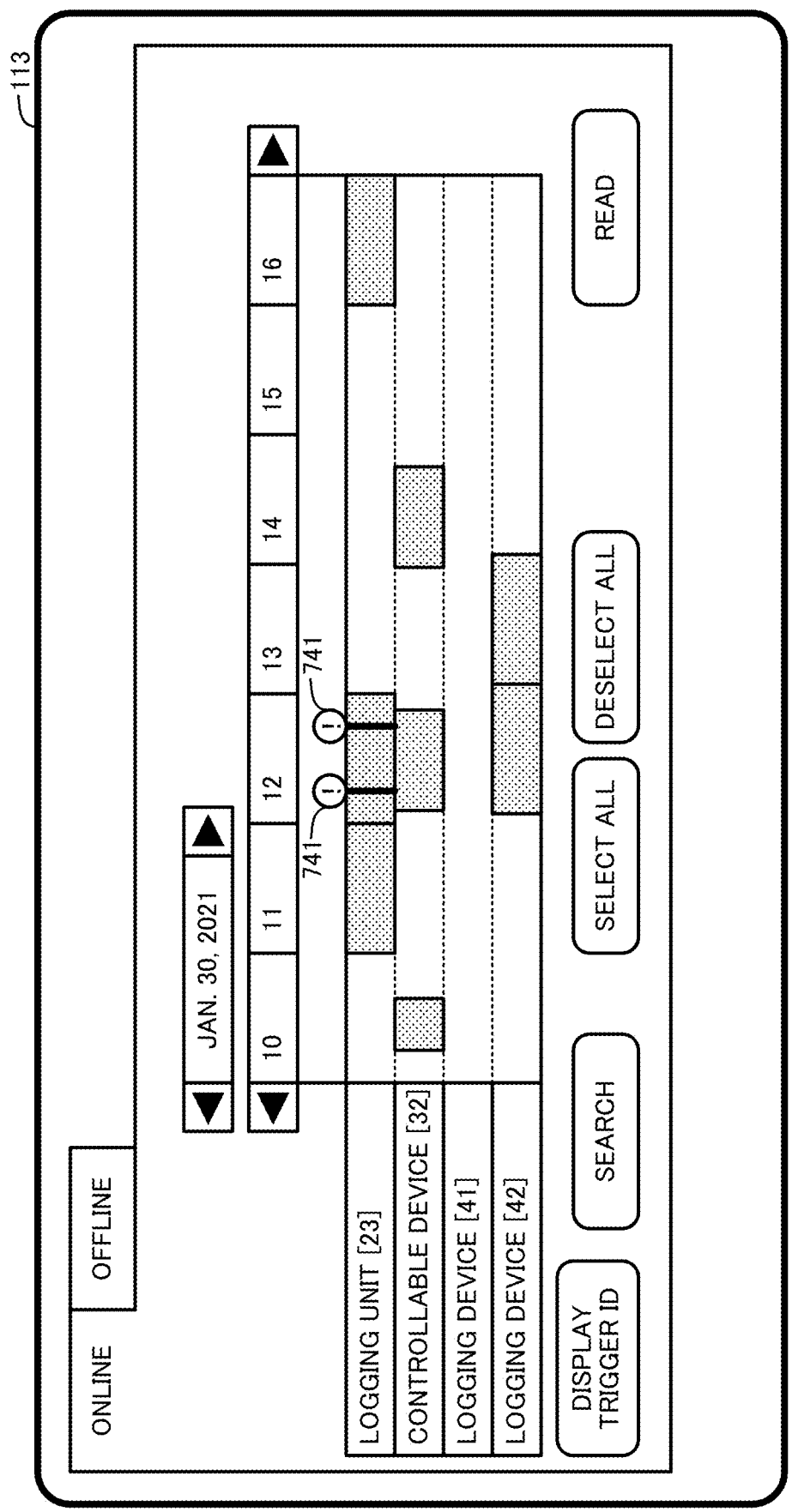
FIG. 32 is a diagram of an example screen indicated by the indicator in Embodiment 4.

The support device 10 then indicates the search result information received from the logging device 50 to the user (step S75). For example, as illustrated in FIG. 32, the indicator 110 displays objects indicating the logging durations and objects 741 indicating the recorded date and time of the found control data.

As described above, the support device 10 acquires log data after the logging device 50 searches the log data 503 for the control data satisfying the condition specified by the user, and the indicator 110 indicates the search result. Thus, to analyze the log data 503 including the control data satisfying a specific condition, the user can easily search for such control data without many sets of log data 503 and large-size log data 503 transmitted to the support device 10.

Embodiment 5

Embodiment 5 is now described focusing on the differences from Embodiment 1. Like reference signs denote like or corresponding components in Embodiment 1. The present embodiment differs from Embodiment 1 in that the user can add a mark to any time point in the logging duration information 504 and the log data 503.

Figure 33:
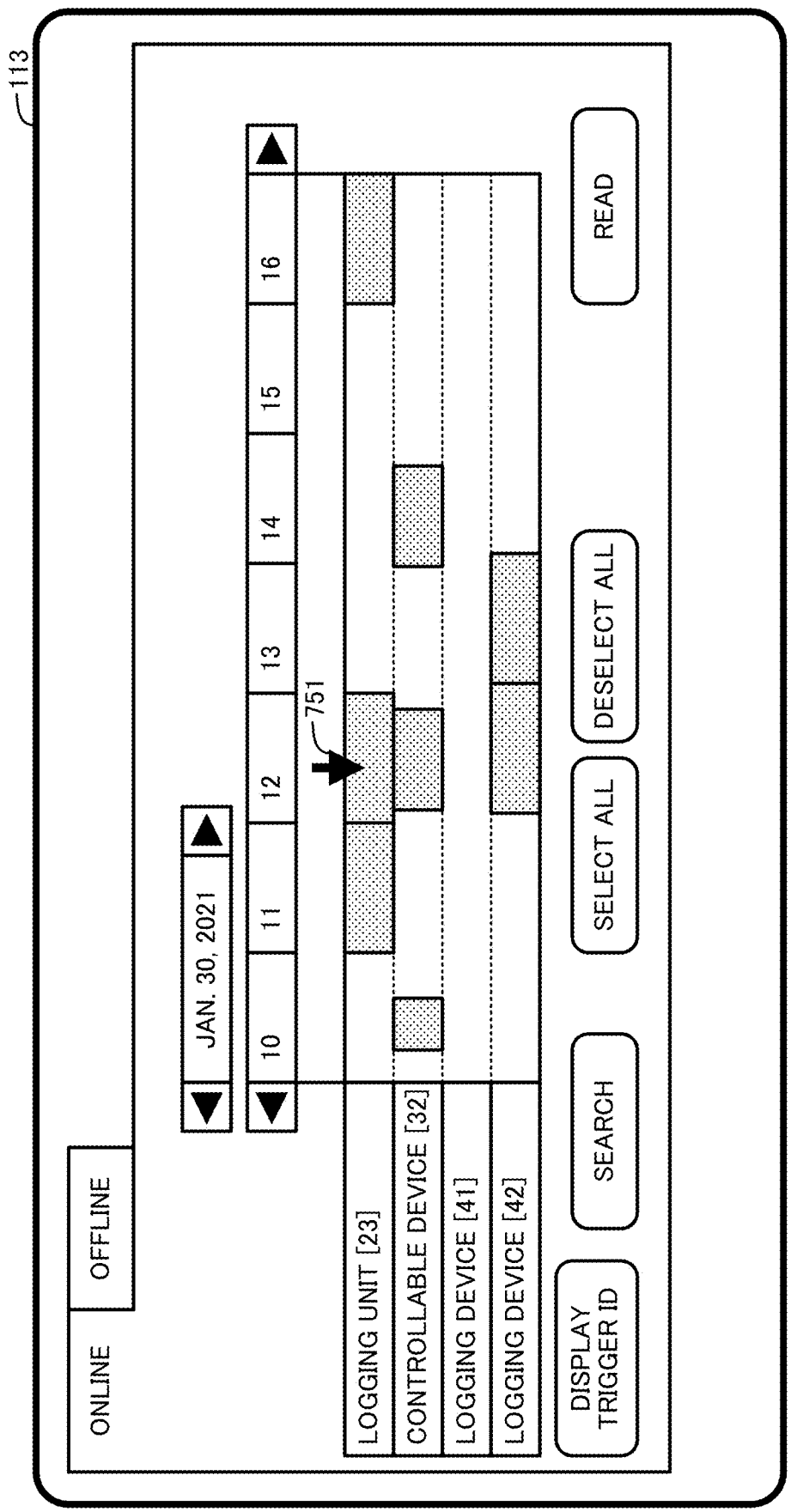
FIG. 33 is a diagram of a first example screen indicated by the indicator in Embodiment 5.
Figure 34:
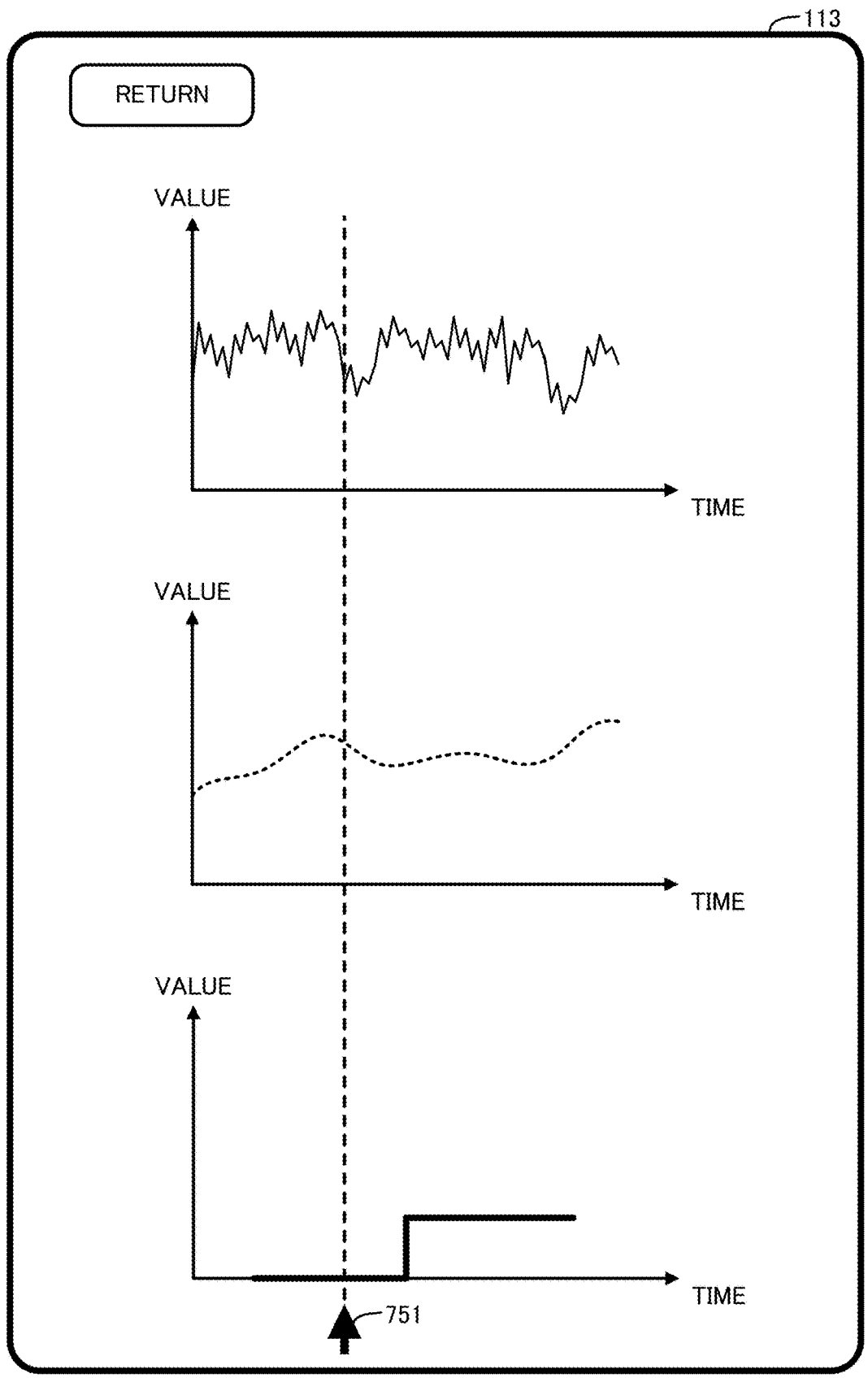
FIG. 34 is a diagram of a second example screen indicated by the indicator in Embodiment 5.

As illustrated in FIG. 33, when the user adds a mark 751 on a plane including objects indicating the logging duration, the receiver 120 in the present embodiment calculates the time corresponding to the mark and stores the time into the storage 130 together with the mark ID. As illustrated in FIG. 34, this mark indicates, on the screen 113 indicating the details of two or more sets of log data 503, the time calculated as described above on the trend of values of each set of log data 503. As described above, the mark added by the user can be used by the user to analyze the log data 503. More specifically, to examine the trend of each set of control data in detail, the user can specify common timing to be focused, and easily observe a change in any set of control data around the timing.

Embodiment 6

Embodiment 6 is now described focusing on the differences from Embodiment 2. Like reference signs denote like or corresponding components in Embodiment 2. The present embodiment differs from Embodiment 2 in that the manner of trigger sharing differs between the logging devices 50 managed by the PLC 20 and the logging devices 50 connected to the PLC 20 with the industrial network 400.

Figure 35:
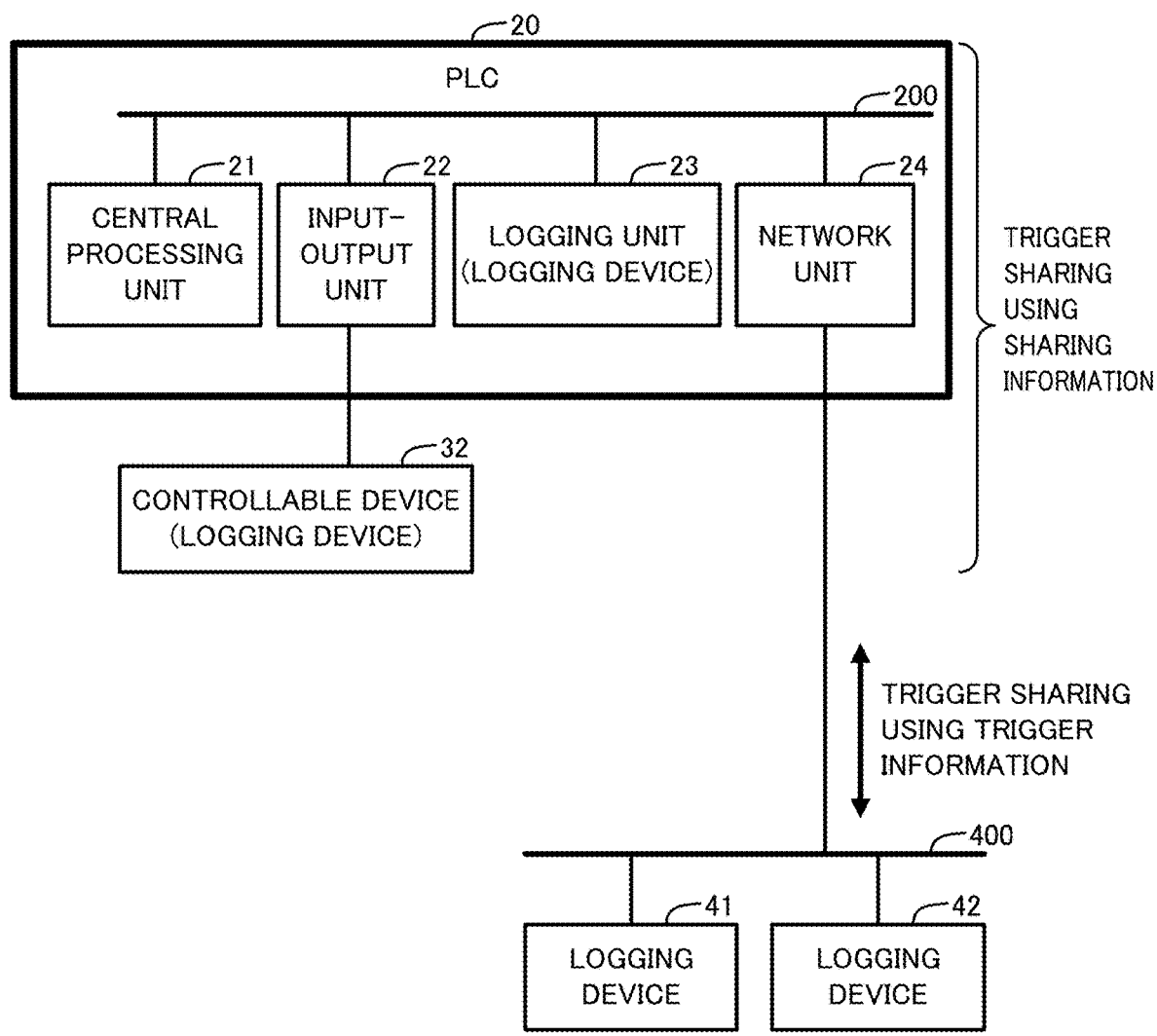
FIG. 35 is a diagram illustrating trigger sharing in Embodiment 6.

In the present embodiment, as illustrated in FIG. 35, the PLC 20 and the controllable device 32 share a trigger using the sharing information and define the trigger shared range based on the sharing information. In the industrial network 400, trigger information is added to a trigger to share the trigger.

Figure 36:
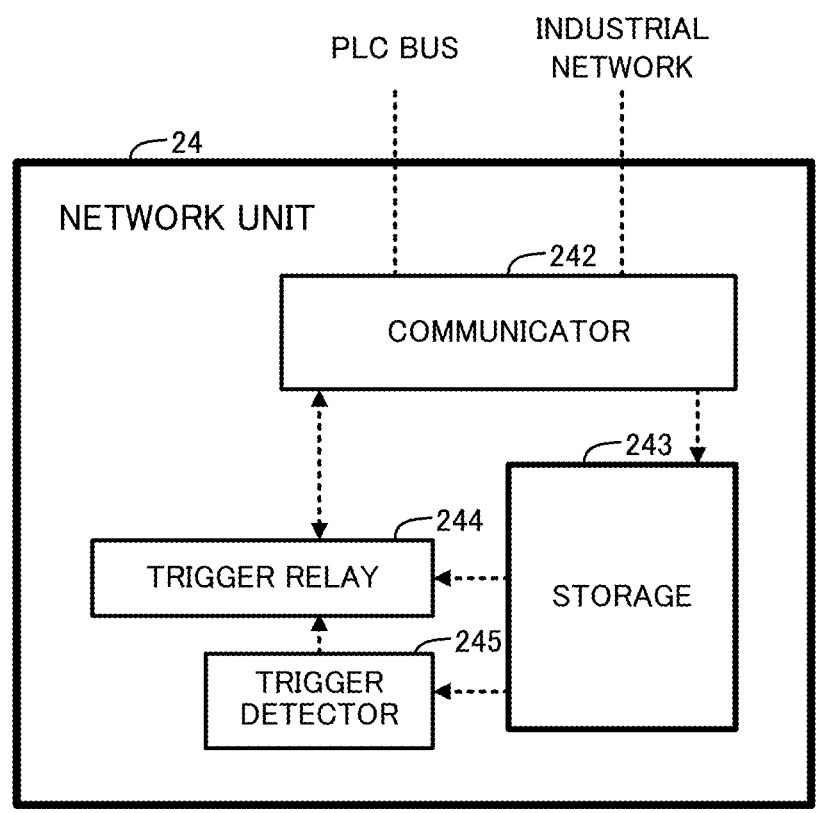
FIG. 36 is a functional block diagram of a network unit 24 in Embodiment 6.

In Embodiment 2, the central processing unit 21 is mainly described as a component to relay a trigger signal. In the present embodiment, as illustrated in FIG. 36, the network unit 24 also has the same function of relaying a trigger signal as the central processing unit 21. A communicator 242, a storage 243, a trigger relay 244, and a trigger detector 245 in the network unit 24 illustrated in FIG. 36 have the same functions as the bus communicator 212, the storage 213, the trigger relay 214, and the trigger detector 215 in the central processing unit 21 illustrated in FIG. 6. However, the communicator 242 transmits and receives a trigger signal through the PLC bus 200 and the industrial network 400.

The network unit 24 has the hardware configuration as an FA device illustrated in FIG. 3, similarly to the central processing unit 21.

The network unit 24 corresponds to an example of the trigger relay unit included in the programmable controller. The communicator 242 corresponds to an example of the reception means for receiving the trigger signal. The trigger relay 244 corresponds to an example of the transmission means for transmitting the trigger signal.

The central processing unit 21 relays a trigger signal received from a single unit included in the PLC 20 through the PLC bus 200 to other units through the PLC bus 200. In contrast, the network unit 24 relays a trigger signal received from a single device through the PLC bus 200 or the industrial network 400 to other devices through the PLC bus 200 or the industrial network 400.

For example, when the network unit 24 receives a trigger signal from the PLC bus 200, the network unit 24 adds trigger information to the trigger signal, and transmits the trigger signal to the logging devices 41 and 42 on the industrial network 400. When the network unit 24 receives a trigger signal from the logging device 41, the network unit 24 transmits the trigger signal to the logging device 42 and the units connected through the PLC bus 200 using trigger information added to the trigger signal.

When the network unit 24 has the function of detecting a trigger, the network unit 24 performs the same process as the trigger sharing process performed by the central processing unit 21 illustrated in FIG. 17. Thus, similarly to the central processing unit 21, the network unit 24 sets, from when receiving a single trigger signal, an interruption period in which the network unit 24 suspends relaying of another trigger signal received. When the network unit 24 has no function of detecting a trigger, the trigger sharing process illustrated in FIG. 17 may eliminate step S42.

The structure described above also produces the same advantageous effects as the structure in Embodiment 2. When the PLC bus 200 uses the same manner of determining the shared range of a trigger signal as the industrial network 400, the network unit 24 may still have the same relaying functions as the central processing unit 21.

Figure 37:
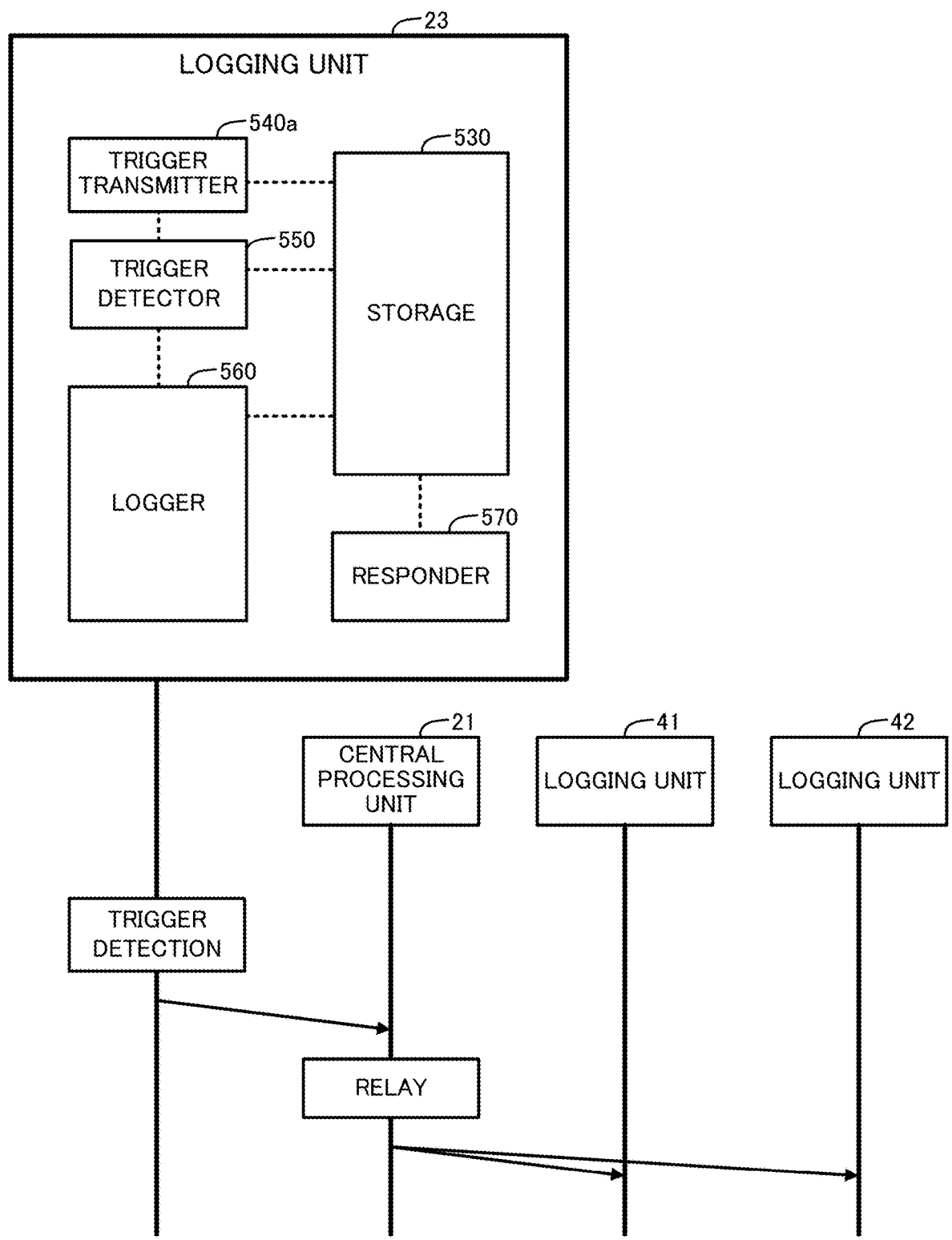
FIG. 37 is a diagram of a logging unit in a modification.

The logging unit 23 in the PLC 20 may eliminate the function of receiving a trigger. More specifically, as illustrated in FIG. 37, the logging unit 23 may include a trigger transmitter 540a in place of the trigger transmitter-receiver 540 and transmit a trigger signal when detecting a trigger. The central processing unit 21 may broadcast the trigger signal to the logging devices 41 and 42 through the industrial network 400.

Embodiment 7

Embodiment 7 is now described focusing on the differences from Embodiment 2. Like reference signs denote like or corresponding components in Embodiment 2. The present embodiment differs from Embodiment 2 in that the trigger information received by the central processing unit 21 indicates a trigger generator and a transmitter and a destination of a trigger signal and that the shared range of a trigger signal is defined based on the trigger information. This trigger information corresponds to an example of first trigger information.

As illustrated in FIG. 38, the trigger information in the present embodiment indicates a trigger generator, a transmitter of a trigger signal, and a destination of the trigger signal as sharing information. The trigger generator indicates a device that has detected a trigger or a device that has first transmitted a trigger signal. The trigger information is added to the trigger signal by the logging device 50 that has detected the trigger and generated the trigger signal. However, the transmitter in the trigger information is rewritten, by a device that transmits the trigger signal between the logging device 50 and the central processing unit 21, into information indicating the device. The trigger information in the example in FIG. 38 is received by the central processing unit 21 as a result of generation by the logging device 41 upon detection of a trigger and transmission through the network unit 24.

The central processing unit 21 determines the destination of a trigger signal based on the trigger information and the preset trigger sharing information 2131. More specifically, the central processing unit 21 refers to the trigger sharing information 2131 illustrated in FIG. 39. The trigger sharing information 2131 indicates devices that are generators to transmit a trigger signal as a generator condition, and indicates devices that are transmitters to transmit a trigger signal as a transmitter condition. The central processing unit 21 transmits a trigger signal to the destination indicated by the trigger information when the generator indicated by the trigger information satisfies the generator condition defined in the trigger sharing information 2131 and the transmitter indicated by the trigger information satisfies the transmitter condition defined in the trigger sharing information 2131.

The trigger information may be or may not be added to the trigger signal transmitted by the central processing unit 21. The logging device 50 that has received the trigger signal from the central processing unit 21 logs the control data.

As described above, the generator, the transmitter, and the destination indicated by the trigger information received by the central processing unit 21 determine the shared range of a trigger signal. Thus, the shared range of a trigger signal can be flexibly controlled.

In the example described above, a trigger signal is relayed when both the generator condition and the transmitter condition are satisfied, but relaying is not limited to this example. The central processing unit 21 may transmit a trigger signal to the destination indicated by the trigger information when either condition is satisfied.

The trigger information may indicate any one or two of the generator, the transmitter, or the destination. More specifically, the shared range of a trigger signal may be determined based on the trigger information that eliminates any one or two of the generator, the transmitter, or the destination illustrated in FIG. 38. With the trigger information eliminating a destination, the central processing unit 21 may transmit the trigger signal to all the connected logging devices 50 when either one or both of the generator condition and the transmitter condition are satisfied.

The present embodiment corresponds to an example in which whether the logging device logs the control data based on the trigger detected by the detection device is determined based on whether the central processing unit transmits the trigger signal to the logging device based on at least one of relay setting information received by the central processing unit or first trigger information added by the detection device to the trigger signal transmitted from the detection device.

The trigger sharing information 2131 indicating the generator condition corresponds to an example of relay setting information indicating whether the trigger signal is to be transmitted to the logging device when the first trigger information added to the trigger signal indicates the detection device as the generator. The trigger sharing information 2131 indicating the transmitter condition corresponds to an example of relay setting information indicating whether the trigger signal is to be transmitted to the logging device when the first trigger information added to the trigger signal indicates the transmitter device.

Embodiment 8

Embodiment 8 is now described focusing on the differences from Embodiment 2. Like reference signs denote like or corresponding components in Embodiment 2. The present embodiment differs from Embodiment 2 in that the trigger information transmitted by the central processing unit 21 indicates a trigger generator as well as a transmitter and a destination of a trigger signal and that a logging device 50 that has received the trigger signal determines whether to perform logging based on the trigger information. This trigger information corresponds to an example of second trigger information.

As illustrated in FIG. 40, the trigger information in the present embodiment indicates a trigger generator, the transmitter of the trigger signal, and the destination of the trigger signal as sharing information. This trigger information is added to a trigger signal by the logging device 50 that has detected a trigger and generated the trigger signal. The transmitter in the trigger information is rewritten, by a device that relays the trigger signal, into information indicating the device. The trigger information illustrated in FIG. 40 is relayed by the central processing unit 21 as a result of generation by the logging device 41 upon detection of a trigger. The trigger information may not be added to the trigger signal received by the central processing unit 21, and the central processing unit 21 may generate the trigger information and add the trigger information to the trigger signal. When the central processing unit 21 generates and adds the trigger information with the generator being unidentified, the sharing information may indicate, as a generator, the device that has transmitted the trigger signal to the central processing unit 21.

The logging device 50 that has received the trigger signal from the central processing unit 21 determines whether to perform logging based on this trigger information and the trigger setting information 501. More specifically, the logging device 50 refers to the trigger setting information 501 illustrated in FIG. 41. The trigger setting information 501 indicates the generator condition for performing logging and the transmitter condition for performing logging. The logging device 50 performs logging when the generator indicated by the trigger information satisfies the generator condition defined by the trigger setting information 501, when the transmitter indicated by the trigger information satisfies the transmitter condition defined by the trigger setting information 501, and when the destination indicated by the trigger information is the logging device 50 that has received the trigger signal. The logging device 50 does not perform logging when the trigger information indicates a destination different from the logging device 50 that has received the trigger signal.

As described above, the generator, the transmitter, and the destination indicated by the trigger information determine whether the logging device performs logging. This allows flexible control of a substantial shared range of a trigger signal for performing logging.

The logging device 50 may perform logging when any one or two of the generator condition as a first condition, the transmitter condition as a second condition, or a third condition of the destination being the logging device 50 are satisfied. The trigger information may indicate any one or two of the generator, the transmitter, or the destination.

The present embodiment corresponds to an example in which whether the logging device logs the control data based on the trigger detected by the detection device is determined based on at least one of reception setting information received by the logging device or second trigger information added to the trigger signal transmitted to the logging device from the central processing unit that has received the trigger signal.

The trigger setting information 501 indicating the generator condition corresponds to an example of the reception setting information indicating whether the control data is to be logged when the second trigger information added to the trigger signal received indicates the detection device as a generator. The trigger setting information 501 indicating the transmitter condition corresponds to an example of reception setting information indicating whether the control data is to be logged when the second trigger information added to the trigger signal received indicates the transmitter device.

Embodiment 9

Embodiment 9 is now described focusing on the differences from Embodiment 2. Like reference signs denote like or corresponding components in Embodiment 2. The present embodiment differs from Embodiment 2 in that the shared range of a trigger signal is determined by defining the upper limit of a relaying count.

As illustrated in FIG. 42, the sharing information in the present embodiment indicates the remaining relaying count of the trigger signal. The initial value of the remaining relaying count is set by the logging device 50 that has detected the trigger. The initial value may be preset at the shipment of the logging device 50 or may be set as appropriate by the user. Different types of triggers may have different initial values. When the remaining relaying count of the sharing information added to the trigger signal is greater than or equal to 2, a device having the function of relaying a trigger signal relays the trigger signal after decrementing the remaining relaying count. When the remaining relaying count is 1, the device does not relay the trigger signal after decrementing the remaining relaying count to zero.

The relaying that involves decrementing the remaining relaying count may be performed by a device such as the central processing unit 21, the input-output unit 22, the network unit 24, and the logging devices 50. In a large-scale control system including many networks, relaying through the networks with decrement of the remaining relaying count limits the range of the network through which a trigger signal propagates and effectively allows avoidance of overuse of the line resulting from looping of the trigger signal. In the example described below, the remaining relaying count is decremented when a trigger signal is relayed from one network to another.

Figure 43:
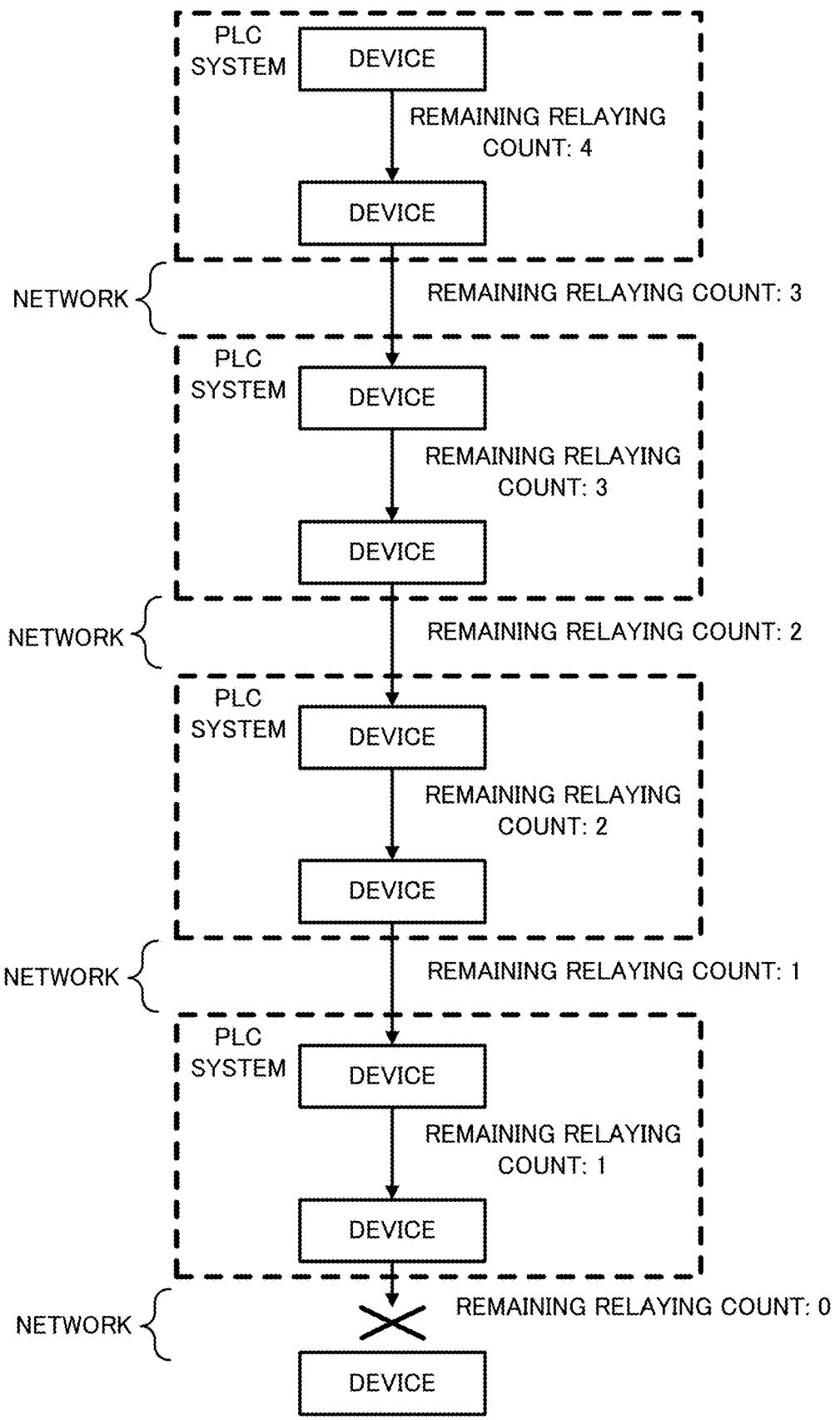
FIG. 43 is a diagram illustrating a first remaining relaying count in Embodiment 9.

More specifically, as illustrated in FIG. 43, when a trigger signal is transmitted between devices included in a single PLC system, the devices do not change the remaining relaying count. The PLC system includes a PLC and an FA device connected to the PLC with a signal line other than a network. In the example in FIG. 1, the PLC 20 and the controllable devices 31 and 32 are included in a single PLC system, and the logging devices 41 and 42 connected to the PLC 20 with the industrial network 400 are located external to the PLC system including the PLC 20. The devices included in the PLC system correspond to units included in the PLC 20 and the controllable devices 31 and 32 In FIG. 1.

Figure 44:
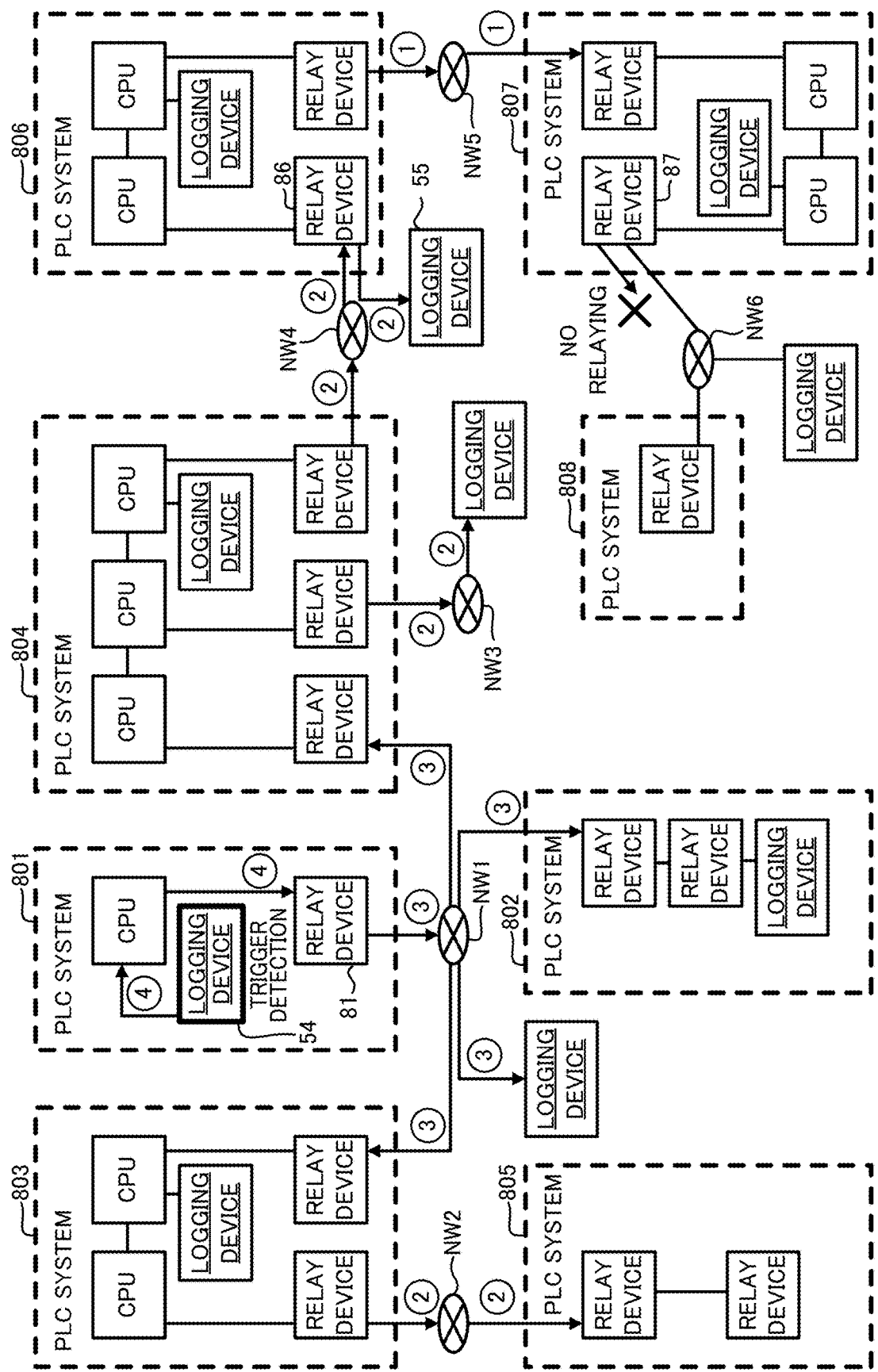
FIG. 44 is a diagram illustrating a second remaining relaying count in Embodiment 9.

In the example illustrated in FIG. 44, the remaining relaying count defines the shared range of a trigger signal and trigger information in a large-scale control system. In FIG. 44, CPUs included in PLC systems each correspond to the central processing unit 21, and relay devices included in the PLC systems are devices having the function of relaying a trigger signal to other devices. The lines connecting devices to one another and the lines connecting devices and networks NW1 to NW6 to one another indicate connections with communication lines. The arrows indicate transmission of trigger signals and trigger information. The circled numbers around the arrows indicate the remaining relaying counts of trigger information corresponding to the arrows.

When a logging device 54 indicated by a block drawn with a bold line in FIG. 44 detects a trigger, the logging device 54 outputs, together with a trigger signal, trigger information indicating a remaining relaying count of 4 as an initial value. The trigger information is shared within a PLC system 801 including the logging device 54. A relay device 81 in the PLC system 801 decrements the remaining relaying count to 3 and then transmits the trigger information to a network NW1. The PLC systems 802, 803, and 804 connected to the PLC system 801 with the network NW1 thus receive the trigger information indicating the remaining relaying count of 3 and share the trigger signal within each of the PLC systems 802, 803, and 804. The logging devices connected to the PLC system 801 with the network NW1 start logging upon receipt of the trigger signal.

A PLC system 805 connected to the PLC system 803 with a network NW2 receives trigger information indicating a remaining relaying count of 2 and shares the trigger signal within the PLC system 805. The logging devices connected to the PLC system 804 with a network NW3 and a PLC system 806 connected to the PLC system 804 with a network NW4 receive the trigger information indicating the remaining relaying count of 2. The PLC system 806 then shares the trigger signal within the PLC system 806.

As illustrated in FIG. 44, a logging device 55 receives a trigger signal from the PLC system 806 through the network NW4. As described above, the trigger information indicating the remaining relaying count of 2 has been transmitted through the network NW4. Thus, the logging device 55 receives the trigger information indicating the remaining relaying count of 2 similarly. More specifically, for trigger information that is again transmitted through the network through which the trigger information has already been transmitted, the remaining relaying count remains the same.

A PLC system 807 connected to the PLC system 806 with a network NW5 receives trigger information indicating a remaining relaying count of 1 and shares the trigger signal within the PLC system 807. With the relay device included in the PLC system 807 decrementing the remaining relaying count for the trigger information received by the PLC system 806 to zero, the relay device does not transmit the trigger information through the network NW6. Thus, a PLC system 808 connected to the PLC system 807 with the network NW6 is excluded from the shared range of the trigger signal and the trigger information.

As described above, the shared range of a trigger signal is flexibly controllable also when the trigger information indicates the remaining relaying count. In particular, for a large-scale system in which a trigger signal can be transmitted through multiple networks, looping of the trigger signal can be reliably avoided.

The trigger information may indicate the count of relayed times of a trigger signal, rather than the remaining relaying count. The relay device may relay the trigger signal and the trigger information after incrementing the count when the count indicated by the trigger information is less than a predetermined upper limit value and may not relay the trigger signal when the count is greater than or equal to the upper limit value. The trigger information indicates any information corresponding to the count of relayed times of a trigger signal.

Embodiment 10

Embodiment 10 is now described focusing on the differences from Embodiment 1. Like reference signs denote like or corresponding components in Embodiment 1. The present embodiment differs from Embodiment 1 in that the logging devices 50 store log data in an external device.

Figure 45:
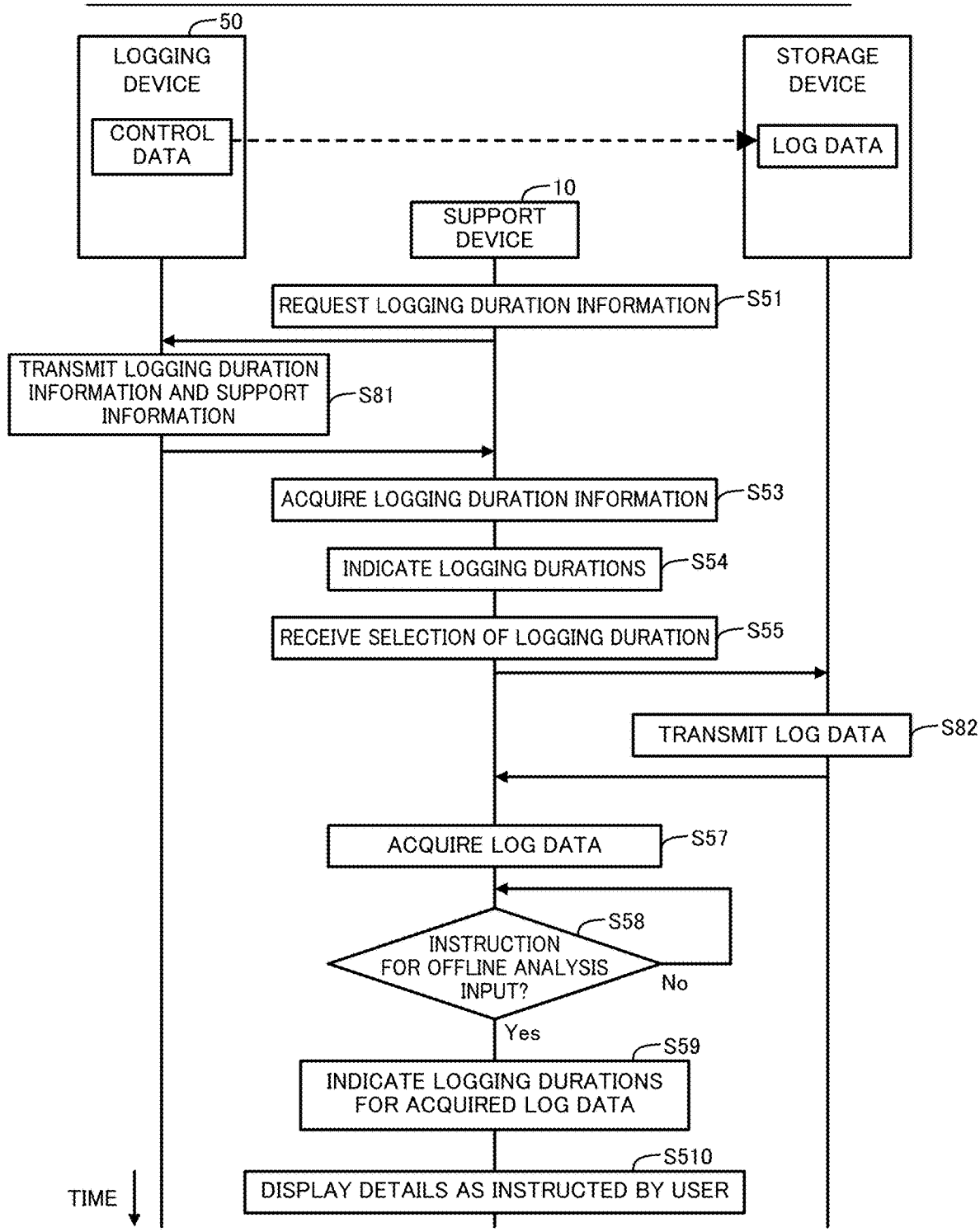
FIG. 45 is a flowchart of support information provision in Embodiment 10.

As illustrated in FIG. 45, the logging device 50 in the present embodiment stores log data in an external storage device without storing the log data in the logging device 50. The storage device may be a server on a network or a non-transitory recording medium such as a memory card. When requested by the support device 10 to provide the logging duration information 504 (step S51), the logging device 50 transmits the logging duration information 504 and support information for supporting acquisition of the log data (step S81). The support information is, for example, the address of the storage device on the network, the address of log data in a memory in the storage device, information for decrypting encrypted log data, or authentication information for accessing the storage device.

After step S55, the support device 10 reads log data from the storage device using the support information. More specifically, the storage device transmits the log data to the support device 10 (step S82).

As described above, when the log data stored in a device external to the logging device 50 is provided to the support device 10 using the support information, the same effects as in Embodiment 1 are produced. In particular, the logging unit 23 included in the PLC 20 is typically a built-in device that may be hardware with low basic specs. In contrast, the support device 10 in the present embodiment can directly access a storage device storing the log data 503 and expectedly acquire the file promptly.

Embodiment 11

Embodiment 11 is now described focusing on the differences from Embodiment 1. Like reference signs denote like or corresponding components in Embodiment 1. The present embodiment differs from Embodiment 1 in that the logging devices 50 acquire control data from an external transmission device and generate log data for the control data.

Figure 46:
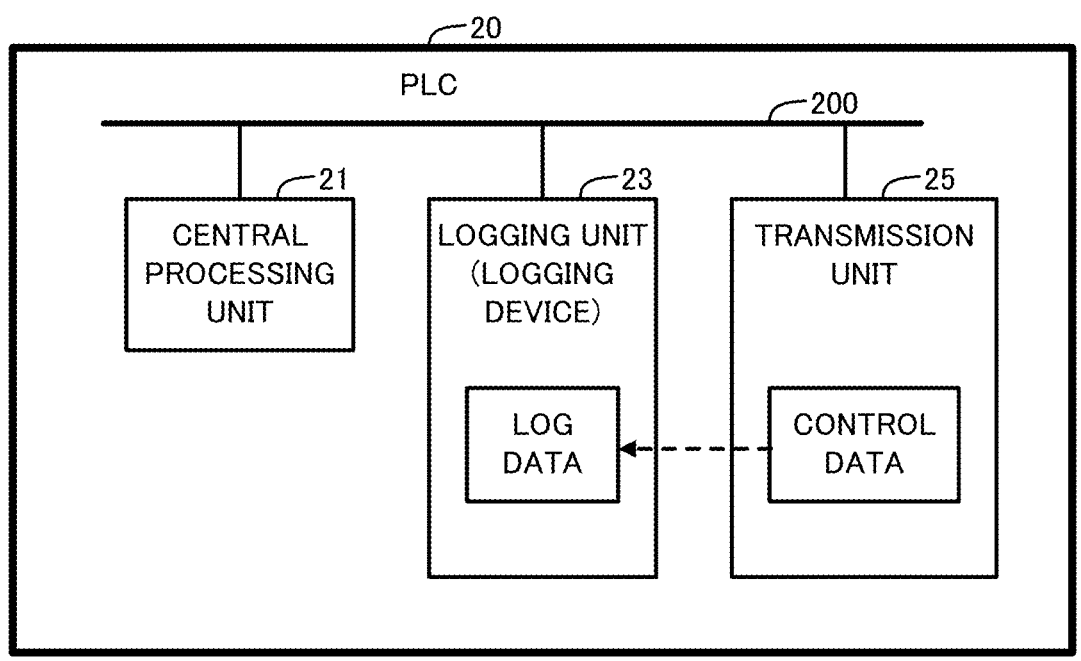
FIG. 46 is a diagram illustrating the relationship between control data and log data in Embodiment 11.

As illustrated in FIG. 46, the logging unit 23 that is an example of the logging device 50 receives control data from a transmission unit 25 included in the PLC 20 through the PLC bus 200 and logs the control data to generate and store log data. More specifically, when the logging unit 23 detects or receives a trigger, the logging unit 23 requests the transmission unit 25 to provide control data used by the transmission unit 25 and thus acquires and logs the control data periodically.

As described above, when the logging devices 50 log external control data, the same effects as in Embodiment 1 are produced.

Although one or more embodiments of the present disclosure have been described above, the present disclosure is not limited to the above embodiments.

Figure 47:
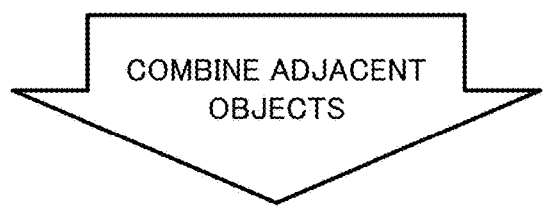
FIG. 47 is a diagram illustrating combining of objects in a modification.

For example, as illustrated in FIG. 47, the indicator 110 may combine logging durations adjacent to each other in a time direction to display a single object.

Figure 48:
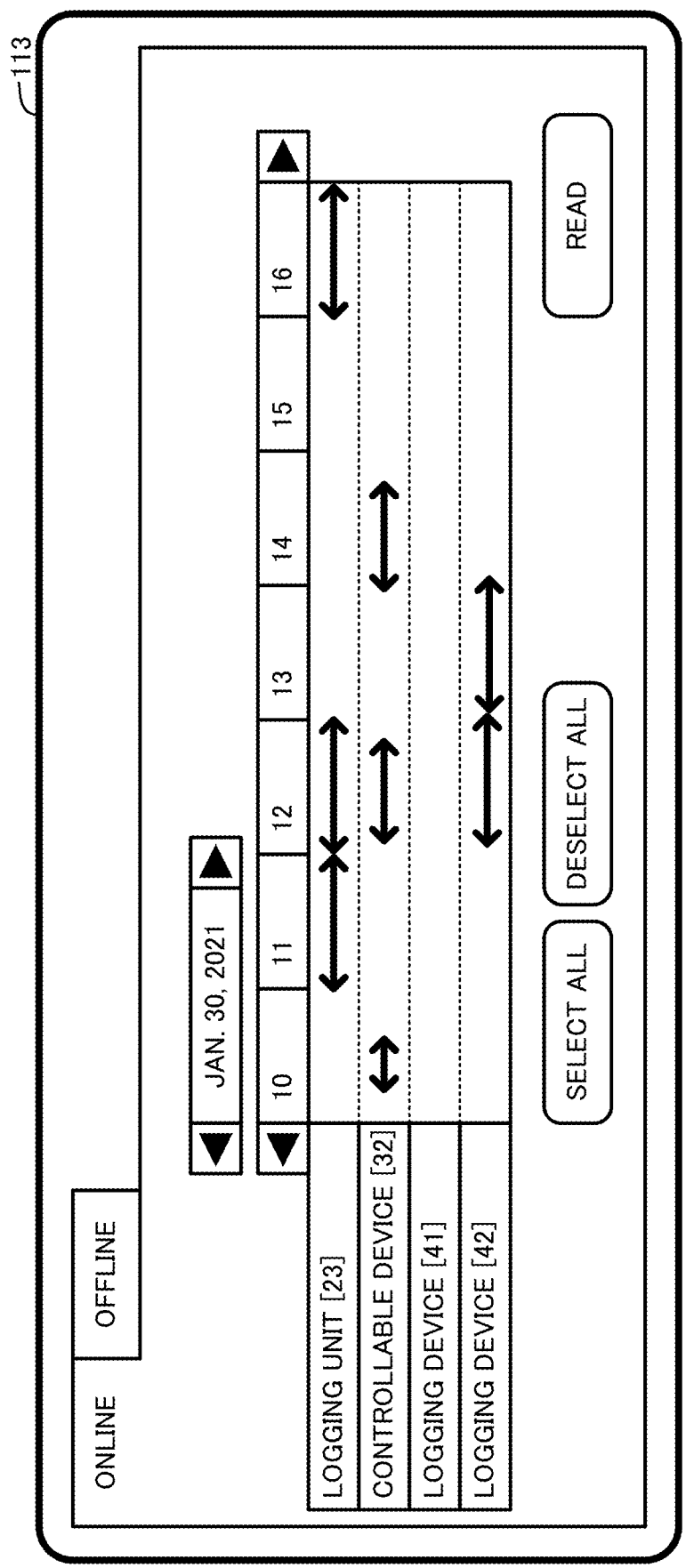
FIG. 48 is a diagram of an object in a modification.

The indicator 110 may display a list of logging durations in a manner different from the bar chart described above. For example, the objects indicated by the indicator 110 are not limited to strip icons, and may be arrows as illustrated in FIG. 48. Additionally, before the log data 503 is acquired, the indicator 110 may indicate logging durations to the user by displaying a table as illustrated in FIG. 49.

The control data may be read from a cyclic memory in which data sets are synchronized by multiple devices during device control, or may be other data. The log data 503 may be values associated with index information indicating the time-series sequence, instead of values associated with date and time.

In the example described above, the logging duration information 504 is generated simultaneously with the log data 503. However, the timing of generating the logging duration information 504 is not limited to this example. For example, the logging devices 50 may generate the logging duration information 504 in response to a request for the logging duration information 504 with reference to the log data 503. The logging devices 50 may generate the logging duration information 504 periodically at timing when the logging devices 50 have a low processing load, at preset timing, or at timing indicated by the central processing unit 21 as appropriate for the product characteristics.

The log data 503 normally has a relatively large size, and thus is typically stored in a large capacity, nonvolatile memory with a low access speed. In contrast, the logging duration information 504 may be fixed to or temporarily stored in a cache accessible with high speed to respond to a request from the support device 10.

Figure 50:
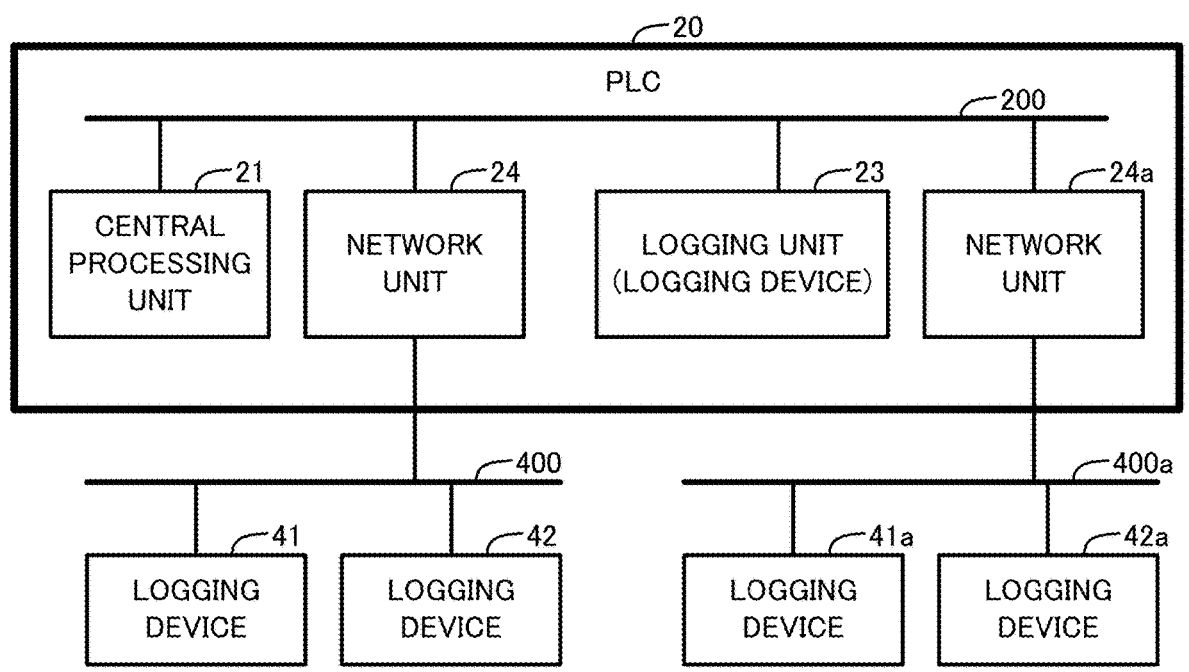
FIG. 50 is a diagram of a PLC in a modification.

As illustrated in FIG. 50, the PLC 20 may be connected to multiple logging devices 41, 42, 41a, and 42a through different industrial networks 400 and 400a. With a trigger being shared through multiple networks in this manner, the multiple logging devices 50 can easily perform logging in response to one another on a complex network built in a factory.

In the example described above, although a trigger is shared among the multiple logging devices 50 including logging devices 50 external to the PLC 20, the multiple logging devices 50 included in the PLC 20 may share a trigger. More specifically, a single PLC 20 may function as a logging system. In the example described above, although the multiple logging devices 50 share a trigger, a single logging device 50 may correspond to a log data analysis support system. The single logging device 50 may provide logging duration information to the support device 10.

In the example described above, although the logging duration information 504 includes a record corresponding to each set of log data 503, the logging duration information 504 may correspond to each set of log data 503 corresponding to the above record.

The above embodiments may be combined as appropriate. For example, Embodiment 7 in which the shared range of a trigger signal is controlled based on the transmitter indicated by the sharing information in the trigger information may be combined with Embodiment 9 in which the shared range of a trigger signal is controlled based on the remaining relaying count.

The functions of the logging devices 50, the central processing unit 21, and the support device 10 in the above embodiments can be implemented by dedicated hardware or by a common computer system.

For example, the program P1 may be stored in a non-transitory computer-readable recording medium, typically a flexible disc, a compact disc read-only memory (CD-ROM), a digital versatile disc (DVD), or a magneto-optical (MO) disk, and may be distributed. The program P1 can be installed in a computer to provide a device that performs the above processing.

The program P1 may be stored in a disk device included in a server on a communication network, typically the Internet, and may be, for example, superimposed on a carrier wave to be downloaded to a computer.

The processing described above may also be performed by the program P1 activated and executed while being transferred through a network, typically the Internet.

The processing described above may also be performed by entirely or partially executing the program P1 on a server while a computer is transmitting and receiving information about the processing through a communication network.

In the system with the above functions implementable partially by the OS or through cooperation between the OS and applications, portions executable by applications other than the OS may be stored in a non-transitory recording medium that may be distributed or may be downloaded to the computer.

Means for implementing the functions of the logging devices 50, the central processing unit 21, and the support device 10 is not limited to software. The functions may be partially or entirely implemented by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The technique according to one or more embodiments of the present disclosure is applicable to analysis of log data recorded in a FA system.

REFERENCE SIGNS LIST

10 Support device
20 PLC
21, 21a Central processing unit
22 Input-output unit
23 Logging unit
24, 24a Network unit
2 Transmission unit
31, 32 Controllable device
41, 41a, 42, 42a, 50 to 55 Logging device
60 FA device
61 Processor
62 Main storage
63 Auxiliary storage
64 Input device
65 Output device
66, 242 Communicator
67 Internal bus
71, 722, 723, 731, 741 Object
72, 721 Button
81, 86, 87 Relay device
100 Log data analysis support system
110 Indicator
111 Online display
112 Offline display
113 Screen
120 Receiver
130 Storage
140 Communicator
200 PLC bus
211 Device communicator
212 Bus communicator
213, 243 Storage
214, 244 Trigger relay
215, 245 Trigger detector
400, 400a Industrial network
501 Trigger setting information
502 Control data
503, 511, 521, 531 Log data
504, 512, 522, 532 Logging duration information
530 Storage
540 Trigger transmitter-receiver
540a Trigger transmitter
550 Trigger detector
560 Logger
570 Responder
732 Area
751 Mark
801 to 808 PLC system
2131 Trigger sharing information
2132 Control data
NW1 to NW5 Network
P1 Program

The invention claimed is:

1. A trigger relay unit in a programmable controller, the trigger relay unit being connectable to a plurality of detectors to detect a trigger to log control data about device control, the trigger relay unit comprising:
processing circuitry to
receive a first trigger signal indicating the trigger from a first detector of the plurality of detectors, and
transmit the first trigger signal to a second detector different from the first detector when the first trigger signal is received,
wherein the processing circuitry excludes, from a transmission target, a second trigger signal different from the first trigger signal and received in a period from when the first trigger signal is received to when the processing circuitry completes transmitting the first trigger signal.

2. The trigger relay unit according to claim 1, wherein the processing circuitry transmits the first trigger signal to two or more detectors of the plurality of detectors including the second detector.

3. The trigger relay unit according to claim 1, wherein the processing circuitry transmits the first trigger signal to the plurality of detectors.

4. The trigger relay unit according to claim 1, wherein each of the first trigger signal and the second trigger signal indicates trigger identification information to identify the trigger.

5. A trigger transmission system, comprising:
  the plurality of detectors to detect a trigger to log control data about device control; and
  the trigger relay unit according to claim 1 connected to the plurality of detectors.

6. A trigger transmission method implementable with a trigger relay unit in a programmable controller, the method comprising:
  receiving, with a receiver, a first trigger signal from a first detector of a plurality of detectors to detect a trigger to log control data about device control, the first trigger signal indicating the trigger; and
  transmitting, with a transmitter, the first trigger signal to a second detector different from the first detector when the receiver receives the first trigger signal,
  wherein the transmitter excludes, from a transmission target, a second trigger signal different from the first trigger signal and received by the receiver in a period from when the receiver receives the first trigger signal to when the transmitter completes transmitting the first trigger signal.

7. A non-transitory computer-readable recording medium storing a program executable by a trigger relay unit in a programmable controller, the trigger relay unit being connected to a plurality of detectors to detect a trigger to log control data about device control, the program causing the trigger relay unit to function as:
  a receiver that receives a first trigger signal indicating the trigger from a first detector of the plurality of detectors; and
  a transmitter that transmits the first trigger signal to a second detector different from the first detector when the receiver receives the first trigger signal,
  wherein the transmitter excludes, from a transmission target, a second trigger signal different from the first trigger signal and received by the receiver in a period from when the receiver receives the first trigger signal to when the transmitter completes transmitting the first trigger signal.

\* \* \* \* \*